United States Patent
Jain et al.

(10) Patent No.: US 12,219,063 B2
(45) Date of Patent: Feb. 4, 2025

(54) EVENT SIGNIFIERS CONNECTED TO SOCIAL- OR GROUP-BASED VISUAL REPRESENTATIONS OF CRYPTOGRAPHIC OBJECTS

(71) Applicant: Emoji ID, LLC, Oakland, CA (US)

(72) Inventors: Naveen Kumar Jain, Nashville, TN (US); Riccardo Paolo Spagni, Western Cape (ZA)

(73) Assignee: EMOJI ID, LLC, Nashville, TN (US)

( * ) Notice: Subject to any disclaimer, the term of this patent is extended or adjusted under 35 U.S.C. 154(b) by 304 days.

(21) Appl. No.: 17/935,551

(22) Filed: Sep. 26, 2022

(65) Prior Publication Data
US 2024/0113880 A1   Apr. 4, 2024

(51) Int. Cl.
*H04L 9/32*  (2006.01)
*G06F 3/14*  (2006.01)
*G06Q 20/36*  (2012.01)

(52) U.S. Cl.
CPC .......... *H04L 9/3213* (2013.01); *G06F 3/1454* (2013.01); *G06Q 20/3678* (2013.01); *G06Q 2220/00* (2013.01); *H04L 2209/603* (2013.01)

(58) Field of Classification Search
CPC ............. H04L 9/3213; H04L 2209/603; H04L 9/0891; H04L 2209/56; H04L 9/50; G06F 3/1454; G06Q 20/3678; G06Q 2220/00; G06Q 20/12; G06Q 30/0643; G06Q 20/36
See application file for complete search history.

(56) References Cited

U.S. PATENT DOCUMENTS

2019/0361868 A1*  11/2019  Rogynskyy ........... H04M 15/60
2021/0226774 A1*   7/2021  Padmanabhan ....... H04L 9/0643

* cited by examiner

*Primary Examiner* — Huan V Doan
(74) *Attorney, Agent, or Firm* — Perkins Coie LLP; Colin Fowler

(57) ABSTRACT

Aspects of the preset document relate to social or group-based presentation of cryptographic objects. Cryptographic objects linked to members of a group are visually represented to each group member, such as in a "binder"-like presentation. Further, group activity related to the cryptographic objects is also presented to each group member. Specific object events of the group activity are detected based on searching an immutable cryptographic ledger. The object events are categorized according to value and volume of the cryptographic objects involved in the object events. With this event data (and event data for other related object events), event signifiers are assigned to object events and presented to group members. Example event signifiers include audio, persistent visuals, and/or dynamic visuals that are connected to visual representations of the cryptographic objects involved in the object events.

20 Claims, 32 Drawing Sheets

EVENT SIGNIFIERS CONNECTED TO SOCIAL- OR GROUP-BASED VISUAL REPRESENTATIONS OF CRYPTOGRAPHIC OBJECTS

TECHNICAL FIELD

The disclosure relates to digital input handling and processing to generate digital composite objects. The disclosure more specifically relates to unique, procedurally generated digital objects using one-way functions.

BACKGROUND

A computer can use random elements to generate unique, or seemingly unique, procedurally generated digital objects (e.g., graphics). However, human viewers typically do not appreciate something as unique if it is merely random. Thus, procedural generation of digital objects is lacking in programming to interpret when output is merely random or when it has displayed machine creativity. Prior art has attempted to address the randomness issue by providing a set of preset components that are easily intermingled. However, this solution is limited to combinations of presets and thus repeats, or near-repeat digital objects as output are likely.

Tangentially, a one-way function is a function that is easy to compute on every input, but hard to invert given the image of a random input. Here, "easy" and "hard" are to be understood in the sense of computational complexity theory, specifically the theory of polynomial time problems.

BRIEF DESCRIPTION OF THE DRAWINGS

FIG. 22 is a screenshot of a time-based leaderboard interface.

FIG. 24 is a screenshot of multiple users occupying a matching leaderboard position.

DETAILED DESCRIPTION

Figure 1:
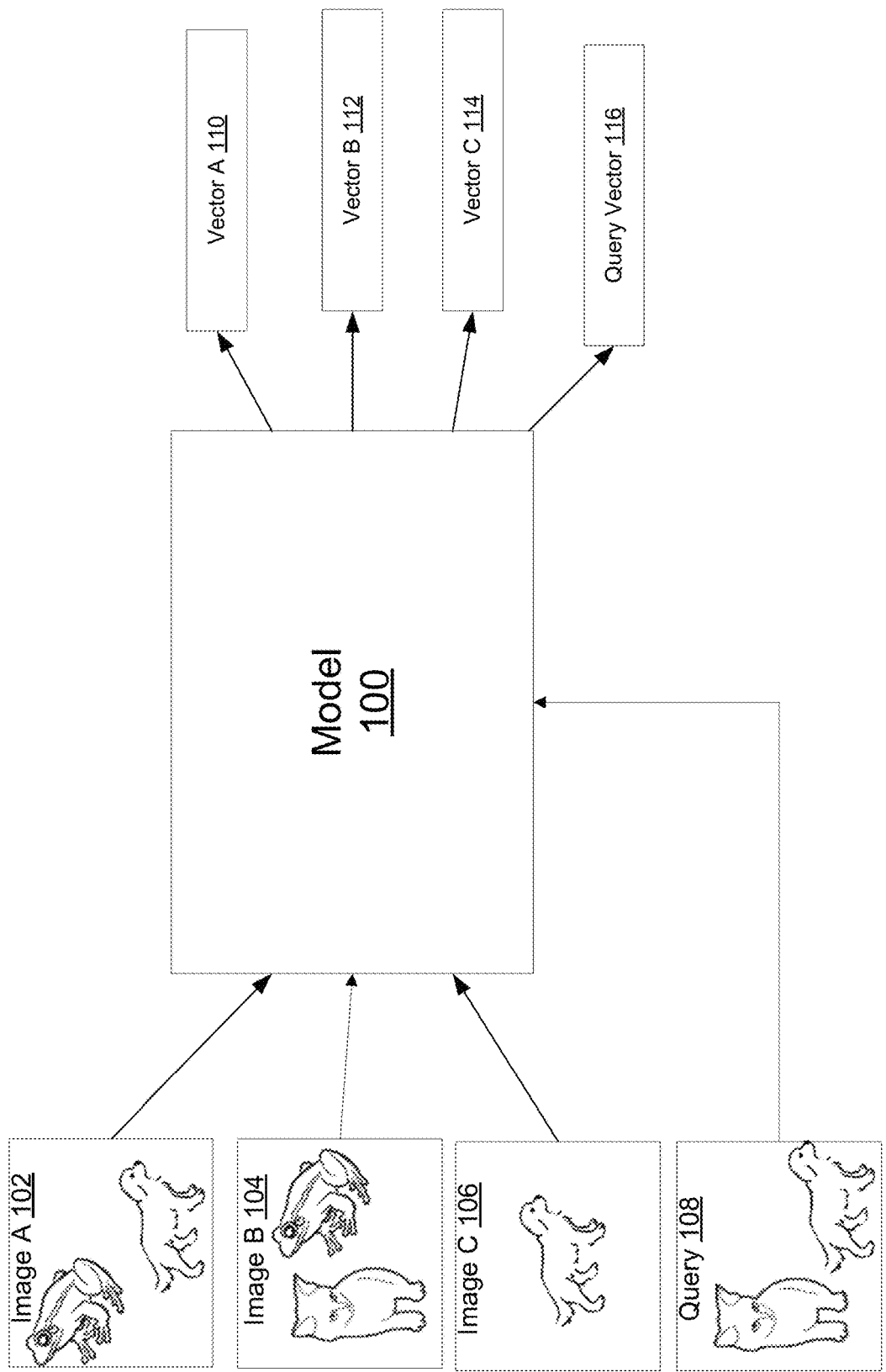
FIG. 1 is an illustration of a sample few-shot model configured to derive graphic features.

The behavior of owners of digital objects is to frequently trade their digital objects and cause significant turnover of those objects. The constant turnover of digital objects is not an ideal ecosystem for creators of said digital objects. Thus, it behooves such creators to make use of a gamified mechanic for digital objects that encourages holding on to those digital objects for extended periods. One such mechanic is a time-based leaderboard.

For a given set of digital objects, a leaderboard indicates how long a given user has held that digital object and ranking the users based on that length of time. In some embodiments, the leaderboard uses an absolute timeclock for a given digital object. In some cases, users will hold multiple digital objects from a given set of digital objects. Thus, in some embodiments, the leaderboard uses a timeclock connected to the length of time a given user contiguously holds a digital object from a given collection of digital objects (e.g., the objects do not need to contiguously need to be the same but are from the collection).

In some embodiments, the leaderboard sorts ties based on number of digital objects from the collection held or based on staking of digital objects. When a digital object is "staked," that object is transferred to a holding user for a predetermined length of time. Staking a digital object is akin to locking the object away in a vault for a period of time. While staked with the holding user, the original user cannot trade the digital object. While staking of a digital object technically transfers the digital object away from the original user, for purposes of the leaderboard, the digital object is considered contiguously controlled by the original user.

The leaderboard enables social benefits and loyalty rewards such as getting early or exclusive access to future distributions of digital objects and anything the creator wants to incentivize loyalty (a velocity sink) and award reputational benefits.

Additionally disclosed herein is a generator of unique, procedurally generated digital objects that makes use of user specific parameters. Computers can generate unique digital output quite easily through the use randomizing elements. This type of output results in something that is strictly unique or seemingly unique, but a human viewer is not necessarily going to appreciate the output as unique. Depending on the style of the output, the uniqueness manifests in different ways. For purposes of ease of disclosure, this application largely focuses on graphical elements, but textual, audio, or multimedia elements are similarly implementable.

Prior art techniques have made use of preset elements that are reused in a random order. This sort of process is ultimately subject to the size of the presets used, but nevertheless, often appears to output similar digital objects over time. A way to overcome the similarity between output is to unbound the input such that each user is able to submit their own input, based on user specific parameters. While the algorithm for generating the procedural digital object does not change, the varied input enables more unique objects to be created. Further, the digital objects created are more personalized to those who instigate the generation.

With respect to user submitted input on "unique" output, a platform needs a scheme to address the potential of double submission of the same input. In some embodiments, input is validated such that an exact set of input may only be submitted once. In some embodiments, a user is validated such that that user may only submit input once (and in a manner, the user themselves acts as the variation in input). In some embodiments, a randomization element is applied to each submission. The randomization element (e.g., a salt) is implementable in a number of ways. In some embodiments, the salt changes the manner of procedural generation based on the input. In some embodiments, the salt is treated in the same manner as the input and acts an additional element of input.

A specific example of an embodiment of the present invention relates to the generation of cryptographic tokens, or more specifically non-fungible cryptographic tokens (NFT). In some embodiments, the procedurally generated digital object is generated based on existing elements in a cryptographic wallet. A given cryptographic wallet has a number of NFTs present therein. The generator of digital objects interprets the various cryptographic protocols related to the NFTs present in the wallet, identifies content associated therewith, and procedurally generates a new NFT based on the existing ones present in the wallet.

Examples of uses of digital objects include as collectors items, tickets for events, identity information, art, and/or social networking or community building tokens.

Artificial Intelligence and Few-Shot Models

Artificial intelligence models often operate based on extensive and enormous training models. The models include a multiplicity of inputs and how each should be handled. Then, when the model receives a new input, the model produces an output based on patterns determined from the data it was trained on. Few-shot models use a small number of inputs (a support set) to identify some information about a query input.

The term "few-shot" refers to a model that is trained to interpret a few sources of input data that the model has not necessarily observed before. Few-shot is shorthand for stating that the model has "a few shots" to determine what the user is seeking. "A few" does not necessarily refer to "three" as is often applied, but a relatively small number when compared to other models known in the art. Few-shot learning (FSL) refers to the training of ML algorithms using a very small set of training data (e.g., a handful of images), as opposed to the very large set that is more often used. This commonly applies to the field of computer vision, where it is desirable to have an object categorization model work well without thousands of training examples.

FSL is utilized in the field of computer vision, where employing an object categorization model still gives appropriate results even without having several training samples. For example, where a system categorizes bird species from photos, some rare species of birds may lack enough labeled pictures to be used as training images. Consequently, if there is a classifier for bird images, with the insufficient amount of the dataset, a solution would employ FSL.

In some embodiments, a few-shot model uses 10 or fewer input examples, 20 or fewer, 100 or fewer input examples, or 5-7 input examples. When applied to graphic element/feature identification, the number of input examples may be directly correlated with the number of graphic features that are possible in queries. The referenced input examples differ from those the model is trained with in that those examples used during the few-shot do not necessarily have any relationship (with the exception of having a comparable data type, like the use of ASCII characters, or image data). The training of the model is premised in teaching the model how to quickly adapt to new training examples, rather than to recognize a given input strictly based on examples that it has seen during training. Rather than evaluate individual inputs, the few-shot model is trained to evaluate few-shots—specifically relationships that exist between the various examples within the few-shot.

Previous work on FSL requires that each example in the support set (examples for the model to adapt quickly to) contain only a single label. For example, suppose a model can quickly learn to classify images of a rare bird species. Prior work requires that each image in the support set contain a single bird. Other work relating to few-shot models and relation network models include the following references:

Yutian Chen, Yannis M. Assael, Brendan Shillingford, David Budden, Scott E. Reed, Heiga Zen, Quan Wang, Luis C. Cobo, Andrew Trask, Ben Laurie, Ç aglar Gülçehre, Aaron van den Oord, Oriol Vinyals, and Nando de Freitas. *Sample Efficient Adaptive Text-to-Speech*. CoRR, abs/1809.10460, 2018.

Chelsea Finn, Pieter Abbeel, and Sergey Levine. *Model-Agnostic Metalearning for Fast Adaptation of Deep Networks*. CoRR, abs/1703.03400, 2017.

Gregory R. Koch. Siamese Neural Networks for One-Shot Image Recognition. 2015.

Scott E. Reed, Yutian Chen, Thomas Paine, Aaron van den Oord, S. M. Ali Eslami, Danilo Jimenez Rezende, Oriol Vinyals, and Nando de Freitas. *Few-shot Autoregressive Density Estimation: Towards Learning to Learn Distributions*. CoRR, abs/1710.10304, 2017.

Florian Schroff, Dmitry Kalenichenko, and James Philbin. Facenet: *A Unified Embedding for Face Recognition and Clustering*. CoRR, abs/1503.03832, 2015.

Flood Sung, Yongxin Yang, Li Zhang, Tao Xiang, Philip H. S. Ton, and Timothy M. Hospedales. *Learning to Compare: Relation Network for Few-shot Learning*. CoRR, abs/1711.06025, 2017.

Oriol Vinyals, Charles Blundell, Timothy P. Lillicrap, Koray Kavukcuoglu, and Daan Wierstra. *Matching Networks for One Shot Learning*. CoRR, abs/1606.04080, 2016.

Few-shot models typically make use of convolutional neural networks pre-trained for feature extraction. Pretraining includes a large amount of media training data. Output of the pretraining model is a set of vectors. Training for such a network may implement supervised learning or with a Siamese network. Different manners of training will affect output prediction accuracy. The output vectors are normalized in order to establish a common output type for purposes of comparison.

FIG. 1 is an illustration of a sample few-shot model 100 configured to derive graphic features. The sample illustrated is a simplistic implementation utilizing relatively few, and easy to recognize graphic features. This disclosure is not limited to such simple implementations and the relevant models may be configured to operate and identify more complex sets of graphic features.

In the example, model 100, is a few-shot model designed to identify and categorize graphic features that are received. In some embodiments, the model 100 is configured with a set list of graphic features to observe (indicated by a graphic feature matrix). In other embodiments, Model 20 includes no explanation what a support set includes and instead merely identifies similar patterns in pixels.

The illustration of FIG. 1 includes a three-image support set 102, 104, 106 and a single query image 108. The images include some combination of three graphical features depicting a frog, a cat, or a dog. When each image 102, 104, 106, 108 is supplied to the model 100, the model 100 generates a respective vector that describes the image content. Each vector 110, 112, 114, 116 includes a set of dimensions that together are indicative of the graphic content of the images 102, 104, 106, 108. Image A 102 corresponds to vector A 110. Image B 104 corresponds to vector B 112. Image C 106 corresponds to vector C 114. The query image 108 corresponds to the query vector 116. In some embodiments, the support set vectors 110, 112, 114 and the query vector 116 are a predetermined number of dimensions in length. Dimensions may relate directly to graphical features on a one-to-one basis, or multiple dimensions may be used to describe a given graphic feature.

As depicted in the figure, the query image 108 does not include a combination of graphic features that exist in any of the support set. Each feature exists in the support set, but not necessarily by itself, or with an exact same combination. While a human observer can readily identify the content of the query image, the image identification system is taught how to identify via few-shot models.

References to "a model" as discussed herein may refer to a heuristic model, an artificial intelligence model, a neural network, a convolutional neural network, a hidden Markov model, an FSL model, or another suitable ML model known in the art.

Cryptographic Platforms

Public and private keys are an integral component of cryptocurrencies built on blockchain networks and are part of a larger field of cryptography known as public-key cryptography (PKC) or asymmetric encryption. The goal of PKC is to easily transition from a first state (e.g., a private key) to a second state (e.g., a public key) while reversing the transition from the second state to the first state nearly impossible, and in the process, proving possession of a secret key without exposing that secret key. The product is subsequently a one-way mathematical function, which makes it ideal for validating the authenticity of transactions such as cryptocurrency transactions because possession of the first state such as the secret key cannot be forged. PKC relies on a two-key model, the public and private key.

The general purpose of PKC is to enable secure, private communication using digital signatures in a public channel that is susceptible to potentially malicious eavesdroppers. In the context of cryptographic tokens, the goal is to prove that a traded token was indeed signed by the owner of that token, and was not forged, all occurring over a public blockchain network between peers. A private key of a blockchain wallet unlocks the right for the blockchain wallet's owner to spend transfer tokens in the blockchain wallet and therefore must remain private. A wallet address of the blockchain wallet is cryptographically linked to the blockchain wallet's private key and is publicly available to all users to enable other users to send NFTs to the user's blockchain wallet. For example, the wallet address may be a public key generated from the blockchain wallet's private key using one or more PKC algorithms. Public keys are generally used to identify wallets, whereas the private keys are used to authorize actions of the respective wallet.

Wallet addresses for blockchain wallets are typically represented in human-legible form in one of three ways: as a hexadecimal representation, as a Base64 representation, or as a Base58 representation. In each of these common ways of representing the wallet addresses, each wallet address is represented using a string of letters and numbers, typically exceeding 20 characters in length. The length and randomness of the alphanumeric string makes the wallet address unwieldy and difficult to remember, thereby decreasing its usability and hindering the adoption of cryptocurrencies.

Structurally, in some embodiments, customized, flexible cryptographic tokens connected to a smart contract are powered by a less flexible, base cryptocurrency. Miners operating on the network for the base cryptocurrency power execution of a distributed application (dApp) or smart contract. The smart contract is held by an administrative user and includes all of the custom cryptographic tokens. The custom cryptographic tokens do not "move" in the same sense that the base cryptocurrency moves via transactions. The smart contract is "held" by the administrative user though secondary users may interact with the smart contract and various portions (specific tokens) may be attributed to those secondary users.

Figure 2:
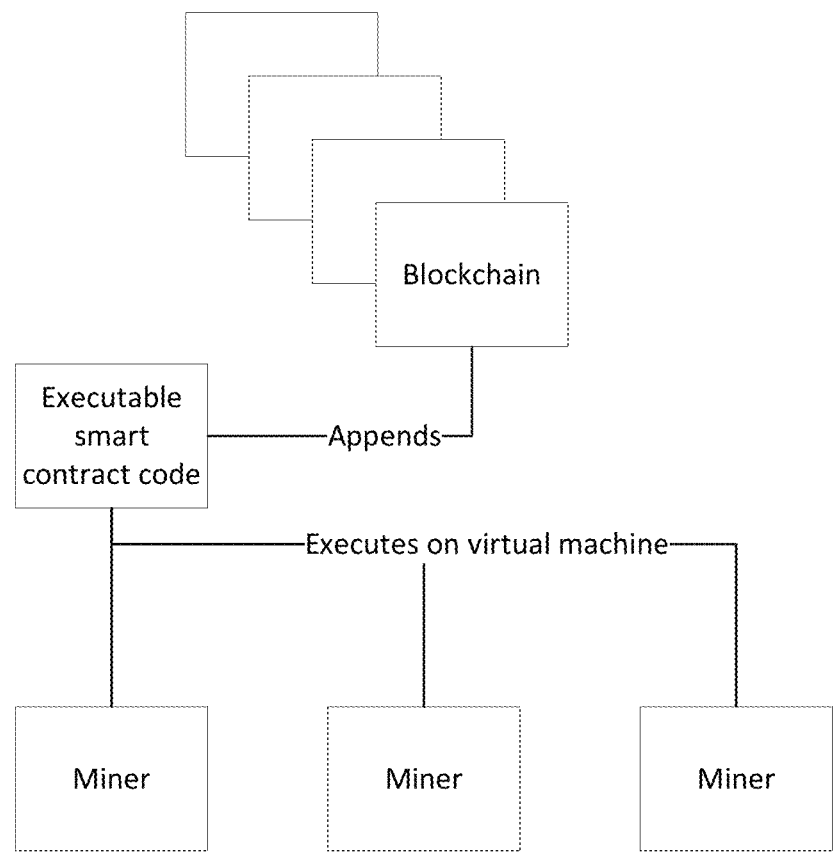
FIG. 2 is a block diagram illustrating a data structure of a smart contract.

FIG. 2 is a block diagram illustrating a data structure of a smart contract. Smart contracts and dApps execute on an Ethereum virtual machine ("EVM"). The EVM is instantiated on available network nodes. Smart contracts and dApps are applications that execute; thus, the processing power to do so must come from hardware somewhere. Nodes must volunteer their processors to execute these operations based on the premise of being paid for the work in Ethereum coins, referred to as Ether, measured in "gas." Gas is the name for a unit of work in the EVM. The price of gas can vary, often because the price of Ether varies, and is specified within the smart contract/dApp.

Every operation that can be performed by a transaction or contract on the Ethereum platform costs a certain number of gas, with operations that require more computational resources costing more gas than operations that require few computational resources. For example, at the time of writing, a multiplication instruction requires 5 gas, whereas an addition instruction requires 3 gas. Conversely, more complex instructions, such as a Keccak256 cryptographic hash requires 30 initial gas and 6 additional gas for every 256 bits of data hashed.

The purpose of gas is pay for the processing power of the network on execution of smart contracts at a reasonably steady rate. That there is a cost at all ensures that the work/processing being performed is useful and valuable to someone. Thus, the Ethereum strategy differs from a Bitcoin transaction fee, which is only dependent on the size in kilobytes of a transaction. As a result that Ethereum's gas costs are rooted in computations, even a short segment of code can result in a significant amount of processing performed. The use of gas further enforces incentivizes coders to generate efficient smart contracts/algorithms. Otherwise, the cost of execution may spiral out of control. Unrestricted, an exponential function may bankrupt a given user.

While operations in the EVM have a gas cost, gas has a "gas price" measured in ether. Transactions specify a given gas price in ether for each unit of gas. The fixing of price by transaction enables the market to decide the relationship between the price of ether and the cost of computing operations (as measured in gas). The total fee paid by a transaction is the gas used multiplied by gas price.

If a given transaction offers very little in terms of a gas price, that transaction will have low priority on the network. In some cases, the network miners may place a threshold on the gas price each is willing to execute/process for. If a given transaction is below that threshold for all miners, the process will never execute. Where a transaction does not include enough ether attached (e.g., because the transaction results in so much computational work that the gas costs exceed the attached ether) the used gas is still provided to the miners. When the gas runs out, the miner will stop processing the transaction, revert changes made, and append to the blockchain with a "failed transaction." Failed transactions may occur because the miners do not directly evaluate smart contracts for efficiency. Miners will merely execute code with an appropriate gas price attached. Whether the code executes to completion or stalls out due to excessive computational complexity is of no matter to the miner.

Where a high gas price is attached to a transaction, the transaction will be given priority. Miners will process transactions in order of economic value. Priority on the Ethereum blockchain works similarly as with the Bitcoin blockchain. Where a user attaches more ether to a given transaction than necessary, the excess amount is refunded back to that user after the transaction is executed/processed. Miners only charge for the work that is performed. A useful analogy regarding gas costs and price is that the gas price is similar to an hourly wage for the miner, whereas the gas cost is like a timesheet of work performed.

A type of smart contract that exists on the Ethereum blockchain are ERC-20 tokens (Ethereum Request for Comment-20). ERC-20 is a technical specification for fungible utility tokens. ERC-20 defines a common list of rules for Ethereum tokens to follow within the larger Ethereum ecosystem, allowing developers to accurately predict interaction between tokens. These rules include how the tokens are transferred between addresses and how data within each token is accessed. ERC-20 provides a framework for a means to build a token on top of a base cryptocurrency. In some embodiments herein, enhancements are built on top of the ERC-20 framework, though use of the ERC-20 technical specification is not inherently necessary and is applicable to circumstances where Ethereum is used as the base cryptocurrency.

Another type of smart contract that exists on the Ethereum blockchain are ERC-721 tokens (Ethereum Request for Comment-721). ERC-721 is a technical specification for NFTs. The ERC-721 introduces a standard for NFT. An ERC-721 token is unique and can have different exclusivity to another token from the same smart contract, maybe due to age, rarity or visuals.

NFTs have a uint256 variable called tokenId. Thus, for any ERC-721 contract, the pair contract address, uint256 tokenId must be globally unique. That said, a given dApp can have a "converter" that uses the tokenId as input and outputs an image.

Disclosure on token protocols has focused on Ethereum. As applicable in this disclosure, Ethereum is a base cryptocurrency. Other base cryptocurrencies exist now and in the future. This disclosure is not limited to application on specifically the Bitcoin or Ethereum blockchains.

Crypt® Kitties is an early example of an NFT platform. Users would engage in breeding and trading of cryptographic tokens that were visually represented by cartoon cats. Each cat had a family tree that was tracked by a blockchain and went back to the originator cats that digitally sired the subsequent cats. The visual representation of each cat had an appearance dictated by a number of preset options and was at least partly controlled by the visual appearance of the parent cat tokens.

Users would mate and auction cats as a game mechanic. When two cats mated, a third cat would be generated by the CryptoKitties dApp. The third cat was visually represented by some amalgamation of the features of the parents with the potential of a mutation (to potentially gain a particularly rare feature neither of the parents exhibited). Ultimately, generation of a cryptokitty is based on the user input of existing kitties, and kitties are the only acceptable datatype. That is to say, no other types of NFT are applicable. One cannot mate a cryptokitty with an emoji ID.

CryptoKitties had a number of viral features that were indicative of exclusivity. These features included particularly rare combinations of visual features and a lineage that was relatively close to an originator cat. In both cases, there was no algorithmic benefit for either of these exclusivity features.

While CryptoKitties does not implement any algorithmic connection to exclusivity features, some embodiments of the present invention do. It is frequently the case that exclusivity features of NFTs are connected to originator or early generation tokens. Additionally, tokens having rare visual features are considered exclusive. What generation a given NFT is, is identifiable using either metadata on the token itself combined with thresholds or heuristics regarding generational definitions or is identifiable by tracing back the token's generation through the respective blockchain of that token. Rarity of visual features is identified via a survey of existing tokens and the existing visual features thereof. Thus, in embodiments of the instant invention an evaluation is performed on each relevant token used as input that identifies the exclusivity features of that token, then those features are captured for use in generation of a new unique procedurally generated digital object (e.g., an NFT).

Emoji Sequence Based ID

Figure 3:
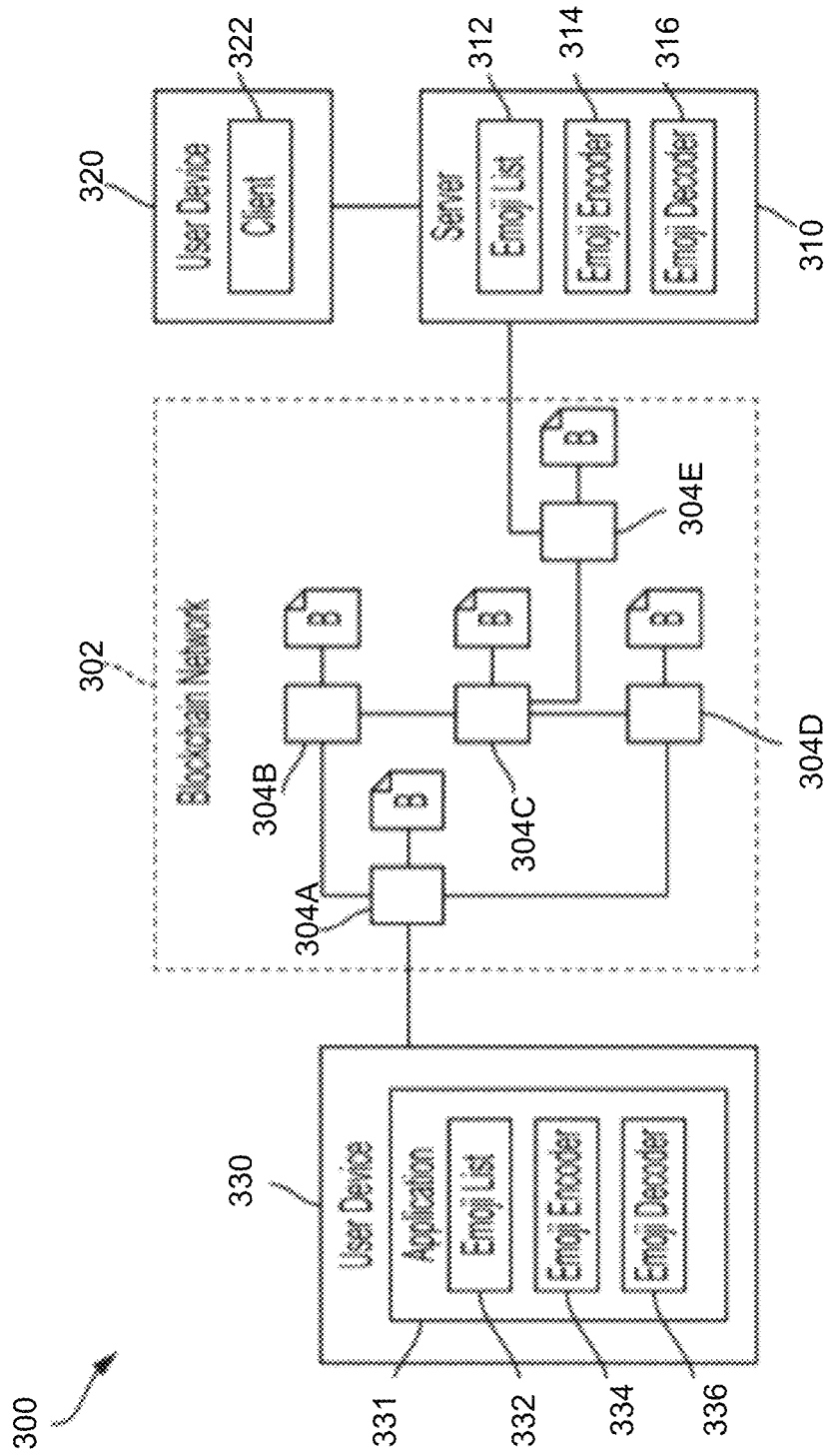
FIG. 3 illustrates a block diagram of a system for using emoji sequence IDs for identifying wallet addresses of blockchain wallets.

FIG. 3 illustrates a block diagram of a system 300 for using emoji sequence IDs for identifying wallet addresses of blockchain wallets. System 300 includes a blockchain network 302, user device 320, user device 330, and server 310.

As shown in FIG. 3, blockchain network 302 includes a plurality of nodes 304A-E (e.g., servers) that each maintain respective copies of a blockchain. In actual practice, blockchain network 302 may include hundreds or thousands of nodes. In some embodiments, blockchain network 302 may be a distributed peer-to-peer network as is known by those skilled in the art. In some embodiments, blockchain network 302 of nodes 304A-E implement known consensus algorithms to validate transactions submitted to blockchain network 302. A verified transaction may include transferred cryptocurrency, contracts, records, or other information to be recorded to the blockchain. In some embodiments, multiple transactions are combined together into a block of data that is verified across blockchain network 302. Once verified, this block of data can be added to an existing blockchain maintained by each of nodes 304A-E.

In some embodiments, a user can initiate transactions to be submitted to blockchain network 302 using user device 330. For example, the user may submit a transaction using application 331 configured to interact with blockchain network 302. For example, application 331 may generate and transmit cryptocurrency transactions to node 304A for validation and verification. Application 331 may include software downloaded from a digital distribution platform (e.g., App Store on Apple devices or Microsoft Store on Windows devices) or a content server. In some embodiments, application 331 provides a graphical user interface (GUI) that enables the user to generate transactions between his or her blockchain wallet and a blockchain wallet of a target recipient of cryptocurrency funds. Conventionally, the target recipient's blockchain wallet is identified by a wallet address in a human-legible textual representation. For example, the wallet address may be a string of numbers and/or characters such as in a hex format, a Base64 format, or a Base58 format. As described above, requiring the user to enter long strings of numbers and/or characters into application 331 to identify the wallet address of the target recipient is inefficient and prone to error.

In some embodiments, to enable the user to use an emoji sequence ID to uniquely identify a target wallet address for a blockchain wallet in cryptocurrency transactions, application 331 can implement an emoji list 332, an emoji encoder 334, and an emoji decoder 336.

In some embodiments, emoji list 332 can be stored in memory of application 331 and include a predetermined list of emojis that are used to enable use of emoji sequence IDs to identify wallet addresses of blockchain wallets. In some embodiments, the predetermined list includes a subset of emojis selected from the emojis in the Unicode Standard. For example, a give emoji list 332 includes 1626 emojis selected from the Unicode Standard. In some embodiments, 1626 emojis are selected because three emojis selected from 1626 emojis can uniquely map to a four-byte value. For example, an emoji ID of three emojis selected from 1626 emojis may include $1626^3$ unique emoji IDs, which is less than 0.1% more unique values than the total possible number of unique values (i.e., $2^{32}$) that can be represented by the four-byte (i.e., 32-bit) value. As will be understood by those skilled in the art, other numbers of emojis may be selected to be part of emoji list 332 to represent different number of bits. For example, an emoji list 332 having 46 emojis can represent an 11-bit value using two emojis (i.e., two emojis result in 46*46=2116 unique emoji IDs, which provides slightly more unique values than the possible values, 2048, of an 11-bit value).

In some embodiments, emojis in emoji list 332 may be selected to be visually dissimilar to reduce the likelihood that the user enters an incorrect emoji when entering the emoji sequence ID identifying the wallet address of the blockchain wallet. For example, the emojis may be selected such that no two emojis depict the slight variations of the same object. For example, a single emoji for a cat may be selected and included in emoji list 332 and not the multiple emojis depicting cats with different expression (e.g., grinning cat, cat with tears of joy, and pouting cat, etc.).

In some embodiments, to permit conversion between emoji IDs and integer values, emoji list 332 includes a plurality of emojis associated with a plurality of corresponding values. In some embodiments, emoji list 332 can be stored as an array, in which each emoji in the array has a corresponding index based on its position in the array. Therefore, each value associated with an emoji may be an index assigned to the emoji. In other embodiments, emoji list 332 may include a table that stores a plurality of emojis and that stores a plurality of values corresponding to the plurality of emojis. In these embodiments, emojis in emoji list 332 that are pictorially similar may be associated with the same value. In some embodiments, a set of emojis that is pictorially similar can include a plurality of emojis that depict types of the same object. For example, emoji list 332 may include multiple flag emojis that are each assigned an associated value of, for example, 9.

In some embodiments, application 331 can include an emoji mapping list that maps a larger number of emojis to the emojis in emoji list 332. For example, the emoji mapping list may include all available emojis in the Unicode Standard (i.e., 3,341 emojis as of January 2022). In some embodiments, by selecting mapping emojis to emojis in emoji list 332, two or more emojis that are pictorially similar may be mapped to the same emoji. For example, two or more emojis that show a clock depicting different types may be mapped to the same emoji of a clock. The use of an emoji mapping list may normalize the possible emojis to a list of emojis that are selected to be visually distinct to reduce error during user entry as well as to enhance the ease of visually verifying entered emoji sequence IDs.

In some embodiments, emoji encoder 334 can be configured to generate an emoji sequence ID that uniquely identifies a wallet address, which includes a predetermined number of bits (e.g., a 128-bit address or a 256-bit address). In other words, emoji encoder 334 can encode the wallet address into a sequence of emojis such that every wallet address is uniquely represented by exactly one sequence of emojis. Further, a valid emoji sequence ID represents exactly one wallet address. The encoding and decoding functions performed by emoji encoder 334 and emoji decoder 336, respectively, are symmetric functions. This means that encoding a wallet address, a, to its emoji sequence ID, s, and then applying the decoding function to emoji sequence ID, s, will always result in the originally encoded wallet address, a.

In some embodiments, to generate the emoji sequence ID, emoji encoder 334 can map a predetermined number of bits of the wallet address to a predetermined number of emojis selected from emoji list 332. In some embodiments, the predetermined number of bits of the wallet address can be divided into a plurality of non-overlapping groups of sequential bits. For example, the wallet address may be divided into 4-byte chunks. Then, emoji encoder 334 can convert each group of sequential bits into an emoji ID including a predetermined number of emojis based on emoji list 332. Finally, emoji encoder 334 can generate the emoji sequence ID identifying the wallet address by concatenating each emoji ID for each group of sequential bits into an emoji sequence.

In some embodiments, emoji encoder 334 can implement a mapping algorithm to convert the wallet address into the emoji sequence ID. For example, the mapping algorithm may include a BIP39 algorithm, an Electrum scheme algorithm, or a simple mapping from emoji index to a 10-bit value for emoji list 332 having at least 1024 emojis. In some embodiments, emoji encoder 334 can implement a mapping algorithm that uses indices of emojis in emoji list 332 to convert a numeric value to a predetermined number of emojis.

In some embodiments, to generate the emoji sequence ID, emoji encoder 334 may calculate a checksum value for the emoji sequence. For example, emoji encoder 334 may apply a checksum algorithm such as the Damm algorithm to calculate the checksum value. Then, emoji encoder 334 may convert the checksum value into an emoji representation including a predetermined number of emojis. Finally, emoji encoder 334 may output the emoji sequence ID identifying the wallet address by appending the emoji representation for the checksum to the emoji sequence previously calculated.

In some embodiments, emoji decoder 336 can be configured to generate a wallet address, which includes a predetermined number of bits (e.g., a 128-bit address or a 256-bit address), that is uniquely identified by an emoji sequence ID. In other words, emoji decoder 336 can decode the emoji sequence ID identifying the wallet address into a sequence of textual representations that uniquely corresponds to the wallet address. In some embodiments, the textual representation can correspond to an alphanumeric format for the wallet address that is required by blockchain network 302 to process cryptocurrency transactions. For example, the sequence of textual representations may be a hexadecimal string, a Base64 string, or a Base58 string.

In some embodiments, to generate the sequence of textual representations that identifies the wallet address, emoji decoder 336 can map the sequence of emojis in the emoji sequence ID to a numerical value identifying the wallet address based on emoji list 332. In some embodiments, emoji decoder 336 can determine the numerical value using emoji list 332 to identify a plurality of values corresponding to the plurality of emojis in the emoji sequence ID. For example, for an emoji in the emoji sequence ID, emoji decoder 336 may use an index of the emoji identified in emoji list 332 as a value associated with the emoji to be used in generating the numerical value. In some embodiments, emoji decoder 336 can convert a generated numerical value into the sequence of textual representations that uniquely identifies the wallet address.

In some embodiments, emoji decoder 336 can apply a checksum algorithm on the emoji sequence ID to determine whether the emoji sequence ID is valid. For example, emoji decoder 336 may apply the checksum algorithm to check whether the last emoji in the emoji sequence ID matches a result of the checksum algorithm applied to the emoji sequence ID excluding the last emoji. As described above with respect to emoji encoder 334, the last emoji may be generated to represent a checksum value of the emoji sequence ID. In some embodiments, if the checksum fails, emoji decoder 336 can halt processing because emoji sequence ID is invalid. In some embodiments, emoji decoder 336 can generate a notification indicating that the sequence ID is invalid.

In some embodiments, one or more emoji checksum can be extracted from the emoji sequence ID to generate a resultant emoji sequence. In some embodiments, the resultant emoji sequence can be divided into a plurality of non-overlapping groups of sequential emojis. For example, for an emoji list 332 having 1626 emojis, the result emoji sequence may be divided into groups of 3 emojis, with each group representing a 4-byte value. Then, emoji decoder 336 can convert each group of sequential emojis into a textual representation including a predetermined number of bits based on emoji list 332. Finally, emoji decoder 336 can generate the sequence of textual representations identifying the wallet address by concatenating each textual representation for each group of sequential emojis.

In some embodiments, functionality of application 331 may be performed elsewhere in system 300 such as on one or more of nodes 304A-E in blockchain network 302. In these embodiments, blockchain network 302 can be configured to be capable of processing transactions in which wallet addresses are identified using emoji sequence IDs. In some embodiment, an emoji sequence ID is a sequence of a plurality of emojis.

In some embodiments, functionality of application 331 may be performed elsewhere in system 300 such as on server 310. For example, server 310 includes emoji list 312, emoji encoder 314, and emoji decoder 316, which provides similar functionality as emoji list 332, emoji encoder 334, and emoji decoder 336, respectively. In some embodiments, server 310 may be a web server that enables users to operate a client 322 on user device 320 to access the functions of server 310. For example, client 322 may be a browser that enables the user to connect to a web portal or interface provided by server 310. Therefore, a user using user device 320 may initiate transactions to be verified by and added to blockchain network 302 via server 310.

Unique Digital Object Generation

Figure 4:
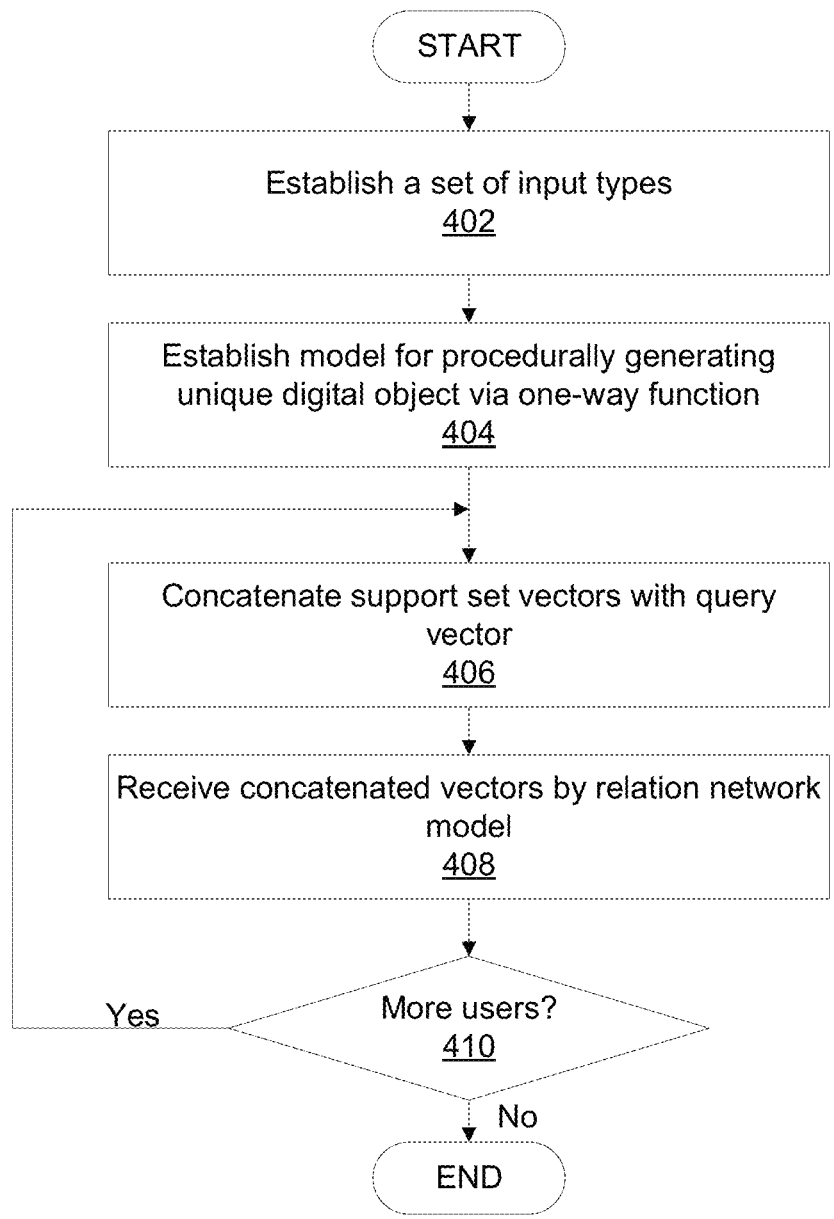
FIG. 4 is a flowchart illustrating platform generation of a unique procedurally generated object via user specific parameters.

FIG. 4 is a flowchart illustrating platform generation of a unique procedurally generated object via user specific parameters. In step 402, the digital object generator establishes a set of input types and parameters handled. Examples of the types of input include handled by various embodiments include any combination of cryptographic protocols, image data, or multimedia data.

Input handling refers to the types of input a given platform understands or recognizes. When designing input handling, the platform first recognizes what sort of input is given to it, and then when to do with the parameters of the input.

With reference to recognition of cryptographic protocols, a given input may be a cryptographic wallet, and the tokens associated therewith. In some cases, a given cryptographic wallet is associated with tokens from multiple cryptographic object types that each have their own smart contract, or blockchain upon which those objects are tracked. A common blockchain used for NFTs at the time of this application is the Ethereum blockchain. However, it is contemplated, that NFTs may operate on different blockchains in the future. A given token within a wallet typically has a call or an identifying feature that indicates which dApp the token is associated with.

With reference to image data, a given input may be a .jpeg or some other digital image format. In such examples, the file extension identifies what the input is, and the parameters thereof are identified via computer vision techniques. Similar input identification is applied to multimedia input.

Other data types may include user accounts, or game save files. Game save files often include data regarding characters the user has played, a total play time, items held by the user's character, choices the character has made, or other game related aspects. An example of a user account is a social media account, where data included relates to number of posts made, posts that had the highest amount of interaction (in any combination of negative/positive), number of followers, and other social media related aspects. Some embodiments of the present invention make use of these data types and parameters.

In step 404, the digital object generator establishes a model that procedurally converts the received user parameters and input into a digital object via a one-way function. The model used varies based on the style of input used. The process is ultimately transformative on the input and while, in some embodiments, the output may be indicative or reminiscent of the original input, computationally deriving the exact inputs from the output is not seen as a viable problem using modern computing techniques.

The simplest embodiment is a hash function the converts data embodied in a given format (e.g., binary, alphanumeric, ASCII, array of values, etc.) into a hash value. More complex embodiments make use of multiple models or schemes to convert multiple data types into a common data type/data structures and subsequently apply a model that generates an amalgamated output. For example, with respect to ERC-721 tokens, a model identifies exclusivity features of that ERC-721 token. The exclusivity features are identified via examination of the relevant smart contract using an associated dApp plugin/API with the ERC-721 token. The exclusivity features for that given token may differ based on the relevant smart contract the token is associated with, though some exclusivity features are relatively universal.

Examples of identifying exclusivity features include ID number (numeric count) or identifying the generation of the token as compared to the total number of generations of token. Generations in this context refer to how close the token is to originally minted tokens of the same smart contract. Generations are cycles or series of minting of tokens in a given smart contract. Typically, earlier generation tokens are considered more exclusive. Further traceable features include a number of times a given token has changed hands, a value of each exchange of that token in cryptocurrency or fiat, and rarity of visual features included with the token.

Rarity of visual features on a token varies on a smart contract by smart contract basis. In some cases, there is an algorithmic rarity of features dictated in the smart contract. In such cases, the rarity of visual features is a static lookup. In some cases, the rarity of a given visual feature or combination of visual features is determined via a survey of existing NFTs associated with a given contract. With respect to a cryptokitty, a rare color is "cloud white" coloring. In each case, a model evaluates these features and weights each and generating a respective weight across a given set of input for the user.

A type of model that has advantages over reviewing potentially dissimilar data types is a few-shot model. Initially the few-shot model is trained using various data that users associate with themselves. Examples include are social networking profiles, art, videos, audio recordings, virtual environments, ERC-721 tokens and associated protocols and dApps, and publicly posted Internet discourse. Training data typically refers to an enormous number of examples, such as hundreds of thousands or millions of examples. After being trained, the user specific parameters act as a few-shot. Each of the user input items need not be of a similar type, and the model will attempt to fit the received input into categories the model has been trained with. Each of the input parameters potentially has very little in common with respect to data types.

The few-shot model is designed to identify and extract particular media features in the few-shot (the user's specific parameters). A follow up model then identifies which features to use and what to do with those features. For example, a graphic feature of one element of user specific input may include a hat, while yet another graphic feature of a different element of user specific input may include a head. The model is trained that hats go on heads and that the graphic feature of a hat from one element may be transposed onto the graphic feature of the other element including a head.

Based on configurations of the model the resulting digital object may vary. One example of a resulting digital object is an ERC-721 token that includes a visual component. In some embodiments, the visual component takes exclusivity elements from the user's input and integrates those components into a single visual representation. A given example is a single image of a mashup of initial input. Another example is a 3D virtual environment that includes a set of trophies resembling the initial input. A third example is a written poem that rhymes various elements of the initial input. The digital object need not be an NFT. Rather, a digital object refers to a set of data that describes a discrete output in a digital format.

In step 406, a given user submits their user specific parameters to the digital object generator. In step 408, the model executes utilizing the user specific parameters and generals a user specific, unique, digital object. In some embodiments, the generation of the object is embodied by the minting of an ERC-721 token. In step 410, where there are additional users, the process repeats from step 406.

Figure 5:
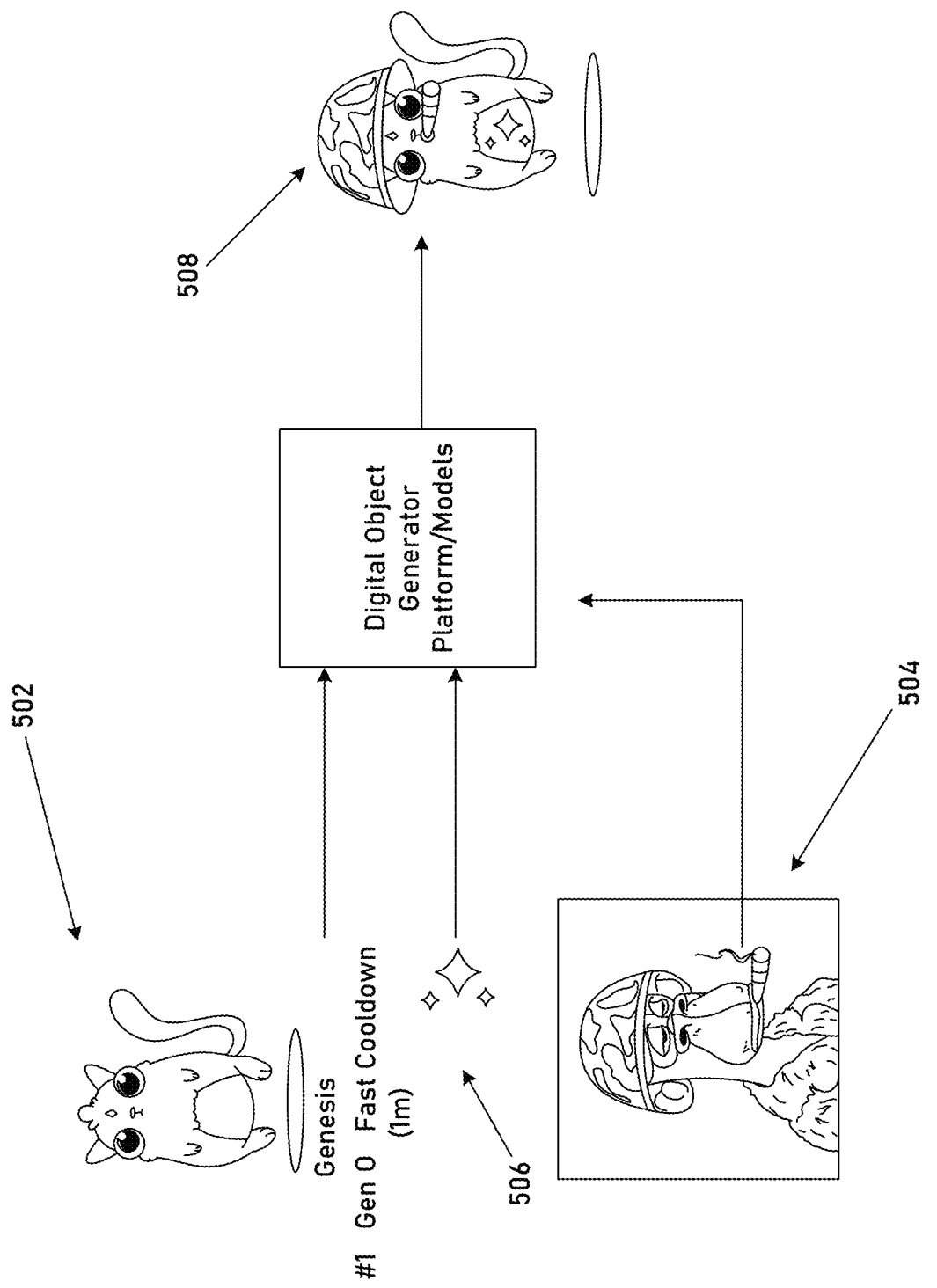
FIG. 5 is an illustration of a new digital object generated from a set of user input.

FIG. 5 is an illustration of a new digital object generated from a set of user input. The illustration includes three visual representations of existing NFTs, Specifically, a cryptokitty input 502, a Bored Ape input 504, and a Yat input 506 as provided as examples of initial user input. Each of the NFT's is further connection to a cryptographic record on a dApp, and the visual representation is interpreted by the respective dApp. A new digital object 508 is depicted that incorporates elements of the visual representation of each. In this illustrative example of the new digital object 508, the cryptokitty graphic of the cryptokitty input 502 appears with a hat and cigar graphic from the bored ape input 504, and the emoji of the Yat input 506 positioned on the belly of the cryptokitty graphic.

FSL embodiments applied to this particular set of input identifies each graphic feature of the user input. The cryptokitty input 502 is a cartoon cat, the cat has a head, a mouth, and a clearly delineated stomach area (among other body parts). The bored ape input 504 is a cartoon of an ape wearing a hat and smoking a cigar. The Yat input 506 is an emoji graphic.

Given the extracted features a model trained to select and combine the features that fit with one another matches a hat to a head a mouth to a cigar and an emoji graphic to an open space to position a graphic (e.g., well-defined stomach area).

The resulting digital object is the result of a one-way function. In the depicted example, one cannot, for instance, identify all of the details of the bored ape input 504, but may be able to identify that the original input included a bored ape based on the art style.

Figure 6:
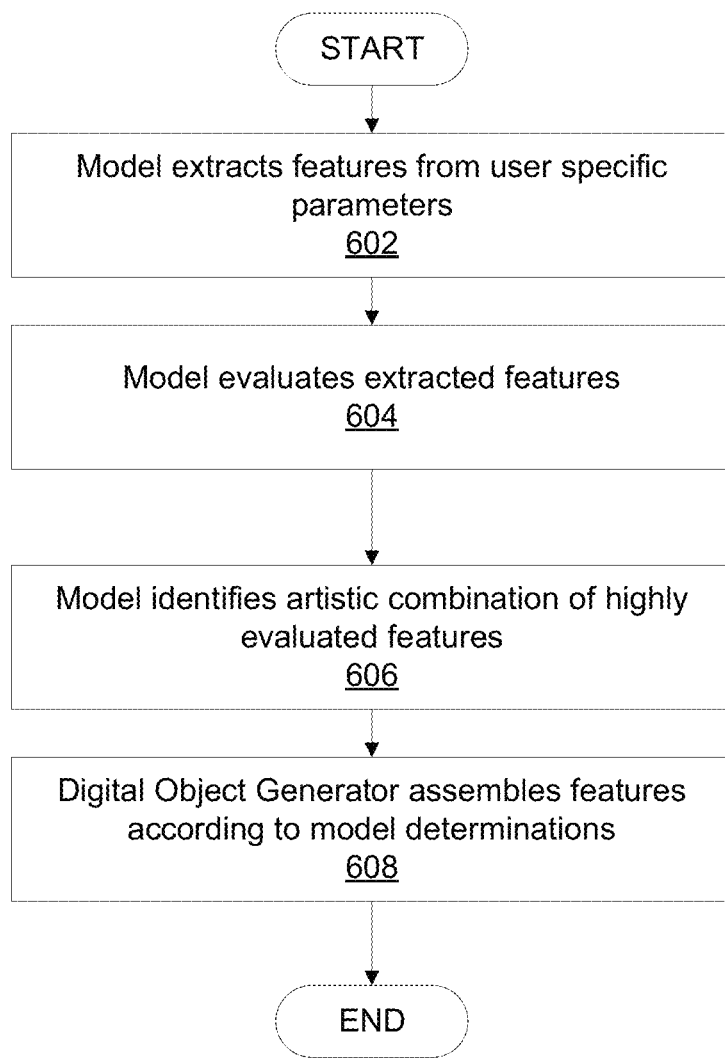
FIG. 6 is a flowchart illustrating model operation step of a unique procedurally generated object via user specific parameters.

FIG. 6 is a flowchart illustrating model operation step of a unique procedurally generated object via user specific parameters. In step 602, a set of user specific parameters are received by a feature extraction model. An embodiment of the feature extraction model is a few-shot model. The term "feature" refers to graphic features, audio features, cryptographic protocol features, video features, spatial virtual features, textual features, and/or social media features.

In step 604, extracted features are indicated to a feature evaluation model. The feature evaluation model identifies which of the extracted features to use in generation of the digital object. The model chooses features based on distinctiveness (e.g., how different they are from other available features), interoperability (e.g., how functionally a given feature can mix with another feature), and/or exclusivity (e.g., the rarity of a given feature).

In step 606, the chosen features are amalgamated by an artistic model. In some embodiments the artistic model and the feature evaluation model generate a result together. The artistic model is trained regarding what features go together. In some cases, "going together" is defined in the model semantically. That is to say, for example, that hats go on heads. That is a semantic connection between objects. However, some embodiments of the artistic model define "going together" as graphic matches between contours, colors, shadings, or other visual elements. For example, one curved element is a near match to another curved element, so one of those elements may overlay on another using curve matching. Similar to graphic matching, auditory matching may combine audio clips at a point where a similar note series occurs.

In step 608, once the elements are extracted, evaluated and combined, the digital object generator prints/mints the new digital object.

Time/Location-Based Modification of Digital Objects

User parameters have thus far been defined as something that solely a given user provides. However, in some embodiments, parameters used by the digital object generator are circumstantial to the minting request. Examples include a current generation/minting series of digital objects being generated, the serial numbers of the digital objects being minted, the timestamp the digital object is being minted at, or current events around the time of minting (e.g., The Superbowl, a concert, a convention, etc.). Location is identified as a device location of a user device requesting generation/minting of the digital object as associated with addresses, buildings, or events. Device location is determined via GPS data and/or wireless network triangulation. The location data is associated with the physical area by overlaying the location data on a mapping program that includes metadata of buildings and/or events at the physical area of the location data.

In some embodiments, the time/location-based modification is used as a salt or a randomization element to a given input set. In some embodiments, the time/location-based modification element is identifiable from the resulting digital object is (e.g., while the function is one-way, at least the time-based input feature is fully identifiable). Time/location-based input features enable an additional means of variation, distinction, and social features.

Figure 7:
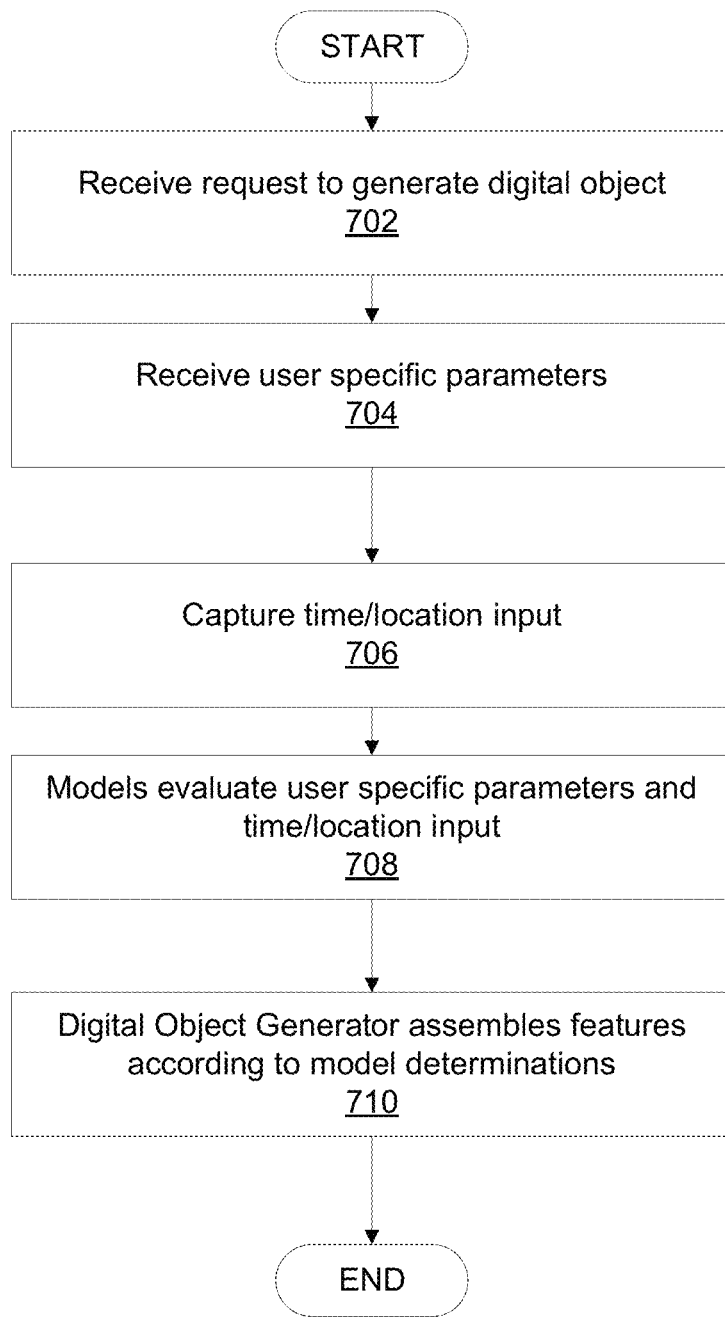
FIG. 7 is a flowchart illustrating implementation of time-based input to digital object generation.

FIG. 7 is a flowchart illustrating implementation of time-based input to digital object generation. In step 702, the digital object generator receives a request to mint a new digital object. In step 704, user specific parameters are received by the digital object generator. In step 706, one or more of a time element and/or a location element is captured based on any of the present time, the minting status of digital objects, and/or where the request of step 702 was made from.

In step 708, the models responsible for digital object generation evaluate the user specific parameters and the time/location element giving high weight to the time/location element. In step 710, the digital object generator mints a digital object including the time/location element.

Blockchain Tracing of Digital Objects

Like Emoji sequences as described above, embodiments of the digital objects are encodable to a distributed consensus network such as a blockchain. An example blockchain is the Ethereum blockchain, via ERC-721 tokens. Whereas emoji sequences have a finite number of potential characters, the digital objects described herein do not. A theoretical encoding scheme is unable to scale indefinitely to match the number of characters/elements/formats that embody a given digital object.

A means to limit the number of variables to represent in a given digital object is to limit the number of digital objects in any given series or generation (e.g., 1000 digital objects). Where a series or generation is encoded to a portion of a cryptographic token, encoding may be refreshed and reused in subsequent series. For example, a first data unit (e.g., a byte) is used to identify the generation of the digital object whereas subsequent data units are used to encode the visual features of the digital object. The same encoding is subsequently used in a different generation to refer to a different visual feature.

Figure 8:
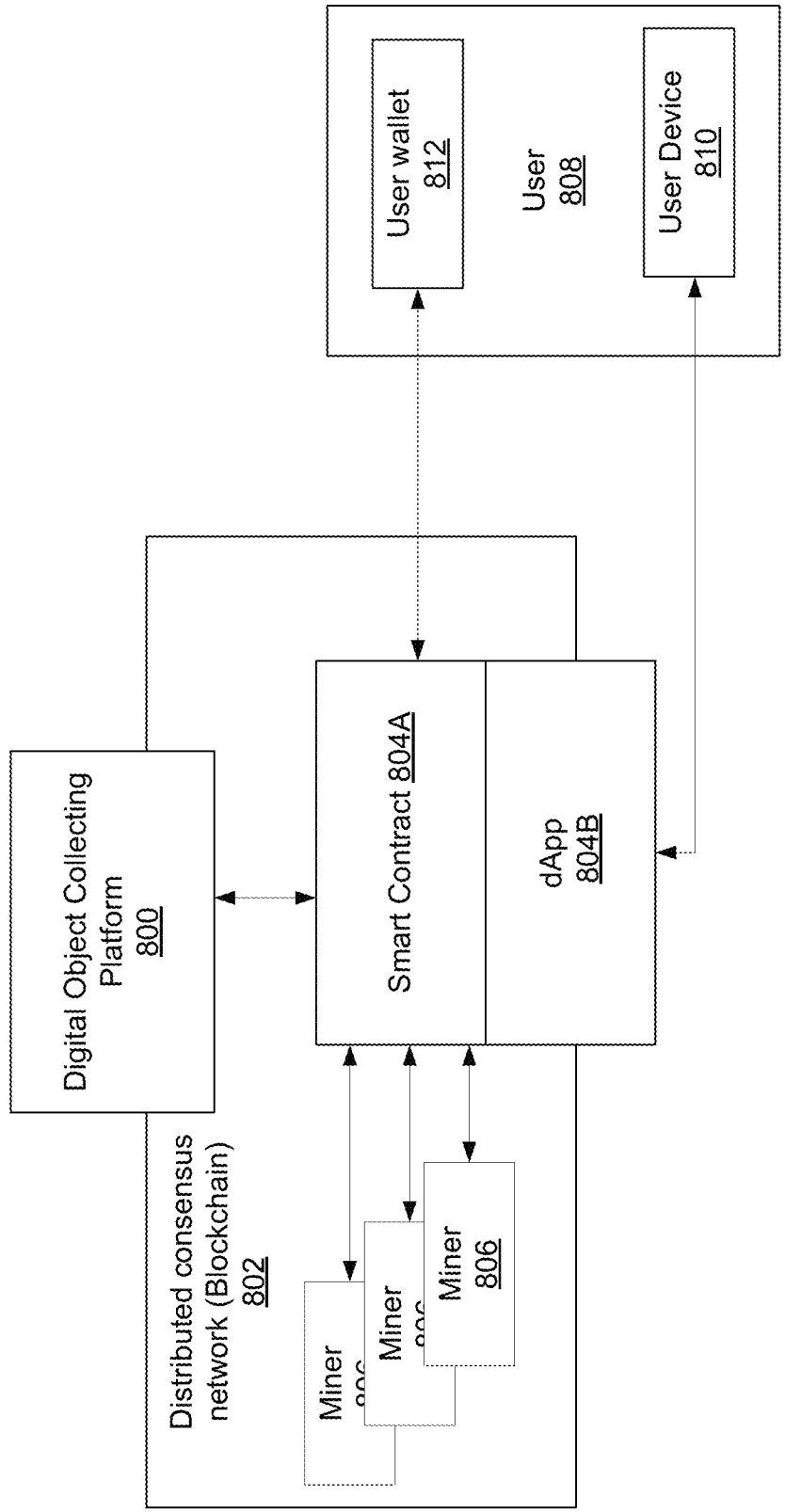
FIG. 8 is a diagram illustrating a connection between digital objects and a distributed consensus network supported by a blockchain data structure.

Generational divisions are also effectuated through event-based minting of digital objects. FIG. 8 is a diagram illustrating a connection between digital objects and a distributed consensus network supported by a blockchain data structure. A digital object creation platform 800 interfaces with a blockchain 802 via a dApp/smart contract 804A/B. The smart contract 804B is executed by miners 806.

When a user 808 requests minting of a new digital object via the dApp 804A, the dApp makes calls to other dApps connected with the user device 810 in order to identify other NFTs that the user has possession of via the other dApps. Embodiments of triggers to call other dApps include identifying other dApp software on the device 810 making the request to mint the new digital object, checking a list of popular dApps, and/or enabling the user to identify/flag (e.g., via GUI) which dApps they wish to flag for inspection for purposes of generating the new digital object.

In some embodiments, the dApp 804A ensures possession of the other NFTs used as input in the same user wallet 812 as the user wallet 812 associated with the initial request to generate the digital object. In this way, users are forced to actually own the NFTs that they are supplying as input for the generation of the digital object.

The check identifies the public key that is associated with both the user 808 (e.g., the requestor), and all of the user specific parameter/input. By nature of public keys being public information, no secret information need be shared with the dApp 804A.

Once minted, the dApp 804A delivers the new digital object as a cryptographic token/NFT to the cryptographic wallet 812 associated with the requesting user 808 via the smart contract 804A.

Figure 9:
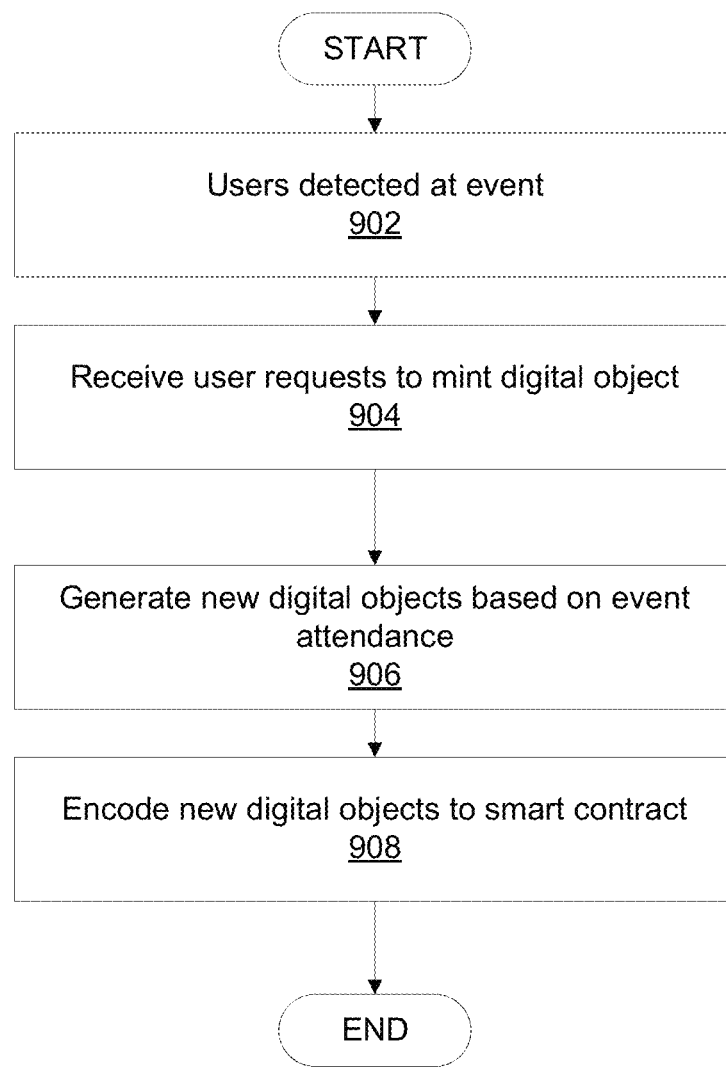
FIG. 9 is a flowchart illustrating event driven generation of digital objects.

FIG. 9 is a flowchart illustrating event driven generation of digital objects. Event driven digital objects aid in limiting the number of digital objects in a series or generation such that only digital objects that were generated during or at a given event exist, thereby limiting the total number. Limiting the total number serves both exclusivity of the digital objects and simplicity of coding the objects. Fewer digital objects mean fewer total variations across the entire set of digital objects and thus less data is required to represent the visual assets associated therewith.

In step 902, a set of users attend an event. Verification of attendance occurs in one or more of user device location data, ticket data, guest list data, user activity on a predetermined web host, and/or ownership of an NFT connected to event admittance (e.g., convention, gala, sporting event, etc . . . ). In step 904, during the event an attending user requests to mint a new digital object. In step 906, the digital object generation platform generates a digital object based on the event. In step 908, the non-cryptographic, user decipherable representation of the digital object is encoded to the smart contract using assets that are linked to the event.

Digital Object Social Networking Communities

Embodiments of social networks connect users based on possession of digital objects. A social network is a computing construct that connects users in a graph data structure including social features.

Figure 10:
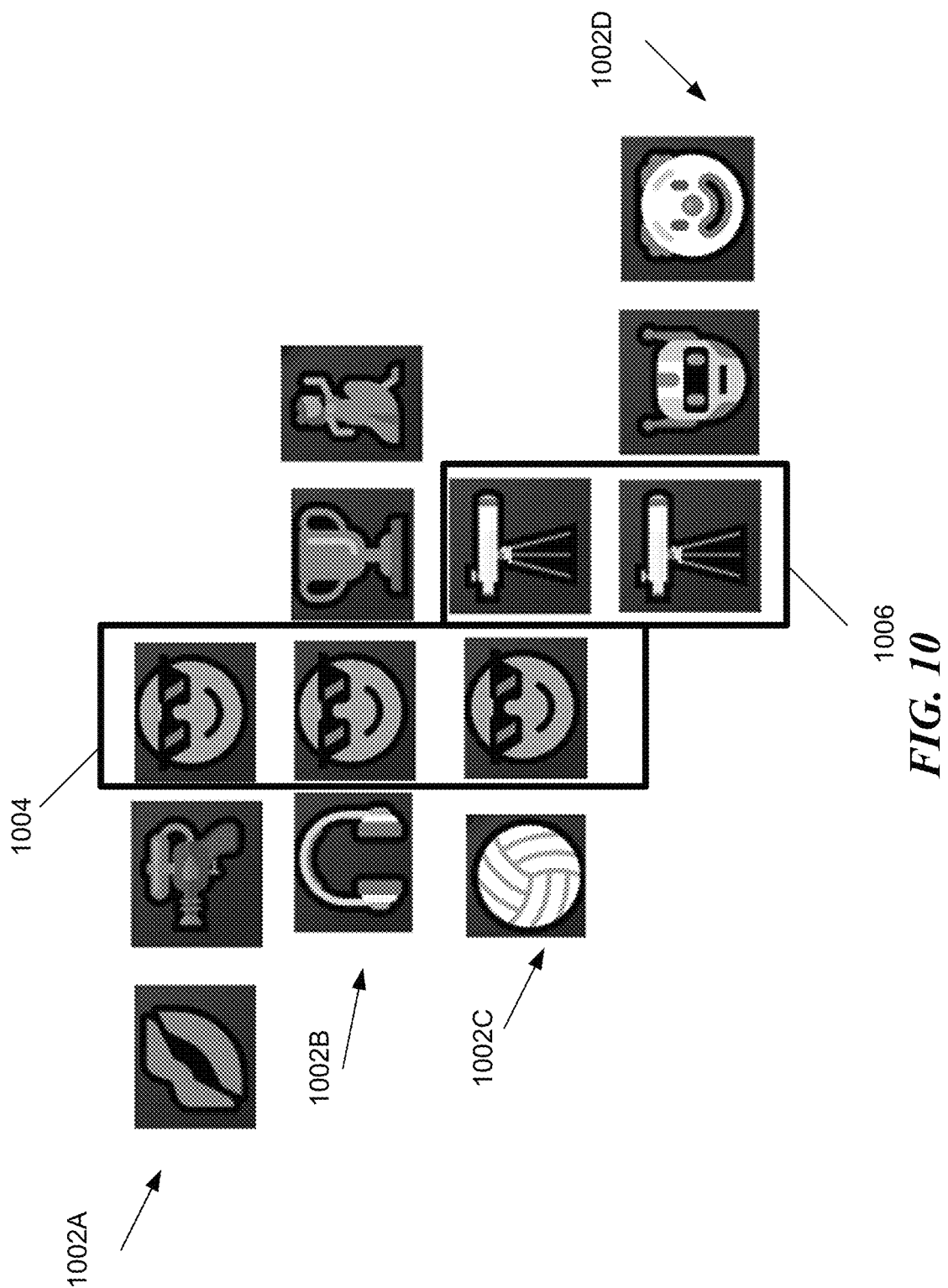
FIG. 10 illustrates a number of emoji sequences that are connected via social networking features based on the features included in each emoji sequence.

FIG. 10 illustrates a number of emoji sequences that are connected via social networking features based on the features included in each emoji sequence. Emoji sequences such as those under marketed as Yats include order specific sequences of emojis that are selected by their respective users. Users select particular sequences of emoji for any number of reasons, though some do so out of an affinity to a given emoji or series of emojis. Some users further use the sequence of emojis to tell a narrative.

Emoji sequences 1002A-D are arranged to align commonality between each sequence vertically. A sample social network for a user having possession of the emoji sequence 1002C is portrayed. Specially, the user in possession of sequence 1002C is connected 1004 to users in possession of 1002A and 1002B by virtue of sharing a sunglasses smiley emoji in each respective emoji sequence. In some embodiments (not pictured), social connections are limited to those emoji sequences that position matching emojis in matching sequence locations.

Emoji sequence 1002C and 1002D are further socially connected 1006 based on similar inclusion of the telescope emoji. In some embodiments a degrees of connection analysis (e.g., "6 degrees") is performed to further connect users associated with emoji sequences. For example, the user associated with emoji sequence 1002A is connected via one degree away from emoji sequence 1002D, via the social connection to 1002C. In some embodiments social features between connected users enable shared newsfeeds, message delivery, and/or interactive games.

While the illustrated example pertains to social connections via emoji sequences, similar social connections are established between digital object owners. For example, digital object owners that have respective digital objects that similarly made use of a give type of ERC-721 token are linked in the same way users with matching emoji use are linked (e.g., users that have a Yat, or users that have a cryptokitty, etc.).

Social media users frequently craft an image or identity around their profiles. However, existing social media profiles are static based on a given set of settings or preferences. That is, changes to a social media profile are preconfigured or require active participation by the user to make changes to their profile. Embodiments of the unique digital object disclosed herein are implemented as "profile pictures" or otherwise customizable social media expressiveness. IN some embodiments, a novel profile picture cycles through a set of user submitted input. An example of such a profile picture cycles through visual representations of cryptographic tokens linked to a cryptographic wallet they control.

Some embodiments of the profile picture unique digital objects make use of 3D shapes such as polygons or spheres.

Figure 11:
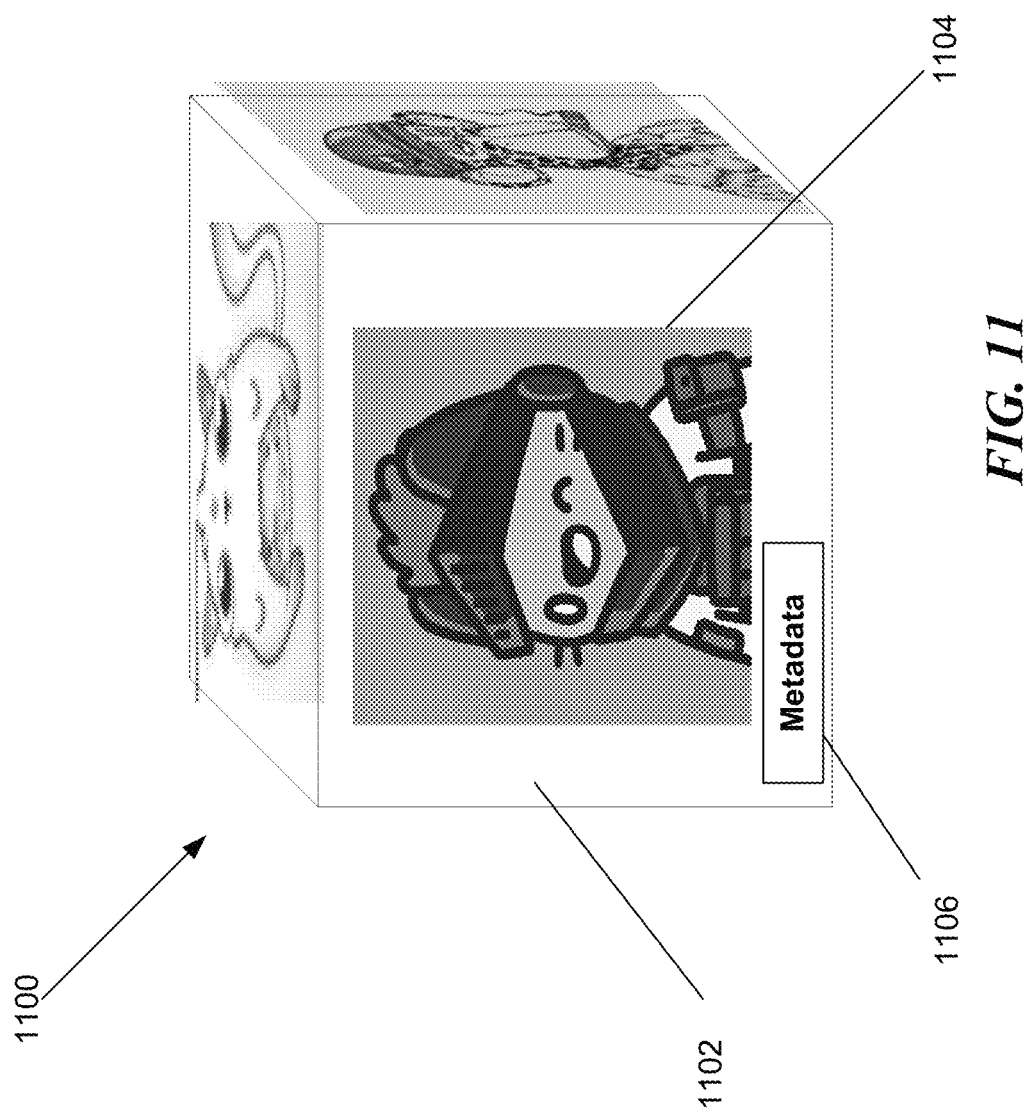
FIG. 11 is an illustration of a 3D graphic object.

FIG. 11 is an illustration of a 3D graphic object 1100. An embodiment of a 3D graphic object 1100 is a 3D polygon including six faces (e.g., a cube) that displays user supplied input/content. An implementation of a social media profile making use of the 3D graphic object 1100 presents the 3D polygon on the social media profile in place of a profile picture or other element of the social media profile. The cube revolves (e.g., following a random or preconfigured path through faces) and/or may be dragged into a given position by a user. The preprogrammed path follows a user selected order, or a preconfigured setting (e.g., display faces as chronologically added, display faces with fewer impressions first).

In some embodiments, user interaction with the 3D graphic object 1100 in predetermined ways is logged in the social networking platform. For example, spinning, clicking, dragging, or swatting the 3D graphic object 1100 is recorded as social interactions including options such as: "like", "dislike," "follow," "friend request," "post," and/or the like.

The 3D polygon enables some liquidity to a user's self-selected persona/profile picture. Multiple images or avatars 1104 exist simultaneously for that user as each is represented on a face 1102 of the 3D polygon. The number of images/avatars 1104 are not limited by the number of faces on the polygon—rather, in some embodiments, faces rotate. For example, where the 3D graphic object 1100 is presented in a 2D plane, a face 1102 that is currently out of view or opposite a front face is modified to present a different image/avatar 1104. The digital object described herein may be implemented as an identity digital object.

FIG. 11 depicts use of a polygon (cube) with sides or faces 1102; however, spherical embodiments make use of surface regions instead of strict faces 1102. Surface regions occupy some predetermined portion of the surface of the sphere and acts similarly as a face. In some embodiments, the sphere is depicted as a globe, and the regions are depicted as "landmasses/continents" found thereon.

In some embodiments, the images/avatars 1104 implemented by the 3D graphic object 1100 are representations of cryptographic tokens (visual or otherwise). In these embodiments, there is further data or metadata 1106 that is associated with the cryptographic token. Examples of the metadata 1106 associated with a cryptographic token includes a smart contract or dApp that the token is connected to, the period of time the given user has held the token with their cryptographic wallet, the number of times the token has changed wallets, a list of prior users who held the token, a generation of the token, a serial number of the token, and/or a name of the token. The metadata 1106 is displayed by the 3D graphic object 1100. Some embodiments display the metadata on a forward-facing face 1102 of the 3D graphic object 1100.

Some social networking platforms make use of the metadata 1106 (even if not actively displayed) for tracking, analytics, impression data, advertisement placement, and matching purposes.

The 3D graphic object 1100 inserts directly into social media profiles where profile pictures or avatars traditionally are placed. In some embodiments, the 3D graphic object is given a more prominent position on the user interface of the social network, specifically taking up a greater portion of the page/window. Still other embodiments make use of the 3D graphic object in an extended reality (XR) setting. For example, is a digital or digitally augmented environment, the 3D graphic object 1100 follows the user or an avatar of the user around (e.g., as a pet or companion).

Figure 12:
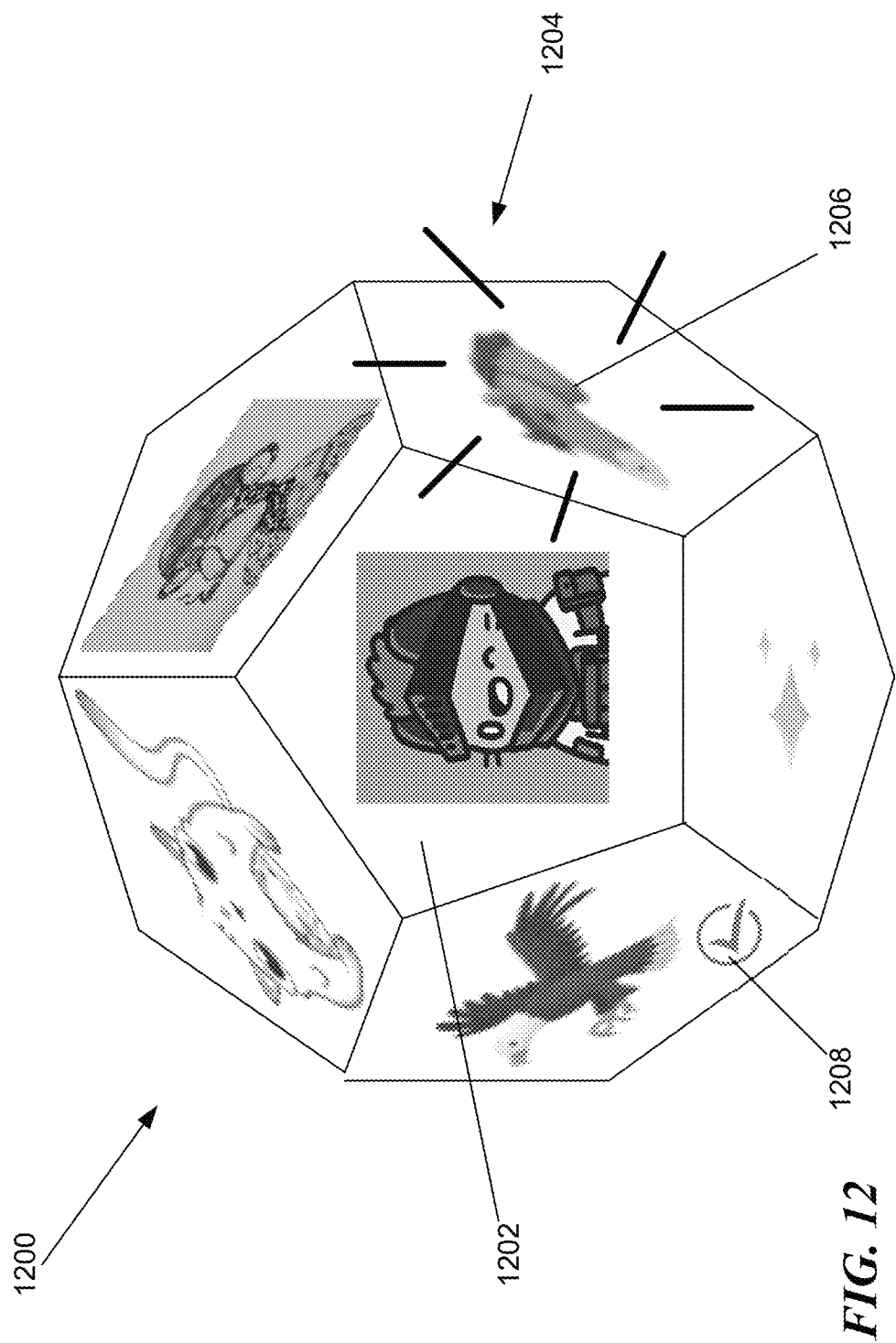
FIG. 12 is an illustration of a first set of additional features of a 3D graphic object.

FIG. 12 is an illustration of a first set of additional features of a 3D graphic object 1200. Where the polygon depicted in FIG. 11 is a cube, FIG. 12 depicts a dodecahedron. Various embodiments employ different numbers of faces 1202, fewer and greater. Various embodiments expand and contract faces 1202 based on user and/or platform settings.

In some embodiments, the 3D graphic object 1200 includes additional focus or highlighting 1204 on certain elements 1206 based on user and/or platform settings. For example, where a given element 1206 is newly included in the 3D graphic object 1200, a highlight glow 1204 is added to the appearance of the given element 1206 to alert users to the presence of the new element 1206. In another example, the highlight glow 1204 is applied to an element 1206 as chosen by the user.

In some embodiments, elements 1206 displayed by the 3D graphic object 1200 are verified 1208. Where a given element 1206 is a representation of a cryptographic token verification may be performed on the token to authenticate the token as being representative of an intended token. Token representations are digital data that can be copied and reproduced. Those representations may be subsequently linked to tokens that are not connected to a platform from which the representation originated. Therefore, a verification performed to ensure that the representation that appears on the 3D graphic object 1200 is linked to a cryptographic token that is connected to a smart contract or dApp consistent with the representation. For example, a cryptokitty graphic may be re-minted onto a cryptographic token that is unconnected to the cryptokitties dApp. Verification markings certify that the cryptokitty representation on the 3D graphic object 1200 is connected to a cryptographic token on the cryptokitties dApp/smart contract.

Verification is performed by human verification (e.g., a comparison of the token representation to the underlying token that the representation is drawn from), heuristic analysis (e.g., comparing known art styles of the representation to expected dApp's drawn from a popular list), or via a machine learning model that was trained on identification of token representations.

Figure 13:
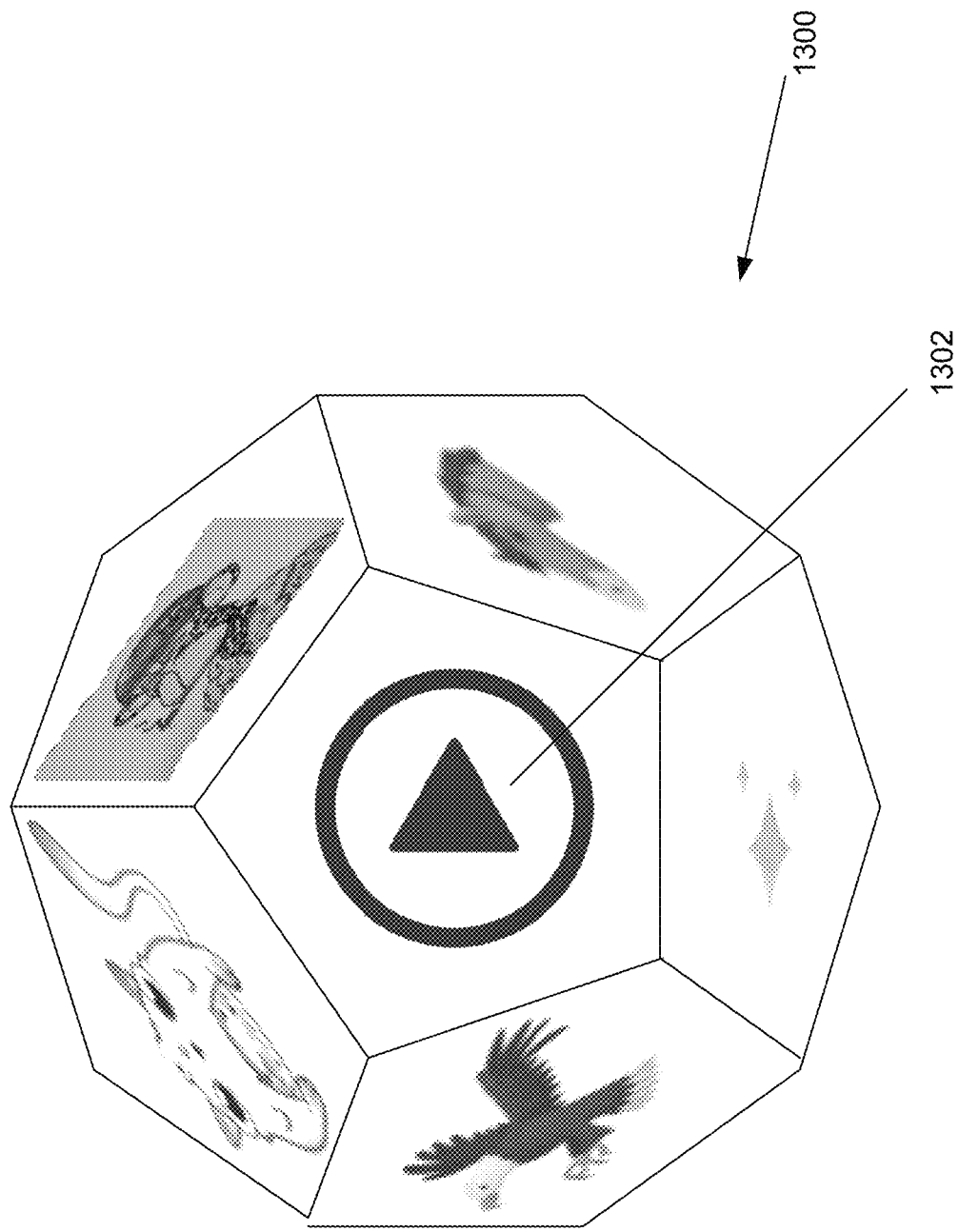
FIG. 13 is an illustration of a second set of additional features of a 3D graphic object.

FIG. 13 is an illustration of a second set of additional features of a 3D graphic object 1300. Not all elements 1302 included on a 3D graphic object 1300 need be images. Other examples include audio data, video data, or multimedia data. As depicted in the figure, a play button appears that users may interact with. Activating the play button triggers the underlying multimedia element 1302 to play.

Figure 14:
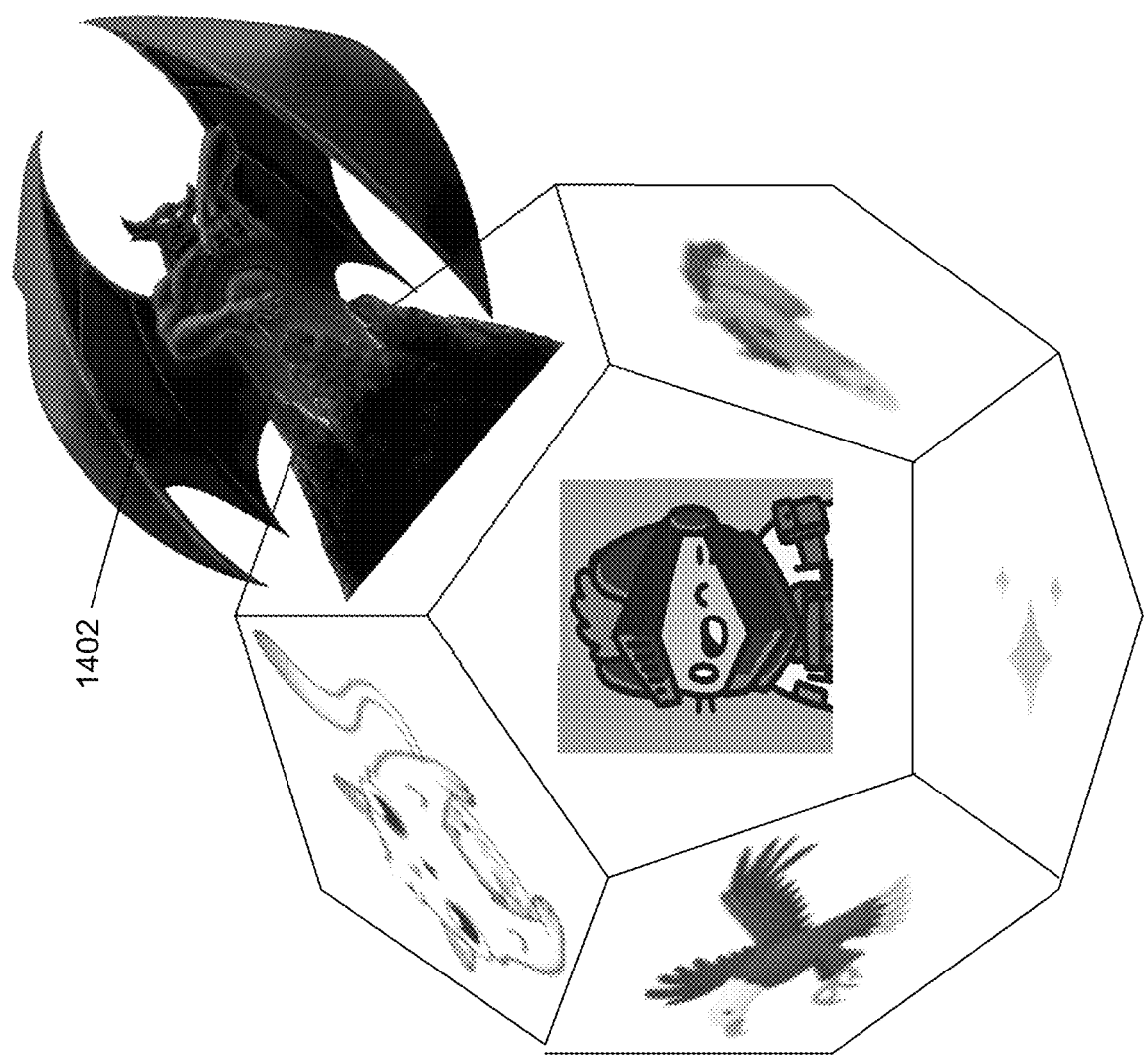
FIG. 14 is an illustration of a third set of additional features of a 3D graphic object.

FIG. 14 is an illustration of a third set of additional features of a 3D graphic object 1400. Not all elements 1402 included on a 3D graphic object 1400 need be represented in 2D. Examples include 3D renderings that extend out or inward from the 3D graphic object 1400. As depicted in the figure, an animated character appears bursting from the 3D graphic object 1400.

Figure 15:
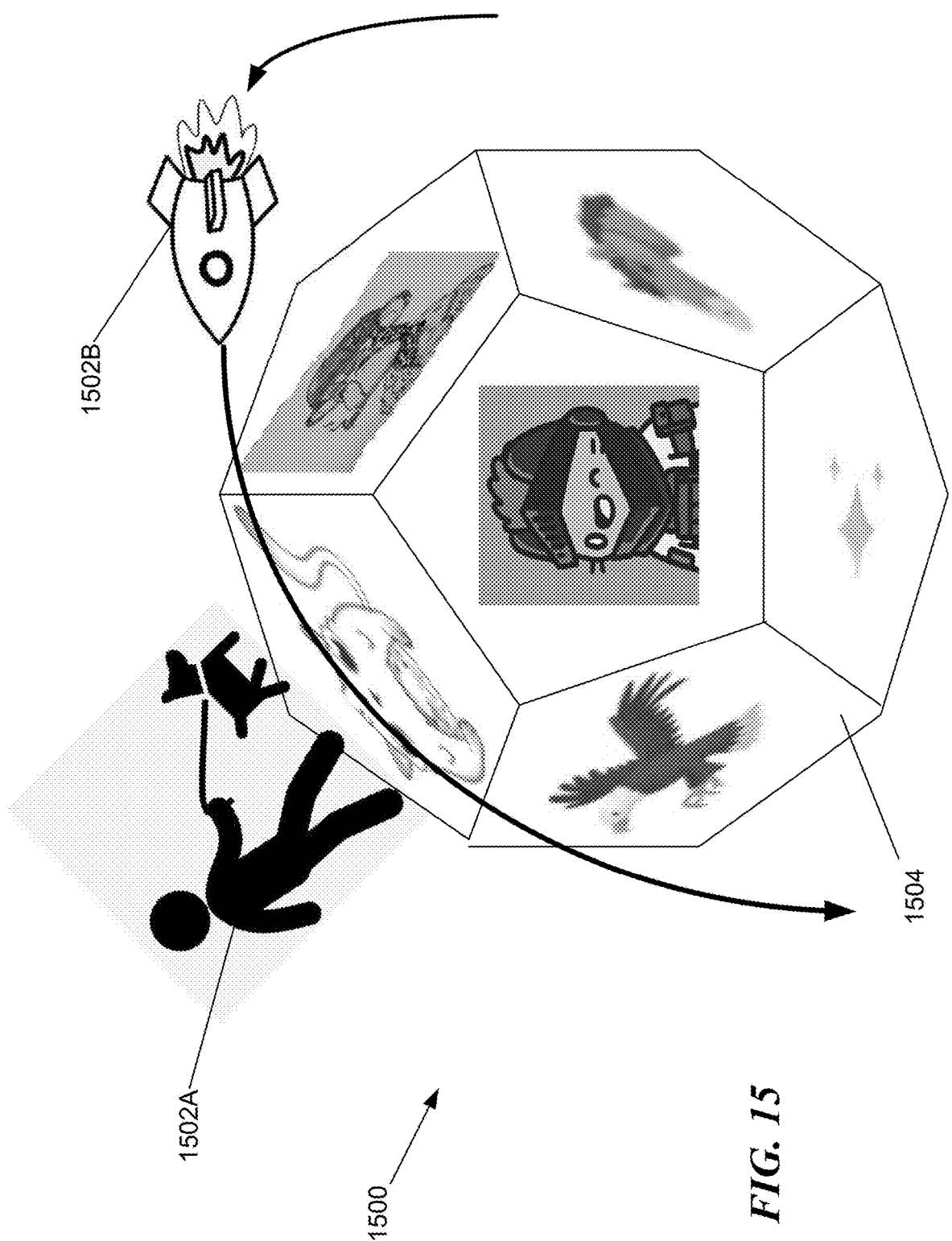
FIG. 15 is an illustration of a fourth set of additional features of a 3D graphic object.

FIG. 15 is an illustration of a fourth set of additional features of a 3D graphic object 1500. Not all elements 1502 associated with a 3D graphic object 1400 need be locked to the surface or face 1504 of the 3D graphic object 1500. Embodiments include orbiting elements 1502. The orbiting elements 1502 track around the 3D graphic object 1500. As depicted in the figure, an animated character 1502A appears to be walking a dog around the surface of the 3D graphic object 1500. Additionally, a spaceship element 1502B orbits the 3D graphic object 1500 at a distance. The orbiting elements 1502 as positioned in slots similarly to other elements included, the slots are merely associated with a different region relative to the 3D graphic object 1500 than those positioned on the faces 1504.

FIGS. 11 through 15 depict various features of various embodiments of 3D graphic objects. The figures are intended as illustrative examples and not to be construed as limiting combinations of features. The features are interchangeable, and embodiments include each combination thereof. Input used for the 3D graphic object may include any of the described user specified parameters described herein and/or pre-generated elements.

Figure 16:
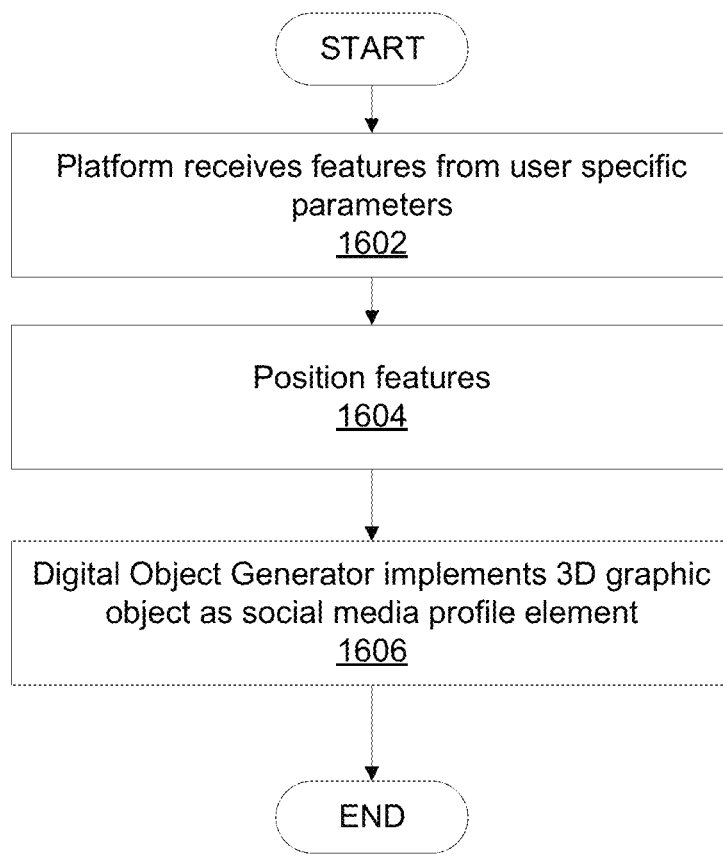
FIG. 16 is a flowchart illustrating a user interface applied to a 3D graphic object.

FIG. 16 is a flowchart illustrating a user interface applied to a 3D graphic object. In step 1602, a set of user specific parameters are received by an object generator. The user specific parameters are employed as elements in the 3D graphic object. User specific parameters refers to graphic representations, audio representations, cryptographic protocol representations, video representations, spatial virtual representations, textual representations, and/or social media representations.

In step 1604, the platform receives input regarding positioning and implementation of the user submitted parameters. The user is enabled to design the appearance of the 3D graphic object based on the user submitted parameters used as elements and the configuration of those elements.

In step 1606, the chosen features are amalgamated according to the configuration and the 3D graphic object is inserted into a social media profile of the user. In some embodiments the 3D graphic model is minted as an NFT. The minted version of the 3D graphic object may be implemented in any other portion of the disclosure herein where an NFT is referenced.

The above-described process directly refers to generation of the 3D graphic object, though other processes described herein may also generate 3D graphic objects as well. Generation thereof is not limited to the process depicted in FIG. 16.

Figure 17:
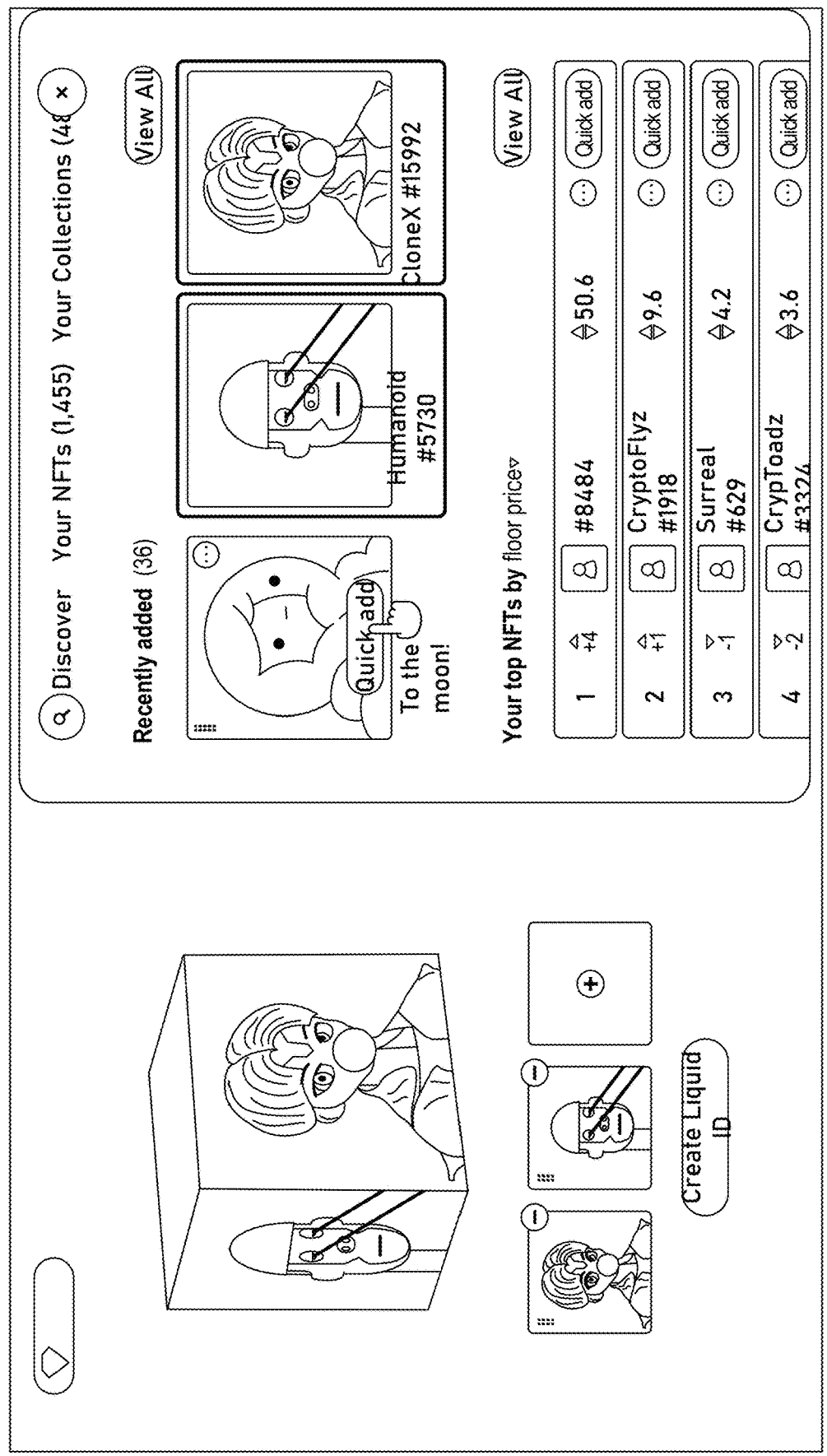
FIGS. 17 and 18 are screenshots of implementations of 3D graphic objects where a given set of media data is applied to faces of the 3D graphic object.
Figure 18:
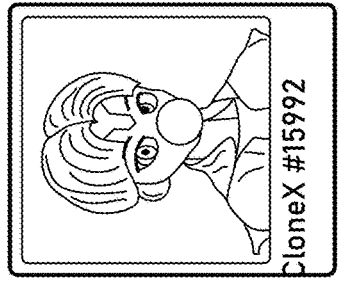

FIGS. 17 and 18 are screenshots of implementations of 3D graphic objects where a given set of media data is applied to faces of the 3D graphic object. One of ordinary skill in the art is able to ascertain embodiment and implementation details therefrom.

Additional social media features include indexed searches based on linked digital objects. Given a social media profile connected to a first user, indexed by an application server and searchable using a search function of an association social media platform, the user may link digital objects that enable search to identify the profile. Search for the social media profile is based on a query match to one or more predetermined fields of the social media profile, the one or more predetermined fields including a digital object field. Other fields include known details such as account name (real or otherwise), birthday, location, schools attended, employer, etc.

The digital object field refers to a digital object or token within the user's possession or previously in the user's possession. Where the digital object is a web3 object such as an NFT that is tracked on a blockchain data structure, on-chain history indicates both current ownership as well as previous ownership. When a given object is linked to a social media profile, that profile is searchable based on any recorded state of the digital object. For example, a search query may include a time threshold (e.g., possession within the last year, or possession within one week of object generation)

The digital object as a cryptographic object stored on a distributed public ledger includes a human decipherable representation. The human decipherable representation includes any combination of an image description, a generation number, a serial number, or an associated dApp. Where the cryptographic object is an amalgamation of multiple cryptographic objects the human decipherable representation is subdivided by each of the multiple cryptographic objects. In the embodiments where multiple cryptographic objects are used, the search query may be constructed to target one of the multiple cryptographic objects or multiple cryptographic objects at the same time for greater specificity.

Cryptographic objects further include elements that are not generally human decipherable, such as the cryptographic identifier of the object. Other elements, such as chain of ownership and time of ownership do not have human decipherable records; however, through use of graphic interfaces and chain viewer applications, time of possession elements are presentable in a human decipherable manner.

In response to a search query including the human decipherable representation or a subset of the human decipherable representation of the cryptographic object, the application server return the sought social media profile or a set of social media profiles that match the search query (included the target profile).

Examples of a search queries include "all users with cryptokitties", "all users who had a cryptokitty within 1 week of generation", "all users who have a second generation cryptokitty" or "the user who presently holds the cryptokitty having serial number 12,345 in generation 0."

In some embodiments, the social platform is directly linked to the user's cryptographic wallet and can therefore verify the authenticity of linkages between users and cryptographic objects. In some embodiments, the linkage to the wallet is via direct sharing of cryptographic keys that provides full access to the wallet. In some embodiments the linkage is proven via a zero-knowledge proof on performance of a zero-knowledge proof based on a digital wallet linked to the cryptographic object.

The zero-knowledge proof enables the owner of the cryptographic wallet demonstrate ownership of the wallet without revealing wallet credentials. The contents of the wallet are typically publicly observable, thus once the connection is established with the wallet, further evidence is not required to show ownership to the social network platform. Once a wallet is connected to the social network platform, the application server for the social network establishes listeners to monitor the wallet for changes to reflect on the social media profile of the user.

A Yat (an emoji sequence) is an example of a cryptographic object that a user may use to identify or index their profile. The emojis in the emoji sequence are individual characters that may be used to perform searches (either in specific order or not) for the social media profile.

Social Platform with Cryptographic Objects

By connecting a cryptographic wallet to a social media profile, new interaction features are available. Cryptographic objects are collectables. Physical collectables, like trading cards are generally stored in binders. Collectors share with one another by laying out their binders to display their collection to one another. Children who have trading cards associated with games frequently do not play the associated game by the published rules to instead share their card binder with one another.

A need exists for a platform that enables owners of cryptographic objects to display their objects and carry on a conversation about those cryptographic objects. Thus, a graphic interface that presents the contents of a cryptographic wallet in a binder-like presentation is advantageous. In some embodiments, the binder-like presentation includes digital pages with flipping animations. The pages include renderings of the visual representations of the cryptographic objects. In other embodiments, the binder-like presentation is a simpler presentation of the visual representations of the cryptographic objects in a scrollable page, window, or web object.

In some embodiments a social media profile defined by a Yat (emoji sequence) has a linked cryptographic wallet which includes a record of on-chain behavior (e.g., dated ownership or participation in cryptographic object drops/projects). Based on that on-chain behavior, users may opt-in to groups they have qualified to enter. Social groups may be public or private. Public groups are configured to influence a broader social feed. For example, when members of a group trend toward collecting a new set of cryptographic objects, a public newsfeed generates a notification.

Figure 19:
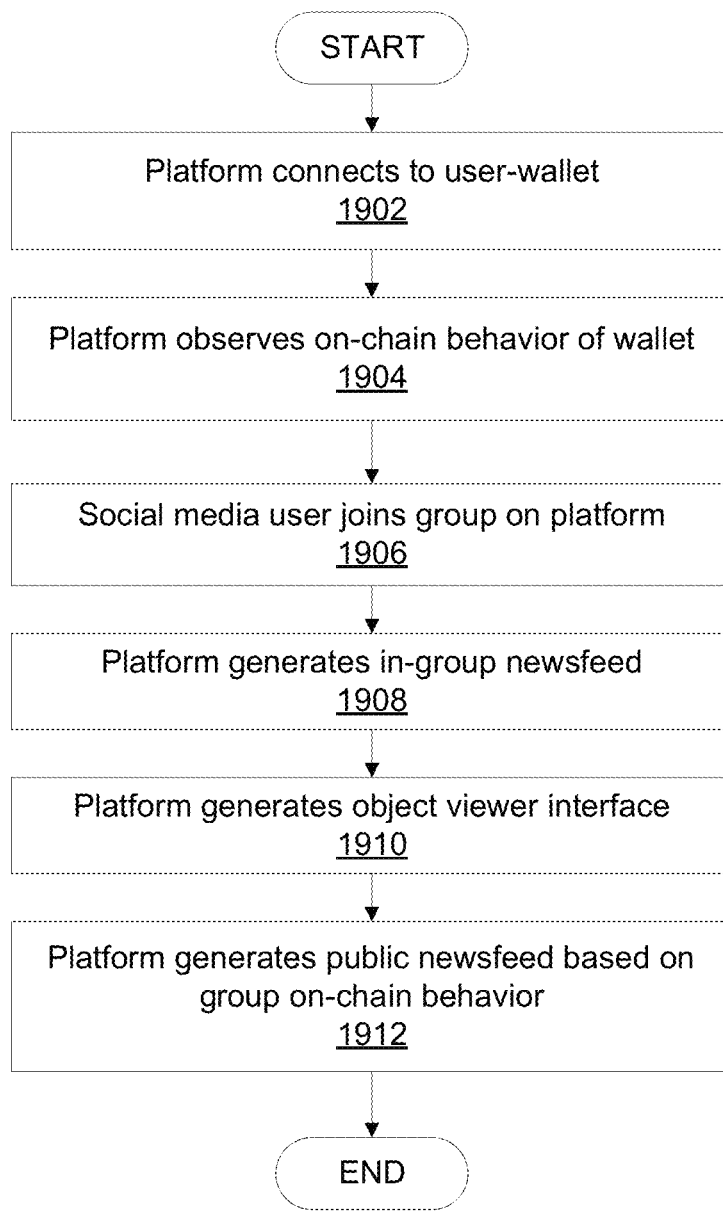
FIG. 19 is a flowchart illustrating graphic object social feeds.

FIG. 19 is a flow chart illustrating graphic object social feeds. In step 1902, a user links a cryptographic wallet to a social media user profile. The linking is based either on reveal of login credentials to the social platform, or via zero-knowledge proof.

In step 1904, the social media platform observes the contents of the cryptographic wallet and identifies the on-chain behavior of the user connected to the wallet. On chain behavior refers to current ownership, past ownership, ownership of a certain threshold of objects/tokens/coins, or a combination of thereof. Past ownership is definable based on absolute/binary statistics or time thresholds (e.g., held for a certain length of time, held within a certain threshold of a given timestamp or period, etc.)

Observing on-chain behavior is not human decipherable. On-chain behavior is connected to cryptographic records on the public blockchain data structure. Reference to a given cryptographic object is connected to machine inspection of many blocks in the data structure, many of which do not include reference to the sought or tracked cryptographic object. The process of observing requires scraping the blockchain for particular cryptographic objects.

For computational efficiency, the scraping or crawling of the blockchain only stores data related to wallets that are linked to the platform. In this way, the size of the database remains smaller than the entire blockchain itself, and calling the data is more efficient. New data is captured and added to the database based on listeners established for the relevant cryptographic objects and wallets. When a new wallet is added to the platform for tracking, the platform performs a more thorough machine inspection of the blockchain in order to capture the relevant wallet data into the database.

In step 1906, a user joins a social network group based on meeting certain on-chain behavior criteria. In some embodiments, users are invited directly to groups. Groups are public or private. Private groups include social features internally within the group, while public groups include both social features internally and externally to the group.

In step 1908, the platform provides an in-group newsfeed. The in-group news feed includes notifications reporting the current on-chain behavior of group members. Current on-chain behavior refers to the addition of new cryptographic objects to the respective linked cryptographic wallet, or participation in new cryptographic object projects (e.g., prior to the acquisition of a new cryptographic object).

In step 1910, the platform provides an object display interface that enables group members to display in binder-like graphical representations of the cryptographic objects linked to their wallets. In some embodiments, the binder-like presentation includes digital pages with flipping animations. The pages include renderings of the visual representations of the cryptographic objects. In other embodiments, the binder-like presentation is a simpler presentation of the visual representations of the cryptographic objects in a scrollable page, window, or web object. The object display interface further includes chat features, such as text messages, media messages, and voice channels.

In step 1912, the platform provides a public newsfeed. The public newsfeed is based on an analysis of public group behavior and trends. For example, a given group associated with current and past ownership of cryptokitties is observed to include a threshold percentage of users participating in a new cryptographic object drop. A notification is presented to the social network at large regarding the trend in participation. Other notifications pertain to tropics of newsworthiness.

Blockchain Explorer Platform

The typical behavior of NFT owners is to frequently acquire new digital objects. Determining which digital objects to acquire can be a difficult process for NFT owners. A blockchain explorer that displays not just the NFT searched for but also every related and commonly owned NFT makes the process of determining which NFT to acquire easier.

A given blockchain explorer platform searches the cryptographic ledger for all cryptographic wallets that contain NFTs. The blockchain explorer stores the image data associated with every NFT found in the cryptographic wallets. The image data is derived from underlying smart contracts that include the image data. and the blockchain explorer then links the image data to the corresponding wallet address. The blockchain explorer assigns a blockchain explorer identifier to each NFT. In some embodiments, the blockchain explorer identifier is a specific NFT. For example, a specific NFT refers to a singular NFT and the blockchain explorer identifier is the name of the NFT such as Bored Ape #6723 or Cyptokitty #1. In another embodiment, the blockchain explorer identifier is a category of NFTs. For example, a category of NFTs refers to all of the NFTs in a collection. Thus, the blockchain explorer identifier can be bored ape yacht club or Cryptokitties. In another embodiment, the blockchain explorer identifier is a unique identifier. An example of a unique identifier is the name of the owner of an NFT. A blockchain explorer identifier for Bored Ape #6723 can then be Snoop Dog (or a unique string that corresponds to Snoop Dog) because he owns that particular NFT. In another example, a unique identifier can be any randomly assigned words or numbers that make it easier to find a specific NFT, category of NFTs, or cryptographic wallet. For example, a blockchain explorer identifier of "green ape" can be used to search for all bored ape NFTs that contain the color green. In another example, a blockchain explorer identifier for a cryptographic wallet can be blue123 or kitten456.

In some embodiments, the blockchain explorer is configured to connect commonly owned cryptographic wallet addresses under one blockchain explorer identifier. For example, the connection can be based on the transaction times of two different cryptographic wallet addresses. If transactions involving the two cryptographic wallet addresses consistently occur within a set time window from each other, then the blockchain explorer can classify the two cryptographic wallet addresses as being commonly owned. For example, where two wallets act within a matter of minutes (e.g., 1, 5, 10, 20, <60, etc.) of one another on multiple occasions (e.g., predetermined threshold, >3, >5, etc.) these are assumed to be operated by the same user. In another embodiment, the blockchain explorer connects two cryptographic wallet addresses under one blockchain explorer identifier based on transactions consistently occurring between the two cryptographic wallets. For example, where the first cryptographic wallet is consistently involved in transactions with a second cryptographic wallet then the blockchain explorer can classify the cryptographic wallet addresses as being commonly owned.

In some embodiments, a user searches for a particular blockchain explorer identifier. For example, where the blockchain explorer identifier is a specific NFT, then the blockchain explorer searches the stored image data for the NFT and the NFT's associated cryptographic wallet address. The blockchain explorer then displays the specific NFT that was searched for along with every other NFT found in the associated cryptographic wallet address. In another example, if the blockchain explorer identifier is a category of NFTs, then the blockchain explorer searches for the stored image data and associated cryptographic wallet address for all NFTs in the searched for category. The blockchain explorer then displays every NFT in the category along with every other NFT that shares a cryptographic wallet address with at least one of the NFTs in the searched for category. In another example, if the blockchain explorer identifier is a unique identifier, then the blockchain explorer searches for the stored image data and associated cryptographic wallet address of each NFT that has been linked to the unique identifier. The blockchain explorer then displays each NFT linked to the searched for unique identifier along with every other NFT that shares a cryptographic wallet address with at least one of the NFTs that have been linked to the searched for unique identifier.

In some embodiments, the results of the search are displayed in a graphic user interface. An example of the graphic user interface displays the image data of the searched for blockchain explorer identifier. In another example, the graphic user interface displays the image data using a binder-analog as described above. Embodiments of the graphic user interface display a separate binder for each cryptographic wallet address containing an NFT linked to the searched-for blockchain explorer identifier. Each binder can contain the image data of every NFT in the cryptographic wallet. A user on the blockchain explorer viewer is enabled to view the binder similar to paging through a physical book. In some embodiments, the graphic user interface displays the binders containing the most in-demand NFTs in the form of a public newsfeed. For example, the most in-demand NFTs are those NFTs or collections of NFTs that are involved in the most transactions or have received the most bids for purchase. When a transaction occurs for an in-demand NFT, the public newsfeed displays the NFT's binder for all users of the blockchain explorer to see. This displaying of the most in-demand NFTs allows users to see which NFTs are involved in transactions and then helps the users make a more informed decision about their next NFT transaction.

Additionally, embodiments of a public news feed on the blockchain explorer are configured to automatically generate notifications. For example, a user of the blockchain explorer receives notifications anytime a transaction occurs for a certain NFT, category of NFTs, or blockchain explorer identifier. The blockchain explorer can identify these transactions by scraping or searching the immutable cryptographic ledger for all recent transactions.

Group-Related Event Presentation Platform

Aspects of the present patent document relate to a platform that provides social or group features for users that own cryptographic objects. Users are presented with a newsfeed or a presentation interface that is navigable to show cryptographic objects linked to wallets of group members. In some examples, the platform and interface evoke a virtual electronic analogue of collectible binders that collectors use to showcase respectively owned collectibles (e.g., stamps, cards, etc.). As described herein, the platform interacts with or uses a blockchain explorer to detect cryptographic objects and object activity for cryptographic wallet addresses associated with the group. As such, aspects described herein enable a particular group member to see cryptographic objects (or visual representations thereof) that are owned by other group members.

Thus, aspects described herein promote or establish an engaged community, in which activity and involvement among individual members is driven in large part due to visualization of group ownership of cryptographic objects. An individual member that sees the cryptographic objects owned by other members will also want to own their own cryptographic objects. With cryptographic objects being tied with values and rarities, some group members are motivated by envy or competition to also own rare and valuable cryptographic objects, or to trade for owned objects.

In an example scenario, Alice and Bob are users that collect cryptographic objects and that belong to a group or community of users. With Alice's collection being visualized and broadcast throughout the group, Bob discovers one of Alice's cryptographic objects and engages in a conversation with Alice about a trade or purchase. As another example, Bob seeks the attention of other group members and responsively mints or purchases more cryptographic objects to rival those owned by Alice.

That is, members become eager to actively deal in cryptographic objects in response to group-wide visualization or presentation of group-owned cryptographic objects. Excitement and involvement akin to collectors of real-world collectibles (e.g., baseball cards, game cards, stamps, tokens) is then captured via such a group-wide visualization or presentation of cryptographic objects.

In various aspects, visualization or presentation of cryptographic objects is linked to the cryptographic objects themselves. In particular, cryptographic objects include non-fungible tokens (NFTs) that are associated with image data that represent artwork, videos, animations, images, and/or the like whose ownership is indicated by the NFTs. Group-wide presentation of visual representations of the cryptographic objects then involves retrieval or obtaining the image data associated with specific cryptographic objects.

In some examples, a blockchain explorer (examples of which described herein) is used to locate and retrieve a visual representation (e.g., image data) linked to a given cryptographic object. In particular, the retrieval of the visual representation involves execution of a smart contract associated with the given cryptographic object, in some examples. An example smart contract includes an external link at which the data for the visual representation is obtained. Another example smart contract itself stores the data for the visual representation. Yet another example smart contract stores instructions for generating the visual representation for a cryptographic object.

Beyond visual representation of the cryptographic objects themselves, a need exists to demonstrate additional information related to the cryptographic objects. In particular, further than simply presenting linkage of certain cryptographic objects to the group, a need exists to demonstrate information related to object events that involve group-owned objects. For example, such object events include minting of new cryptographic objects, purchase or sale of cryptographic objects, exchange or trade of cryptographic objects, and/or other events that are expected to cause excitement or interest among community members.

Other object events include a group member holding onto a particular cryptographic object for a significantly long length of time, which plays into other group members' perception of the particular object (e.g., with respect to value). Again, indication of such an object event sparks conversation and involvement among group members. In an example, Bob would be impressed at Alice's restraint on holding a valuable cryptographic object for so long and would engage in individual or group discussion if Bob was made aware of such activity by Alice. In another example, Bob is inspired (e.g., competitively) to hold cryptographic objects for longer lengths of time if Bob is made aware of such activity by Alice.

Further, some object events among the group members are related, such as the minting of cryptographic objects belonging to the same collection or set by two different group members. Indication of such related object events prompts discussion among the group members and promotes a sense of social community among the group members.

Therefore, while group-wise visualization of cryptographic objects owned by a group causes some amount of engagement and excitement, further levels of excitement are unlocked if activities and events related to the objects are also indicated to the group members. Group chatter and conversation is likely to increase if group members are made aware on dynamic ownership and macro-scale activity related to the group-owned cryptographic objects.

Additionally, with a purpose of the platform and interface being the showcasing of many cryptographic objects owned by group members, such additional information needs to be demonstrated compactly. Otherwise, significant visual space is occupied by additional information, and a number of cryptographic objects that are showcased at a time is reduced.

Thus, the present patent document provides implementations related to the presentation of event signifiers with visual representations of cryptographic objects owned by group members, and example implementations discussed herein address at least the aforementioned needs. Event signifiers are used to signal the occurrence of individual object events or macro-level (e.g., group-wide, combined) events.

Event signifiers capture the attention of group members and cause excitement and participation among the group members in activities related to cryptographic objects. As such, excitement and interest in events that cause significant shifts in group dynamics increase, as the event signifiers to accompany said shifts are presented across the group.

In various aspects, the event signifiers include visuals, audio, or haptic feedback that directs the attention of a particular group member to events relevant to the group. As group events occur over time, these event signifiers form a dynamic, entertaining, and immersive presentation that makes the particular group member want to participate and get in on the action.

These event signifiers represent add-ons or supplemental presentations with visual representations of cryptographic objects, and the event signifiers are not permanently attached to the image data linked to a cryptographic object, in some examples. Instead, event signifiers are assigned to a cryptographic object for intentional presentation based on particular relevance to the group and relation to other group events. In some examples, the platform stores data that define the visuals, animations, audios, haptic patterns, and/or the like of event signifiers off-chain, and the platform assigns the event signifiers ad hoc upon occurrence of an object event.

Example event signifiers are configured to be compact and, while capturing the attention of group members, do not detract from the visual representations of the cryptographic objects themselves. Example event signifiers are tied to the visual representations of cryptographic object involved in or relevant to corresponding events. For example, a visual aspect of an event signifier includes a frame, bar, badge, overlay, or other visual add-on or indicator that is connected to or located near a visual representation of a cryptographic object within a presentation interface.

Example visual aspects of an event signifier are dynamic and include animations that are presented for a temporary length of time on the presentation interface. In some examples, exciting visual animations are presented in response to favorable and significant events occurring. For example, a "heating up" visual animation with rising flames is presented as multiple group members purchase cryptographic objects belonging to the same collection. In some examples, horrible, taunting, and/or dramatic visual animations are presented in response to unfavorable significant events occurring. For example, animated skulls or sad emotes are presented in the event of a group member selling a cryptographic object at a significant loss in value.

An audio aspect of an event signifier is played as a visual representation of a relevant cryptographic object appears in the presentation interface, played in response to user interaction with a visual representation of a relevant cryptographic object, and/or the like. The audio aspect invokes certain emotions or moods of the listener that correlate with a significance of the corresponding object event. For example, celebratory music is played when a significantly rare or valuable cryptographic object is minted by a group member. As another example, a foreboding audio snippet is played when a group member is about to hold a particular cryptographic object for longer than a record length of time.

In some examples, the event signifiers are pre-defined and correspond to various levels of event significance. The levels of event significance categorize object events according to values and volumes of cryptographic objects. As such, a given object event is categorized and assigned with an event signifier corresponding to the category, for example. The corresponding event signifier then indicates or represents the value or volume of cryptographic objects related to the given object event. In some examples, an event signifier indicates non-activity with a cryptographic object, such as holding the cryptographic object for an extended length of time.

In some examples, multiple event signifiers correspond to multiple levels, tiers, thresholds, or categories of value of cryptographic objects that are minted, purchased, or sold in a given object event. These levels, tiers, or categories by which event signifiers are assigned to an object event are defined with respect to fiat currency amount (e.g., USD), cryptocurrency amount (e.g., ETH, BTC), and/or the like.

Generally, the value associated with a given object event relates to the value of the cryptographic object(s) involved in the given object event. Further, in some examples, the value by which a given object event is categorized is a combined value of cryptographic objects involved in the given object event and in other related object events. These other object events are related to the given object event by occurring within a same pre-defined time period (e.g., an hour, a day, a week). Additionally or alternatively, the other object events are related to the given object event by involving cryptographic objects belonging to the same object collection or set as the given object event.

Specifically, in some examples, the other object events involve other group members, such that a combination of a given object event and other related object events remains relevant and insular to the group of users. As such, group activity, such as multiple group members minting objects from the same object set/collection, is identified and used to assign event signifiers to events. Another example of group activity includes multiple group members purchasing objects having values that surpass a given level, tier, or threshold. Thus, in this "macro-scale" example, each purchase of a valuable object by one of the multiple group members is a related object event, and the combined value or volume of the objects is used to assign an event signifier to each event.

In some examples, the value of a given object event relates to a relative value of the cryptographic object(s) involved in the given object event. That is, the relative value of a given cryptographic object describes a relative profit or loss with respect to (crypto)currency due to the given object event (e.g., a purchase or a sale).

In some examples, the value of a given object event relates to a set-wide value of an object set or collection to which the cryptographic objects of the given object event belong. For example, as a result of the given object event, a floor price of the object set or collection (e.g., the lowest value of an available object in the set) increases. Thus, this increase in floor price is included in the value of the given object event, in some examples.

Accordingly, a given object event is associated with a value by which the given object event is categorized and assigned with a corresponding event signifier. Example values include individual event values, combined event values, relative object values, set-wide values, and/or the like.

As indicated, a given object event is also associated with a volume by which the given object event is categorized and assigned with a corresponding event signifier. A volume of a given event refers to a number of cryptographic objects that are minted, purchased, sold, traded, and/or the like during the given event. In some examples, the volume of an event includes a set-specific volume, or a number of cryptographic objects belonging to the same object set or collection that are minted, purchased, sold, traded, and/or the like.

Thus, to determine the value and/or volume of a given object event in order to assign a particular event signifier to the event, event or transaction data recorded by the immutable cryptographic ledger is referenced. That is, the ledger records a value and volume of cryptographic objects involved in a given object event. The ledger also records (and is searched for) other related object events, and the value/volume of cryptographic objects involved therewith.

An example value of a cryptographic object is related to a floor price of the collection to which the cryptographic object belongs. The floor price is determined based on the lowest price of an available object of the collection. In some examples, the floor price is retrieved from an off-chain marketplace platform that manages, curates, or auctions collections of cryptographic objects. An example off-chain marketplace platform includes an application programming interface (API) at which a floor price of a particular object collection is queried.

As discussed, assignment of an event signifier to a given object event (or non-event) is based on a degree of non-activity. For example, based on comparing a length of time that an object is held to various thresholds, a particular event signifier is assigned to the presentation of the object. Lengths of time that an object is held are determined based on entries recorded in the immutable cryptographic ledger and timestamps associated therewith. For example, a holding time is determined based on a time that has elapsed since the holder first obtained the object.

In some examples, the levels, tiers, threshold, or categories with respect to value and volume are configurable by members of the group of users. In some examples, one or more designated group leaders of the group of users are permissioned to configure the levels, tiers, thresholds, or categories. As such, configuration and customization of categories and assignment of event signifiers to events is enabled for group members.

Accordingly, aspects described herein generally relate to detection of individual object events or macro-scale events, assigning of event signifiers to detected events, and presentation of the event signifiers to group members to inform on group activity. The event signifiers are presented with a navigable presentation of visual representations of cryptographic objects (a "binder"-like presentation), in some examples.

Presentation of owned cryptographic objects along with event signifiers that indicate activities related to the objects is exciting for users. Users are kept up to date on activities of their peers, and the users are accordingly encouraged to participate themselves. By directly seeing fun and dynamic signifiers with visuals and/or audio accompanying a purchase of a rare or valuable cryptographic object, a user is motivated to also purchase a rare or valuable cryptographic object. By being presented with an event signifier for others minting objects of a given collection, a user is also motivated to mint objects of the given collection. Group-wide participation, discussion, and enjoyment of cryptographic objects accordingly stems from group-wide presentation of cryptographic objects and event signifiers.

In some examples, the event signifiers are compact or low-footprint, and some event signifiers are suppressed in some instances. For example, when a large wave of object events are detected, a subset of the assigned event signifiers are suppressed. As such, a user is not overwhelmed and distracted from the visual representation of the cryptographic objects themselves.

Selection of certain event signifiers for suppression is based on the various levels of significance. For example, event signifiers corresponding to low levels of object value or volume are suppressed and non-prioritized.

Figure 20:
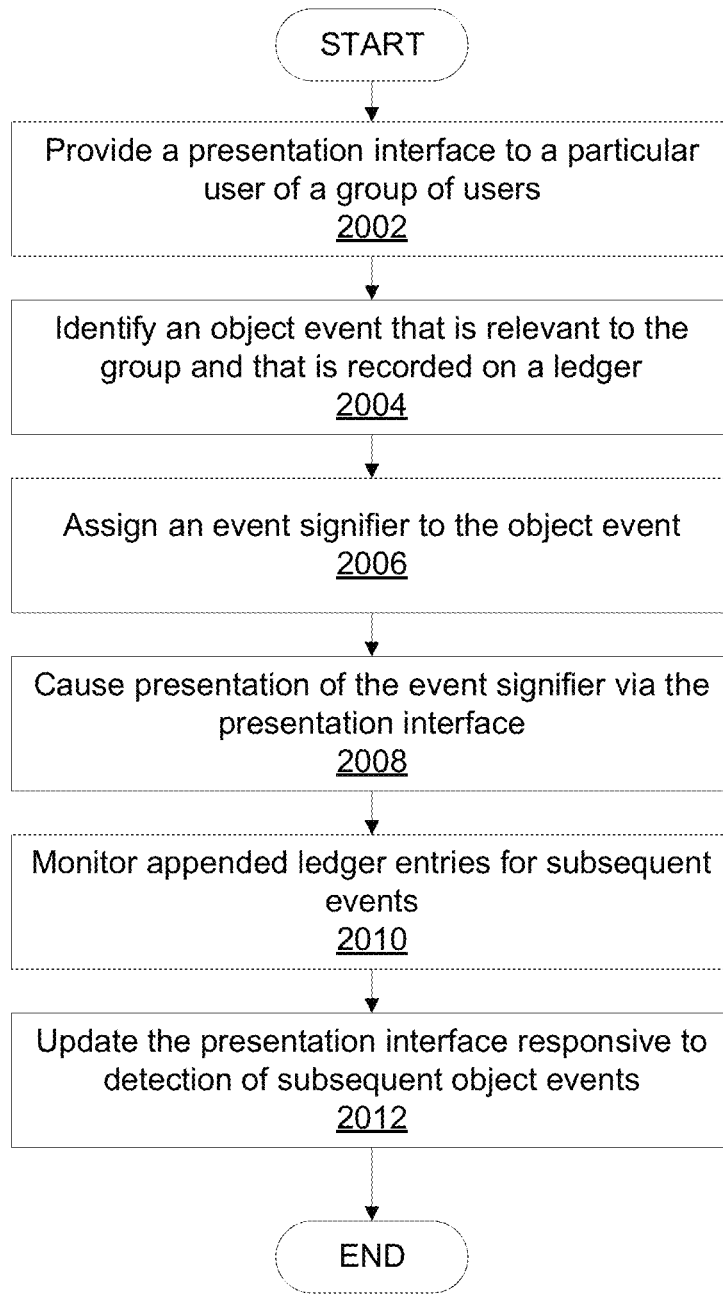
FIG. 20 is a flowchart illustrating example operations for presenting event signifiers with visual representations of cryptographic objects on a social or group-based platform.

Turning now to FIG. 20, a flow chart of example operations for presenting event signifiers on a social or group-based platform is illustrated. With the example operations, object events related to group members are indicated such that individual group members are informed on cryptographic object activity of other group members. Examples discussed herein are implemented in newsfeed-type interfaces that are navigable and dynamically update in response to the occurrence of new events. Thus, as object events occur, event signifiers are presented shortly thereafter.

In various aspects, examples relating to presentation of event signifiers are employed with example newsfeed interfaces and object display interfaces discussed herein. In some examples, the operations of FIG. 20 are performed by a newsfeed platform, a social platform, an event platform, a system implementing a newsfeed or social platform, and/or the like.

At step 2002, a platform provides a presentation interface to a particular user of a group of users. The group of users is associated with a plurality of cryptographic wallet addresses to which certain cryptographic objects are linked. Accordingly, an immutable cryptographic ledger is scraped or searched based on the plurality of cryptographic addresses to identify all cryptographic objects owned or linked to the users. In some examples, the presentation interface presents visual representations of the cryptographic objects owned by the group of users. For example, the presentation interface includes an interface provided according to example steps of the flow chart of FIG. 19.

At step 2004, the platform identifies an object event that is relevant to the group of users. Specifically, the object event is recorded by the immutable cryptographic ledger and identifies at least one of the cryptographic wallet addresses associated with the group. The object event is identified by searching or scraping the immutable cryptographic ledger based on the cryptographic wallet addresses associated with the group. In some examples, the ledger is specifically searched within a time window that has elapsed since the last time the presentation interface is provided to the particular user.

At step 2006, the platform assigns an event signifier to the object event. The event signifier includes at least one of an audio, a persistent visual, or a dynamic visual that are presented via the presentation interface. The platform assigns the event signifier to the object event based on a value and volume of particular cryptographic objects involved (e.g., minted, purchased, sold, traded) in the object event. In some examples, the platform assigns the event signifier to the object event further based on values and volumes of objects involved in other object events related to the object event, or a macro-scale or combined value or volume of objects across multiple object events.

In some examples, the platform assigns the event signifier based on a temporal aspect related to the object event. For example, the platform assigns a particular event signifier for a holding time for an object exceeding a threshold. As another example, the platform assigns a particular event signifier for an object that was held for a significant length of time finally being sold or traded.

At step 2008, the platform causes a presentation of the event signifier at the presentation interface. Specifically, the platform presents the event signifier in connection with visual representations of the particular objects involved in the object event in the presentation interface. For example, the audio of the event signifier is played when a visual representation of an involved cryptographic object appears or is interacted with in the presentation interface. As another example, the persistent visual of the event signifier (e.g., a frame, a bar, a badge) is visually tied to the visual representation of the involved cryptographic object. As yet another example, the dynamic visual of the event signifier is initiated when the visual representation of the involved cryptographic object appears or is interacted with in the presentation interface.

Said visual representations of the involved objects is tied to the newsfeed and/or object display interface discussed in relation to FIG. 19. For example, the newsfeed or object display interface is a "binder"-like graphic representation of cryptographic objects linked to the group of users, and the event signifier is presented within the newsfeed or object display interface.

At step 2010, the platform monitors the immutable cryptographic ledger for subsequent object events based on monitoring appended ledger entries of the ledger. For example, while the presentation interface (e.g., the newsfeed and/or object display interface discussed with FIG. 19) is being provided to the particular user, subsequent object events involving the particular user or other group members occur. The platform identifies these subsequent object events by searching or scraping the immutable cryptographic ledger based on the cryptographic wallet addresses of the group members. To conserve computing resources, the platform monitors the immutable cryptographic ledger only while the presentation interface is being provided to the particular user. For example, the monitoring is intended to enable updates on group activity to be presented to the user in an ad-hoc manner, or as the subsequent events occur.

At step 2012, the platform updates the presentation interface responsive to subsequent object events being detected. As with the aforementioned object event, the subsequent object events are assigned with event signifiers. The platform then updates the presentation interface to present visual representations of the objects involved in the subsequent object events, along with the event signifiers assigned to the subsequent object events.

In some examples, the platform further determines whether or not to suppress an event signifier assigned to an object event. As discussed above, a large wave or flood of object events occurring near simultaneously could result in an overload of visual or auditory stimulation to the particular user. Such overload distracts the particular user from the visual representations of the objects themselves and increases difficulty in understanding individual group events. As such, object events or their event signifiers are ranked, and lower-ranked event signifiers are suppressed, for example.

Turning now to FIGS. 21A-F, various example presentations and interfaces in accordance with aspects described herein are illustrated.

Figure 21A:
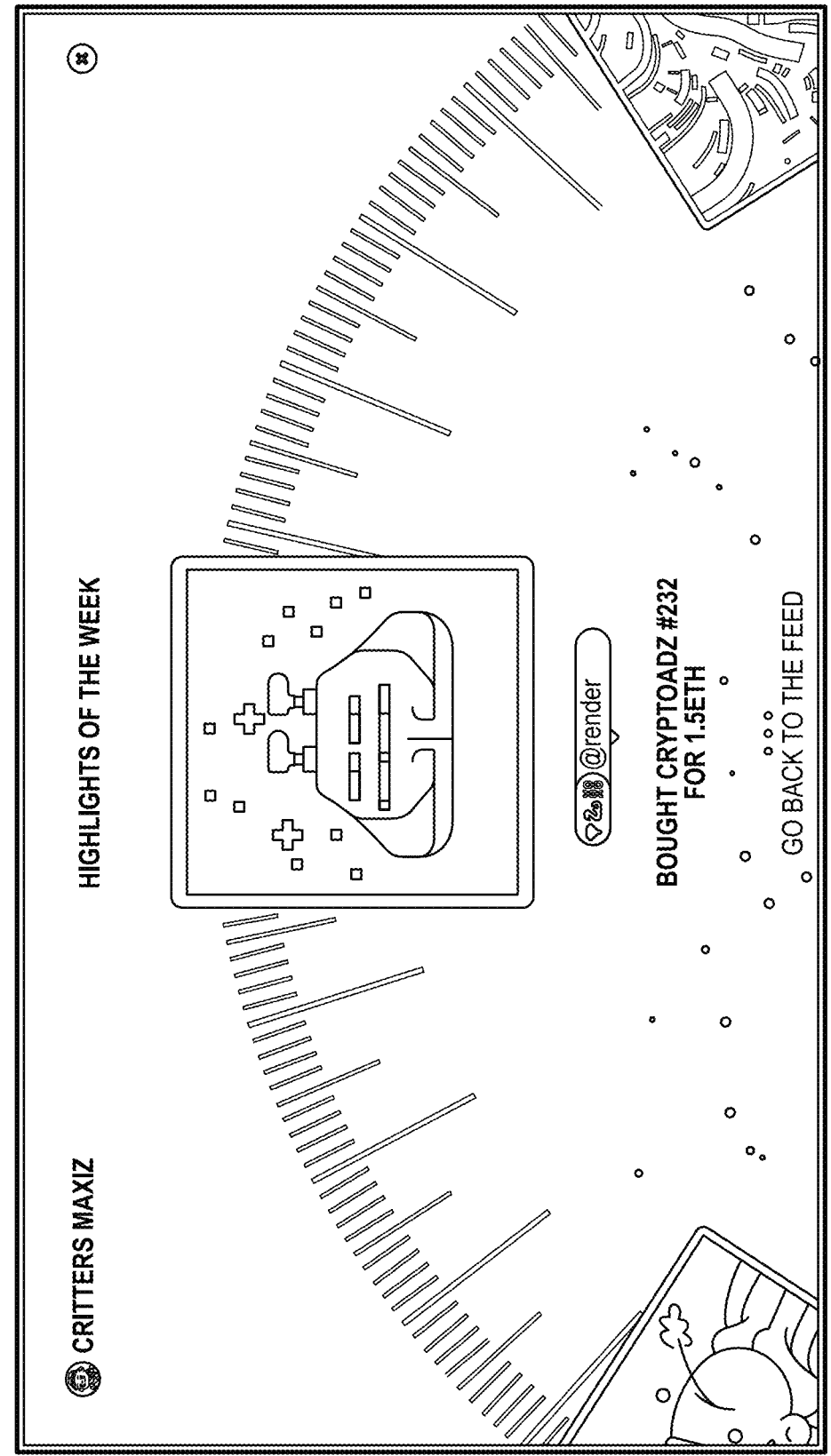
FIG. 21A illustrates an example user interface for presenting object events that have occurred since a time that the interface was last provided to a user.

FIG. 21A illustrates a highlight of the week, recap, or summary interface 2100. The summary interface 2100 indicates object events that have occurred since the last time the presentation interface was provided to a user. Specifically, the summary interface 2100 presents visual representations of the cryptographic objects involved in such object events, as well as event signifiers based on the value or volume of the involved objects. The summary interface 2100 thus makes a particular user aware of historical object events.

In some examples, the summary interface 2100 includes a rotating display that individually focuses and spotlights on each event for some time. In some examples, various animations and displays are presented to rank the past-occurring object events with respect to significance to value, volume, or temporal aspects. For example, an animation of different cryptographic objects rising above others is played to demonstrate different respective values or event significances.

In some examples, the platform presents the summary interface 2100 responsive to a user signing on or accessing the platform. As such, the summary interface 2100 is the first thing the user sees when accessing the platform and sets the user in the mood to see other exciting activity related to group-owned cryptographic objects being signified in the platform.

Figure 21B:
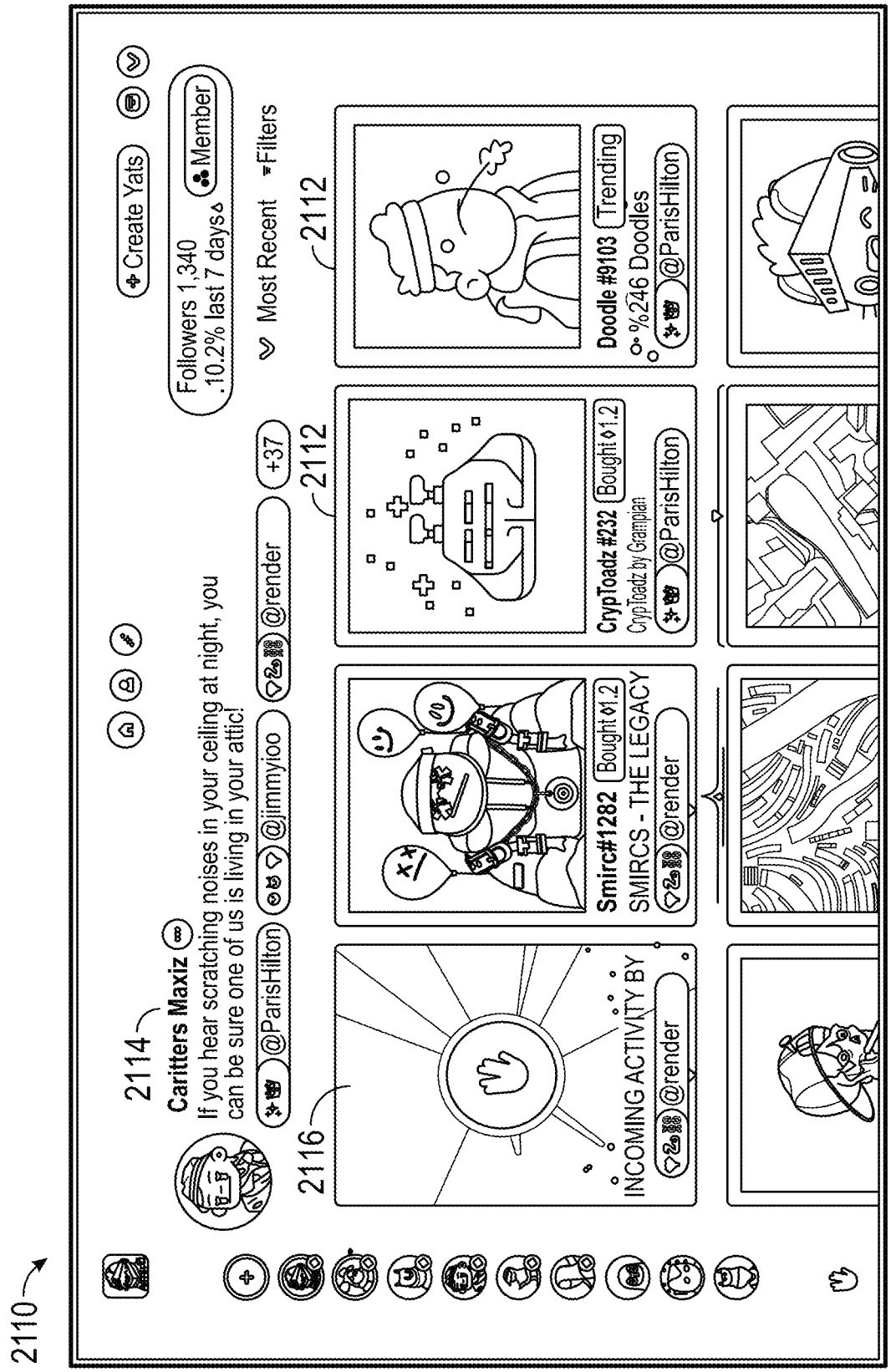
FIG. 21B illustrates an example user interface for dynamically presenting cryptographic objects that are linked to or that become linked to a group of users.

FIG. 21B illustrates a presentation interface 2110. The presentation interface 2110 is or includes a newsfeed and/or object display interface, as discussed with FIG. 19. As shown, visual representations 2112 of multiple cryptographic objects linked to various members of a group 2114 are presented.

According to newsfeed-like characteristics, the platform updates the presentation interface 2110 each time a new event relating to a cryptographic object owned by the group occurs. As such, the visual representations 2112 slide over and down to make room at the top of the "binder" space for visual representations 2112 of new cryptographic objects.

Upon detection of a subsequent object event (e.g., minting or purchase of a cryptographic object), the presentation interface 2110 is updated. As illustrated in FIG. 21B, a loading indicator 2116 is presented to indicated that a subsequent object event has been detected. In some examples, the loading indicator 2116 is a placeholder in anticipation of the visual representation of the involved object(s) being obtained and presented.

In some examples, the loading indicator 2116 includes a visual akin to a slot machine, or a visual configured to drum up anticipation for an upcoming visual. The loading indicator 2216 accompanies similarly anticipatory audio, such as a drum roll, increasingly loud chimes or rings, and/or the like. With the loading indicator 2116, the user is explicitly informed that additional group activity has occurred and that detailed information regarding the involved object(s) will soon be presented.

In some examples, the loading indicator 2116 is presented as the platform retrieves the image data linked to a cryptographic object for presenting the visual representation of the cryptographic object. As discussed, retrieval of the image data includes executing a smart contract for the cryptographic object to access an external link, to generate or recreate the image data, or to extract the image data from the smart contract itself. Thus, the platform presents the loading indicator 2116 in the presentation interface 2110 at least for the duration of such operations.

Figure 21C:
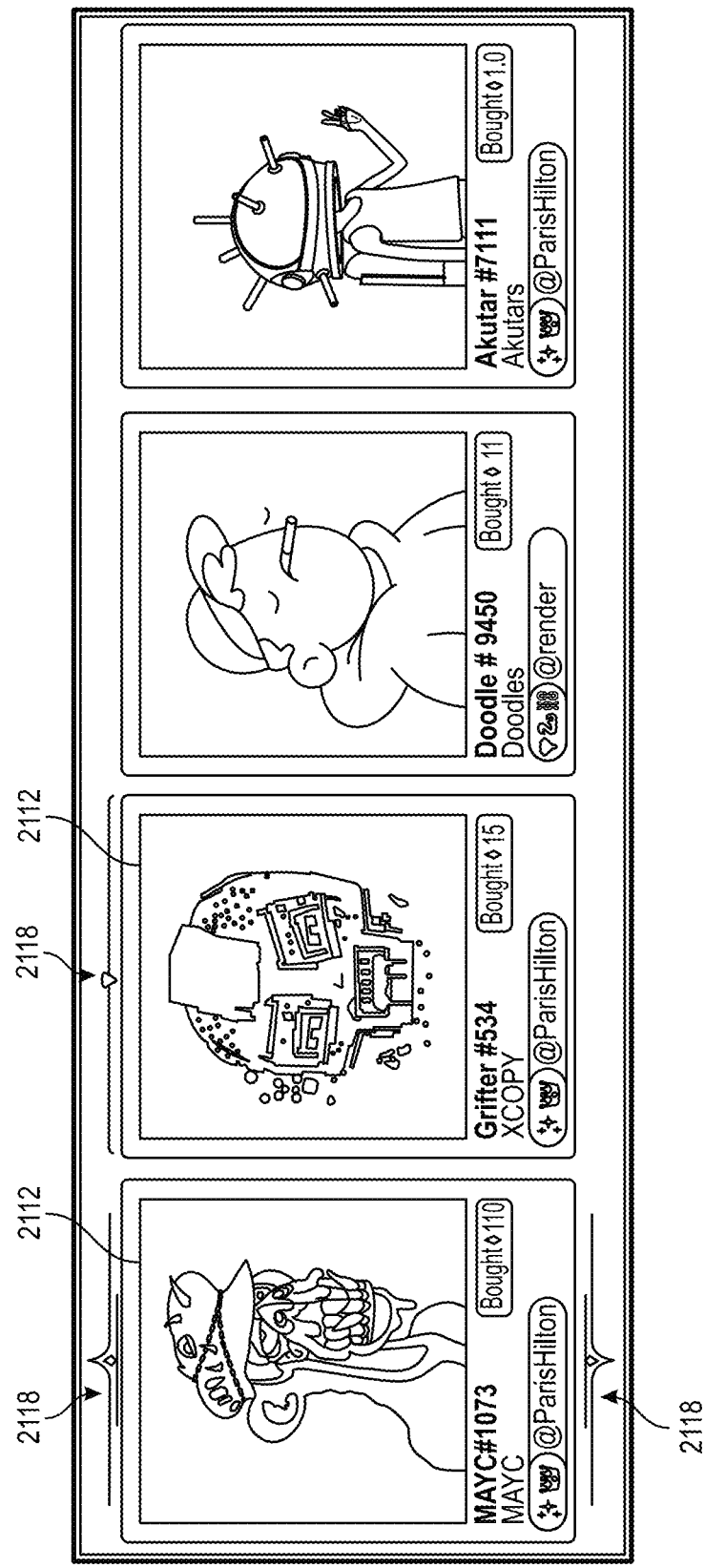
FIG. 21C illustrates an example user interface for presenting event signifiers that are indicative of significant value or volume of cryptographic objects linked to a group of users.

FIG. 21C illustrates a portion of the presentation interface 2110. In particular, event signifiers 2118 are presented. As illustrated, the event signifiers 2118 are tied to the visual representation 2112 of certain cryptographic objects. For example, an event signifier 2118 accompanies and is positioned above the visual representation 2112 of the cryptographic object named Grifter #534.

The event signifier 2118 for Grifter #534 indicates a particularly significant value of the object event in which Grifter #534 was involved. For example, the event signifier 2118 for Grifter #534 indicates that Grifter #534 was purchased for a significant amount of value. As another example, the event signifier 2118 for Grifter #534 indicates that multiple other group members recently also minted or purchased cryptographic objects of the Grifter set or collection. As yet another example, the event signifier 2118 for Grifter #534 indicates that a floor price of the Grifter set or collection has increased by a significant amount with the purchase of Grifter #534 by a group member.

In some examples, an event signifier indicates events that occur between two or more group members. For example, trade, purchase, sale, or other event that involves more than one cryptographic address associated with the group of users is indicated by a particular event signifier. As such, activity that is internal or confined within the group is differentiated with activity that extends outside of the group.

FIG. 21C also illustrates event signifiers 2118 being presented for another cryptographic object named MAYC #1073. The event signifiers 2118 for MAYC #1073 are different than the event signifier 2118 of Grifter #534. The difference in event signifiers suggests to a user that the object events involving each cryptographic object differ in value or volume. As one example, the difference in event signifiers indicates that MAYC #1073 was purchased for a higher amount of cryptocurrency than Grifter #534. As another example, the difference in event signifiers indicates that members of the group have recently minted or purchased more objects from the MAYC collection than from the Grifter collection.

Thus, as exemplified in FIG. 21C, event signifiers are presented to indicate significant activity among group members and are differentiated based on a degree of value or volume of the different activities of the group members. In some examples, different visual size, auditory volume, and/or the like of the event signifiers is based and conveys the value or volume of the cryptographic objects. Some example event signifiers are configured to indicate temporal aspects of events. For example, a size of a given event signifier correlates with a length of time that the object was contiguously held by a user.

As discussed herein, examples of event signifiers 2118 include dynamic visuals. In one example, upon a newsfeed-like update of the presentations interface 2110 to include the visual representation 2112 of the MAYC #1073 object, a flash across the screen or a wave-like visual is presented due to the significance of the value of MAYC #1073. In another example, the frame or bar of the event signifier 2118 connected to MAYC #1073 periodically flashes, moves, glows, and/or the like. In yet another example, in response to addition of the visual representation 2112 of the MAYC #1073 object to the newsfeed-like interface, other visual representations 2112 of other objects vibrate or shake for a temporary length of time.

Figure 21D:
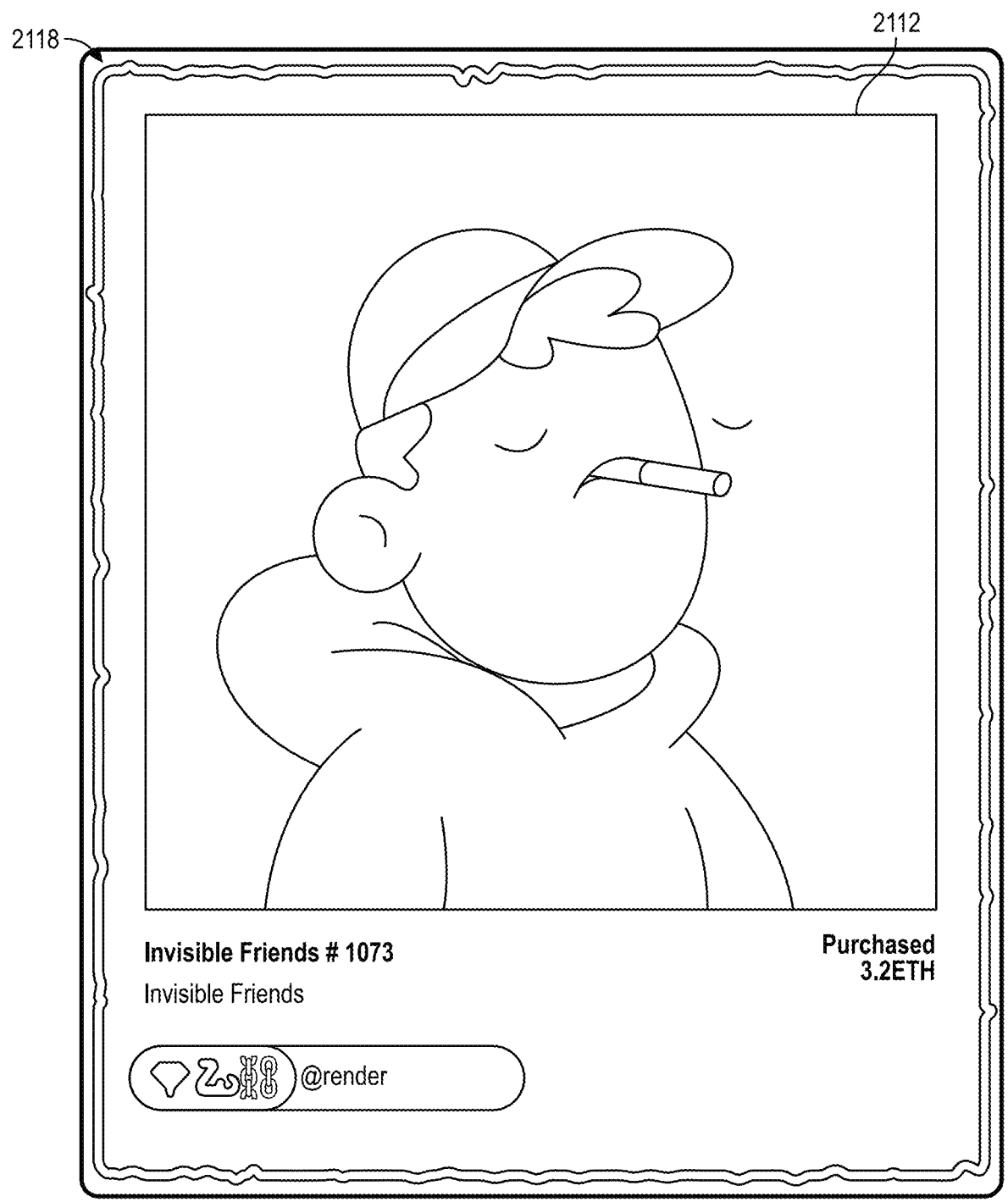
FIG. 21D illustrates an example event signifiers that is indicative of significant value or volume of a cryptographic object that is linked to a group of users.

FIG. 21D illustrates another example of an event signifier 2118 that is presented in connection with a visual representation 2112 of a cryptographic object linked to a group member. In the illustrated example, the event signifier 2118 is a frame that is visually presented surrounding the visual representation 2112. As an example, the frame indicates that a floor price of the Invisible Friends set/collection has increased.

In some examples, the frame is a dynamic and/or animated visual. For example, flame visuals that compose the frame oscillate and wave to emulate real-world chaotic motion of flames. As another example, in response to occurrence of the event (e.g., purchase of the object, holding of the object for significant time, floor price increase of the collection), the flame visuals trace around the visual representation 2112 at a speed until the frame becomes contiguous. In yet another example, the frame is presented after a dynamic explosion-like animation that surrounds the visual representation 2112. In some examples, presentation of the frame is accompanied by an audio.

Figure 21E:
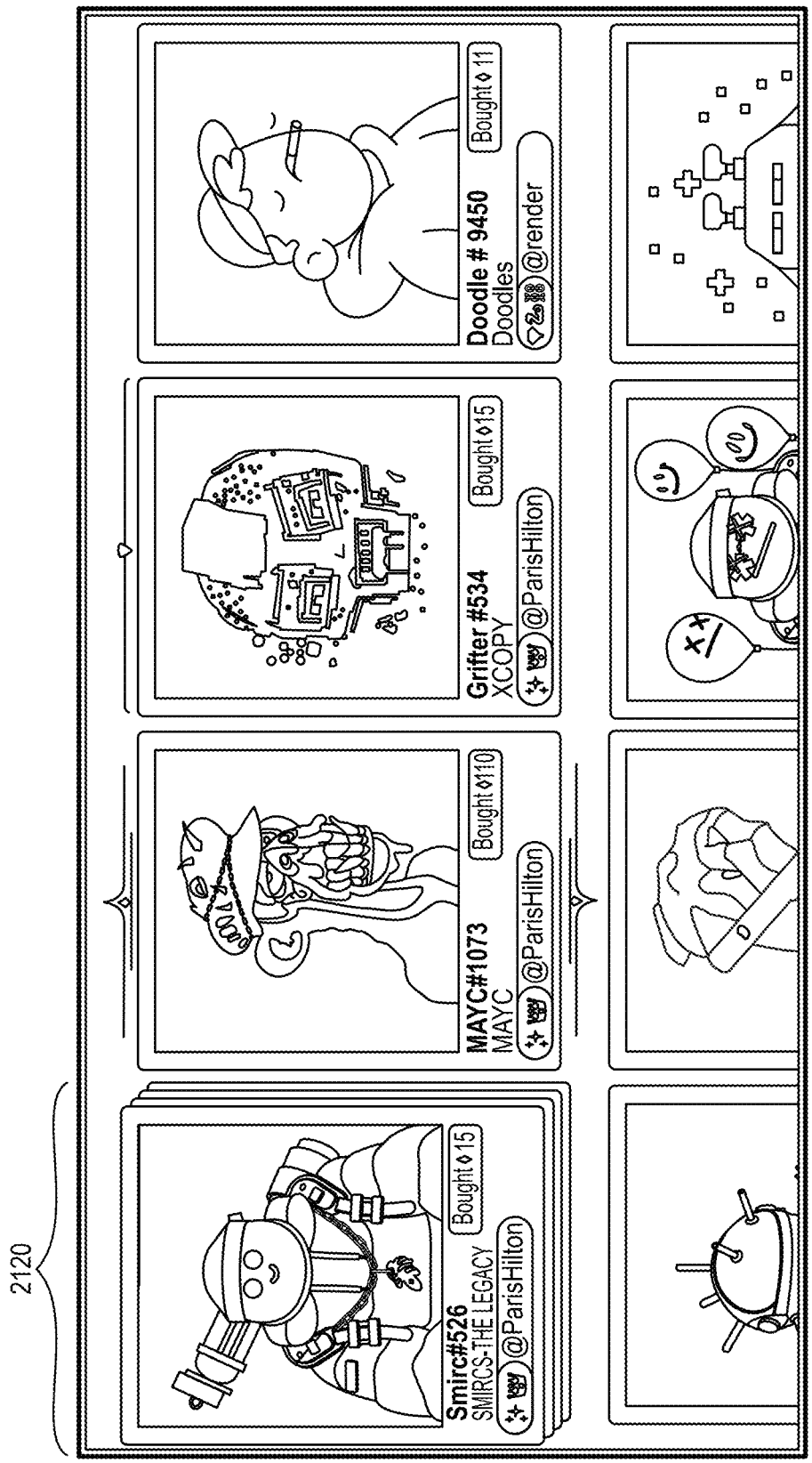
FIG. 21E illustrates an example compact representation of cryptographic objects linked to a group of users.

FIG. 21E illustrates a compact representation 2120 for multiple cryptographic objects. The multiple cryptographic objects are involved in an object event (e.g., minting, purchasing), and the compact representation 2120 is configured to efficiently (with respect to visual space or footprint) indicate the volume or quantity of objects involved in the object event. As illustrated, the compact representation 2120 includes a stack of visual representations of the multiple cryptographic objects. That is, the compact representation 2120 visualizes an aggregation of the multiple cryptographic objects, or the visual representations thereof.

Figure 21F:
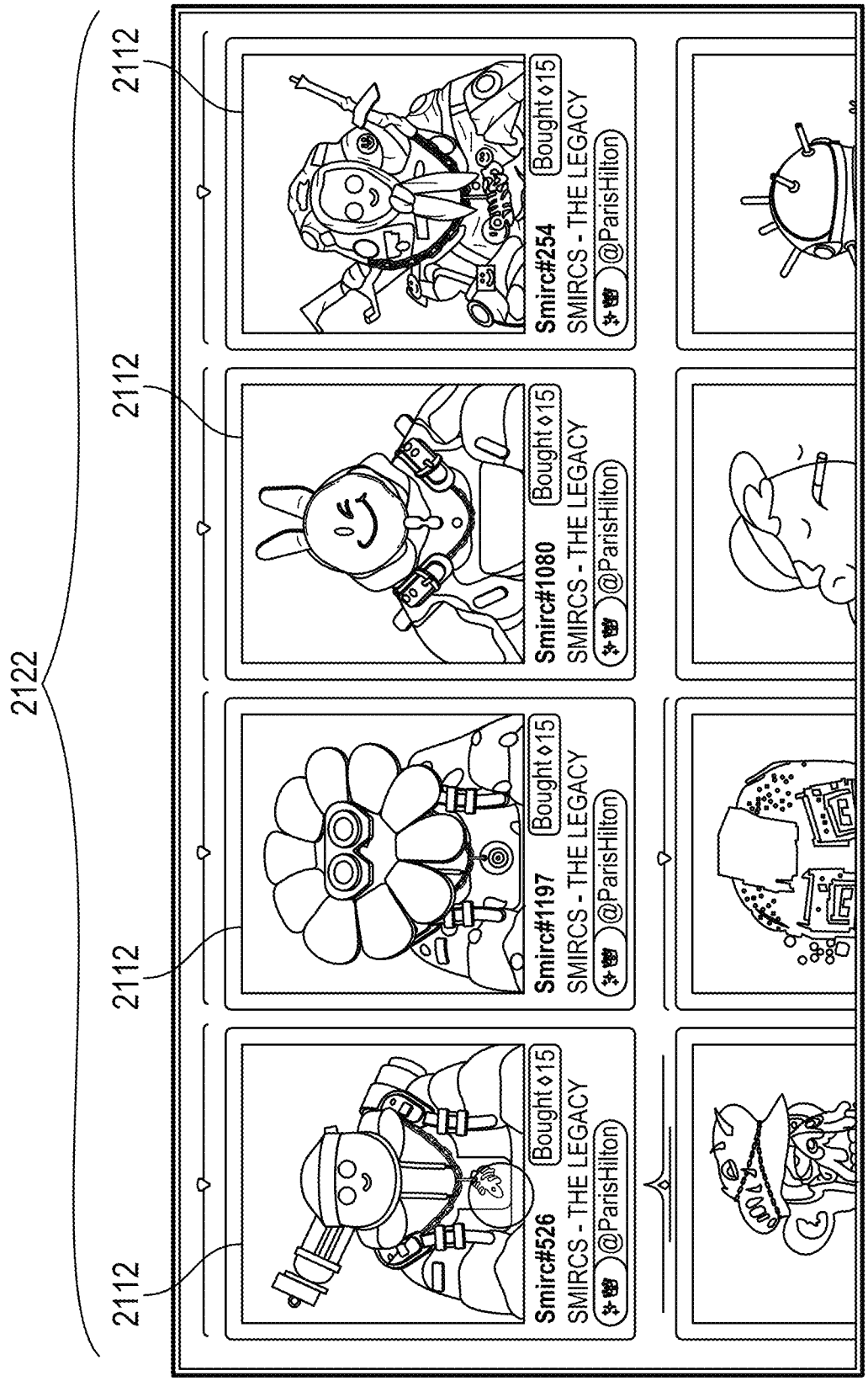
FIG. 21F illustrates an example expanded representation of cryptographic objects linked to a group of users.

FIG. 21F illustrates an expanded representation 2122 of the multiple cryptographic objects. In some examples, toggling between the compact representation 2120 and the expanded representation 2122 is enabled and caused via user input. As illustrated, the expanded representation 2122 presents the visual representation of the multiple cryptographic objects separately. In some examples, the transition from the compact representation 2120 and the expanded representation 2122 includes an animation that evokes dealing of physical cards. For example, individual visual representations 2112 slide out from the top or the bottom of the stack of visual representations shown in the compact representation 2120.

Figure 21G:
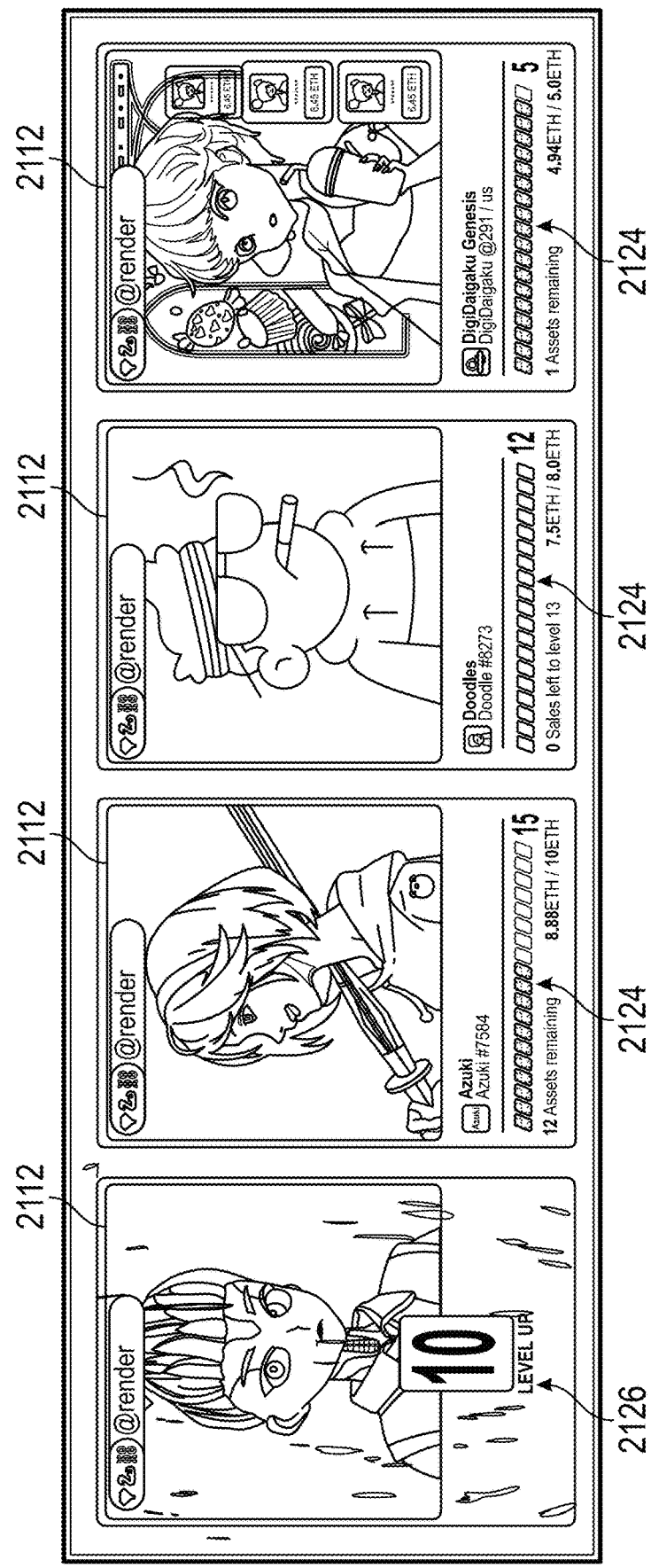
FIG. 21G illustrates example event signifiers relating to collection-specific values.

FIG. 21G illustrates another example portion of the presentation interface or newsfeed-like interface that presents visual representations 2112 of cryptographic objects owned by a group. In particular, the platform presents visual representations 2112 along with temporal event signifiers 2124 in the presentation interface. In some examples, temporal event signifiers 2124 indicate a progress, a completion percentage, an estimated time of arrival (ETA), a countdown, and/or the like in relation to a given object event.

In the illustrated example, the temporal event signifiers 2124 are progress bars that indicate progress towards a floor price increase. A floor price of a collection to which a cryptographic object belongs represents the lowest value of the available objects in the collection. Upon the lowest-valued objects being rendered unavailable (e.g., by purchase), the floor price increases to the next lowest value. Thus, in the illustrated example, the temporal event signifiers 2124 indicate how many of the lowest-valued objects (valued at the current floor price) still remain available and how many have been rendered unavailable.

Another object event that is forecasted by temporal event signifiers 2124 includes full group participation in an object set or collection. An example temporal event signifier 2124 includes a progress bar or a completion percentage that indicates how many members of the group own an object of a given object set or collection. Presentation of such a temporal event signifier 2124 encourages group-wide participation in specific object sets or collections.

Yet another object event that is forecasted by temporal event signifiers 2124 includes holding an object for a specific length of time. In some examples, the temporal event signifiers 2124 then encourage positive time-rank behavior and are compactly present time-rank information.

A temporal event signifier 2124 is updated to reflect and indicate updates to the progress, completion, ETA, countdown, and/or the like as time progresses and additional events occur. For example, in response to a purchase of a floor-price object in a collection, a temporal event signifier 2124 for the collection is updated to reflect the fewer number of floor-price objects available before the floor price increases. Therefore, across various examples and applications of a temporal event signifier 2124 (including the examples discussed above), the temporal event signifier 2124 is controlled by the occurrence of subsequent object events.

These subsequent object events, depending on the applied context of the temporal event signifier 2124, include object events specific to and occurring within the given group, or object events across all users indicated by the immutable cryptographic ledger. For example, a temporal event signifier 2124 indicating progress towards a floor price increase (e.g., those illustrated in FIG. 21G) is controlled by group-agnostic events. Indeed, any purchase of floor-price objects, whether or not by a group member, impacts the progress towards a floor price increase.

As another example, a temporal event signifier 2124 indicating completion towards group participation in an object collection is controlled only by group-specific events. As such, the platform updates the temporal event signifier 2124 only in response to object events related to group members.

FIG. 21G additionally illustrates a completion event signifier 2126 that is presented upon occurrence of the object event forecasted by a temporal event signifier 2124. In the illustrated example, the completion event signifier 2126 indicates a floor price increase. In the illustrated example, the completion event signifier 2126 indicates a level attributed to the collection that relates to the floor price of the object, and the levels are indicative of a relative value of different floor prices. For example, upon the floor price of the Azuki collection rising to 10ETH, a level number 15 would be assigned to the Azuki collection and indicated in the level-up event signifier 2126.

Accordingly, as demonstrated in FIG. 21G, temporal aspects and collection-specific aspects of object events are indicated via event signifiers in the newsfeed or presentation interface. These event signifiers build anticipation and excitement of users towards a forecasted goal or significant event.

Time-Based Leaderboard

The behavior of owners of NFTs is to frequently trade their digital objects and cause significant turnover of those objects. The constant turnover of digital objects is not an ideal ecosystem for administrators or artists related to those NFTs. The time-based leaderboard thus encourages users and holders of NFTs to hold their NFTs longer.

The leaderboard indicates how long a given user has held a given NFT for example from a particular collection/generation of NFTs. A collection may be defined as a particular drop, from one smart contract/dApp, or as the entirety of the NFTs within a given smart contract. In some embodiments, the time-based leaderboard is based off NFTs from a contemporaneous collection so as to compare fairly. In such circumstances, all users who have continuously held their NFTs from that collection will be tied for first.

Thus, sorting ties is an important detail for purposes of the leaderboard. In some embodiments, ties are sorted by a number of digital objects from the collection held or based on staking of digital objects. When a NFT is "staked," that NFT is transferred to a holding wallet/contract for a predetermined length of time. Staking an NFT locks that NFT from transfer by the owner. While staking of a NFT technically transfers the NFT away from the owner's wallet, for purposes of the leaderboard, the NFT is considered contiguously owned by the original user.

The leaderboard enables social benefits and loyalty rewards such as getting early or exclusive access to future distributions of NFTs and anything the creator wants to incentivize loyalty (a velocity sink) and award reputational benefits.

Identity on the leaderboard is displayed in a number of ways. Additional information provided to the leaderboard enables additional manners of representing an identity on the leaderboard. At a base level, a cryptographic address associated with a wallet that holds an NFT serves as a functional identity for users on the leaderboard. However, when available (e.g., tied to a given cryptographic address), the leaderboard is enabled to use a 3D graphic object (described above) as a rotating or cycling representation of a user's identity. Other examples of identity include social network handles, Yats, usernames, and/or real names.

Figure 22:
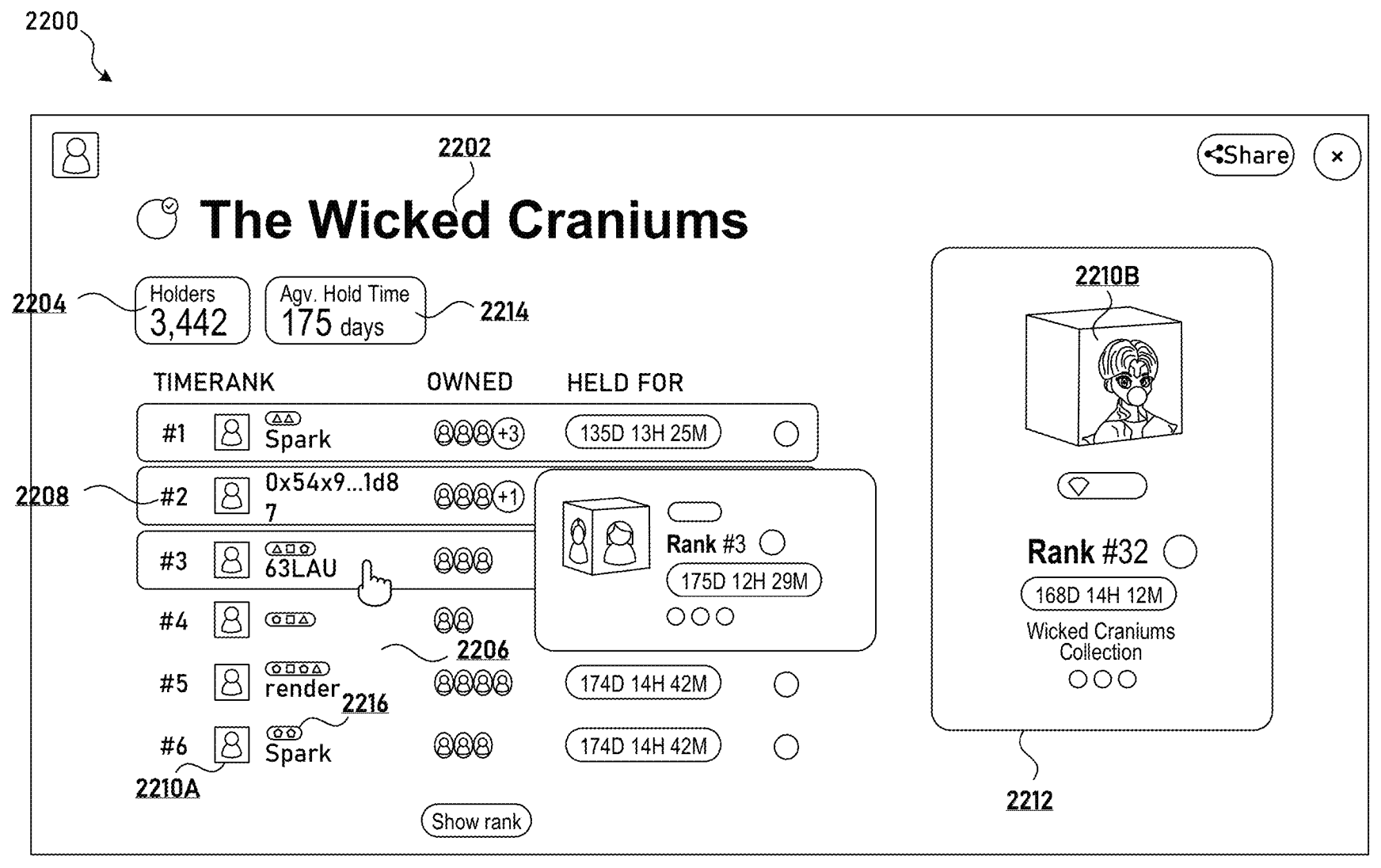

FIG. 22 is a screenshot of a time-based leaderboard interface 2200. The leaderboard interface 2200 pertains to a particular collection 2202 of digital objects/NFTs. As depicted in the Figure, the collection 2202 is "The Wicked Craniums," a set of procedurally generated art of skeleton characters based on artist created visual assets. The leaderboard interface 2200 further includes a counter 2204 for the number of users who have an NFT from the collection 2202. The leaderboard interface 2200 is embodied by a chart of ranks 2206 which orders the users based on the contiguous length of time they have possessed an NFT from the collection 2202.

The chart of ranks 2206 displays the numerical ranks 2208 of each user and an identity 2210 for each user. In the chart of ranks 2206, the user's identity 2210 is displayed using a 2D representation 2210A of an identity digital object (described above). The media displayed by the 2D representation 2210A of the user identity is either of a cycling/rotating media data or a predetermined "front face" of the identity digital object.

To the right side of the screen, an active user's profile 2212 is depicted. An identity digital object is further depicted in 3D 2210B, with faces each having media content as described above. The leaderboard further includes an average length of possession of NFTs 2214. Further linked to the users are Yats 2216. In this depiction, a Yat 2216 is another NFT type that is linked to the identity digital object, on a one-to-one basis. However, in some embodiments, linking of NFT types is performed on a many-to-one or many-to-many basis.

The data underlying the leaderboard is available in cryptographic records on a relevant blockchain as associated with the smart contract linked to the collection 2202. In some embodiments, while the leaderboard itself is public, the underlying data is gated behind collection controls. For example, the artist that administrations the collection 2202 has access to the underlying data in a sorted format. The underlying data is used to implement leaderboard rewards such as early or exclusive access to subsequent collections. Because access is based on connection to a valid public cryptographic address, the underlying data identifying users based on the public cryptographic addresses is useful for issuing leaderboard rewards.

Figure 23:
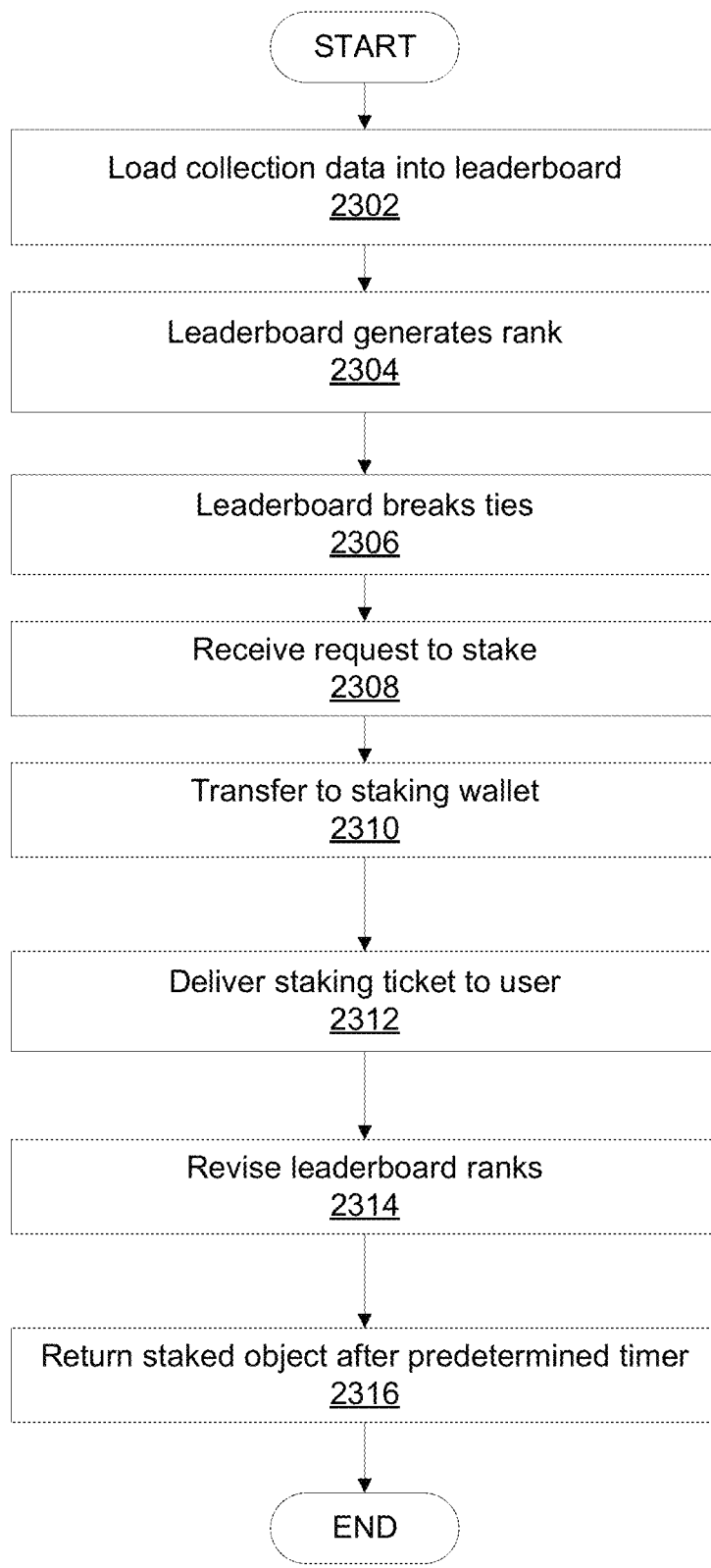
FIG. 23 is a flowchart illustrating a method of implementation of a time-based leaderboard interface.

FIG. 23 is a flowchart illustrating a method of implementation of a time-based leaderboard interface. In step 2302, a leaderboard platform loads a set of digital object collection data. In step 2304, the leaderboard platform generates a rank order based on length of possession for digital objects in the collection by user.

In step 2306, the leaderboard breaks ties. Ties are broken by number of digital objects held and/or length of object staking. In step 2308, the leaderboard platform receives a request to stake a digital object for a predetermined period of time.

In response to the request to stake the digital object, in step 2310, the digital object is transferred to a universal staking wallet where the digital object is locked and prevented from interaction for the predetermined time. Staked digital objects protocol limited digital objects that indicate a future of holding the digital object. Staking demonstrates greater than an intent to hold, as there is no way to return a staked digital object before the predetermined time expires. In some embodiments, there are separate leaderboards for length of stakes (e.g., divorced from past holding time).

In step 2312, the universal wallet provides the owner with a staking ticket digital object that tracks the staked digital object. In some embodiments the staking ticket enables return of the staked digital object to cryptographic address other than the address the digital object had been in. The staking ticket includes identity information such that the owner may be identified separate from the original cryptographic address. For example, in some embodiments, the staking ticket includes encrypted data that is verified via zero-knowledge proof. Verification via the zero-knowledge proof enables the user to redirect the return of the digital object after the staking period has ended.

In embodiments where the identity digital object includes digital objects represented on faces, such as on a 3D object, the platform that generates the identity digital object and connects the content of cryptographic wallets to those faces is enabled to use digital objects that are staked despite those staked objects not being present in the linked wallets. The connection of the staked object to the identity digital object is made through the smart contract that stakes digital objects and/or the staking ticket object. In effect, the owner of the digital object still retains the display benefits of the digital object, but does not retain the ability to trade/transfer/sell said digital object.

In step 2314, the leaderboard revises ranks based on the stake. Stakes objects may be re-staked for longer periods by their users. Re-staking enables users to "one-up" other users on the leaderboard.

In step 2316, after the predetermined staking period ends, the digital object is returned to the original owner of the digital object. In some embodiments, the return is automatic to the original wallet that the digital object was transferred from. However, it is sometimes the case that wallets are compromised, and thus the staking ticket enables users of compromised wallets to indicate return to some other wallet.

Figure 24:
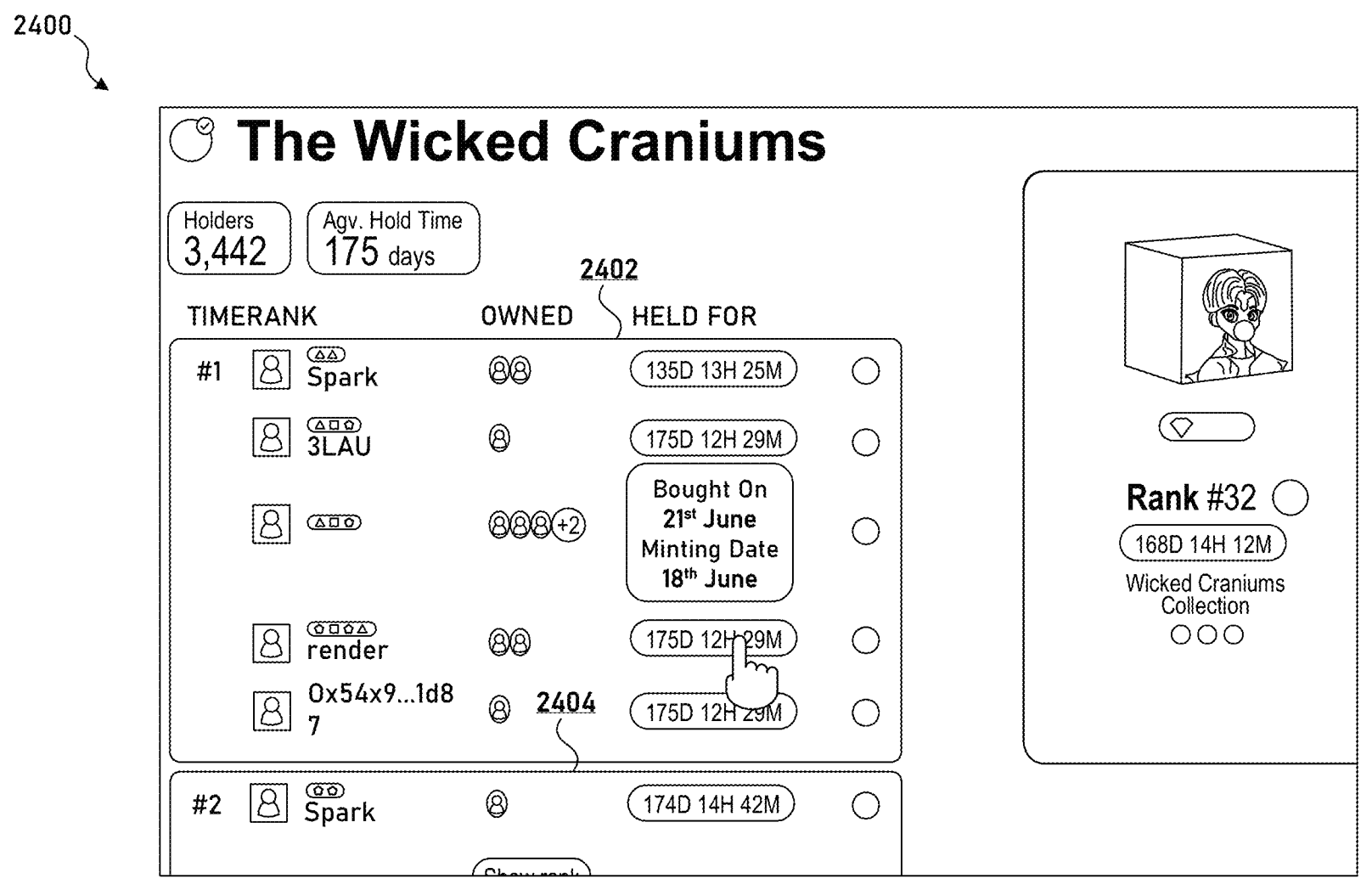

FIG. 24 is a screenshot of multiple users occupying a matching leaderboard position. The leaderboard 2400 illustrates five users tied for first place 2402 and some undetermined number of users tied for second place 2404. In some embodiments, ties on the leaderboard are permitted.

Interrelation of Digital Objects

In some embodiments digital objects interrelate and have functionality with one another. Described below are a number of embodiments of interrelation:

A) a first digital object is enabled to generate further derivative digital objects. The derivative digital objects may be distributed at will, but if the first digital object changes possession, all derivative digital objects deactivate. For purposes of this disclosure and other examples, the term "Deactivate" refers to any of: losing all functionality, losing any user decipherable representation, and/or being deleted. Various embodiments implement deactivation either through internal programing of the digital object, or as conditions within a smart contract the digital object is associated with. A user decipherable representation refers to visual representations or data that is intended to be read by humans (e.g., not hash values). Examples include identity data that identifies the owner of the digital object.

B) a first digital object is an NFT and is associated with a cryptographic wallet. Contents of the cryptographic wallet are used as the input used to generate the first digital object. Where any of the original input are transferred away from the cryptographic wallet, the first digital object is deactivated.

C) a first digital object is an NFT and is associated with a cryptographic wallet. Contents of the cryptographic wallet are used as the input used to generate the first digital object. Where the first digital object is transferred away from the cryptographic wallet, the first digital object is deactivated.

D) a first digital object is an NFT and is associated with a cryptographic wallet. Contents of the cryptographic wallet are used as the input used to generate the first digital object. Where the content of the cryptographic wallet changes, data associated with the digital object also changes. For example, where a new NFT is added to the cryptographic wallet, a visual representation of the digital object is updated to include reference to or elements of the new NFT that has been added. The update to the digital object enables the digital object to evolve as changes occur to the cryptographic wallet.

In some embodiments of the evolving digital object, the digital object generation platform is executed subsequent times to modify the original digital object. The input scheme of evolving digital objects accommodates multiple schema. For example, in some embodiments, the visual representation of the digital object is remade from the current existing input (e.g., deleted and re-created). In other embodiments, the existing visual representation is used as a base element that is modified or embellished based on the changes to the cryptographic wallet. Where the existing visual representation is used as a base element, additional weight is given to the existing visual representation in the machine learning models such that the output remains recognizable as having originated from the base element.

In each of the examples above, some alternate embodiments replace deactivation with a broader modification. For example, some or part of the human decipherable content is deleted or changed. Where the digital object carried identity information, the visual representation may remain, but the identity portion may be deleted or updated to a new owner.

Where the digital object is an NFT that is modified, the changes to the NFT occur in the smart contract from which the NFT is associated. Changes to the visual representation or other data associated with the NFT are based on how the smart contract encodes cryptographic data of the NFT to human decipherable components. Where human decipherable elements are modified, no change need by made to cryptographic elements of the NFT. Where cryptographic elements of the NFT are changed, those changes are based upon conditions precedent within the smart contract (e.g., a process for revocation of a cryptographic token).

Computing Platform

Figure 25:
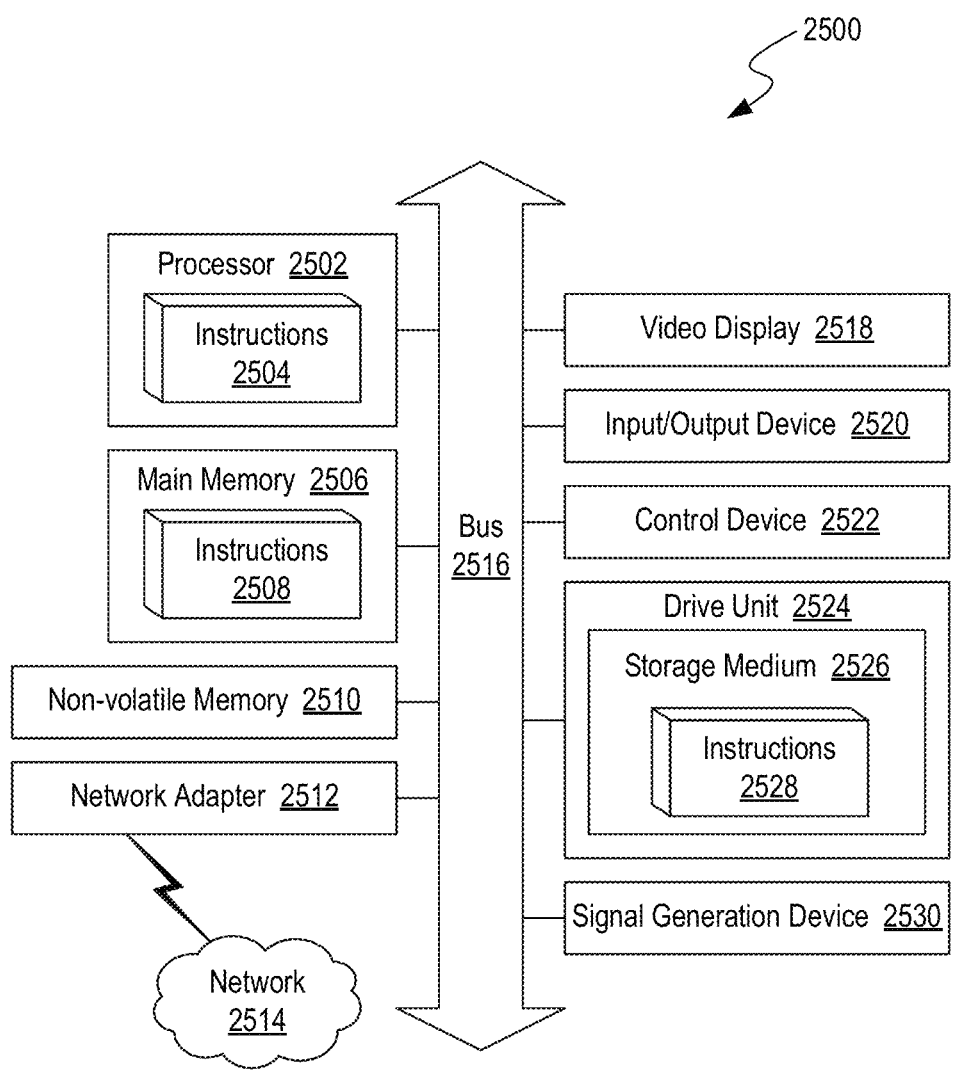
FIG. 25 is a block diagram of an exemplary computing system.

FIG. 25 is a block diagram illustrating an example computer system 2500, in accordance with one or more embodiments. In some embodiments, components of the example computer system 2500 are used to implement the software platforms described herein. At least some operations described herein can be implemented on the computer system 2500.

The computer system 2500 can include one or more central processing units ("processors") 2502, main memory 2506, non-volatile memory 2510, network adapters 2512 (e.g., network interface), video displays 2518, input/output devices 2520, control devices 2522 (e.g., keyboard and pointing devices), drive units 2524 including a storage medium 2526, and a signal generation device 2520 that are communicatively connected to a bus 2516. The bus 2516 is illustrated as an abstraction that represents one or more physical buses and/or point-to-point connections that are connected by appropriate bridges, adapters, or controllers. The bus 2516, therefore, can include a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus (also referred to as "Firewire").

The computer system 2500 can share a similar computer processor architecture as that of a desktop computer, tablet computer, personal digital assistant (PDA), mobile phone, game console, music player, wearable electronic device (e.g., a watch or fitness tracker), network-connected ("smart") device (e.g., a television or home assistant device), virtual/augmented reality systems (e.g., a head-mounted display), or another electronic device capable of executing a set of instructions (sequential or otherwise) that specify action(s) to be taken by the computer system 2500.

While the main memory 2506, non-volatile memory 2510, and storage medium 2526 (also called a "machine-readable medium") are shown to be a single medium, the term "machine-readable medium" and "storage medium" should be taken to include a single medium or multiple media (e.g., a centralized/distributed database and/or associated caches and servers) that store one or more sets of instructions 2528. The term "machine-readable medium" and "storage medium" shall also be taken to include any medium that is capable of storing, encoding, or carrying a set of instructions for execution by the computer system 2500. In some embodiments, the non-volatile memory 2510 or the storage medium 2526 is a non-transitory, computer-readable storage medium storing computer instructions, which can be executed by the one or more central processing units ("processors") 2502 to perform functions of the embodiments disclosed herein.

In general, the routines executed to implement the embodiments of the disclosure can be implemented as part of an operating system or a specific application, component, program, object, module, or sequence of instructions (collectively referred to as "computer programs"). The computer programs typically include one or more instructions (e.g., instructions 2504, 2508, 2528) set at various times in various memory and storage devices in a computer device. When read and executed by the one or more processors 2502, the instruction(s) cause the computer system 2500 to perform operations to execute elements involving the various aspects of the disclosure.

Moreover, while embodiments have been described in the context of fully functioning computer devices, those skilled in the art will appreciate that the various embodiments are capable of being distributed as a program product in a variety of forms. The disclosure applies regardless of the particular type of machine or computer-readable media used to actually effect the distribution.

Further examples of machine-readable storage media, machine-readable media, or computer-readable media include recordable-type media such as volatile and non-volatile memory devices, floppy and other removable disks, hard disk drives, optical discs (e.g., Compact Disc Read-Only Memory (CD-ROMS), Digital Versatile Discs (DVDs)), and transmission-type media such as digital and analog communication links.

The network adapter 2512 enables the computer system 2500 to mediate data in a network 2514 with an entity that is external to the computer system 2500 through any communication protocol supported by the computer system 2500 and the external entity. The network adapter 2512 can include a network adapter card, a wireless network interface card, a router, an access point, a wireless router, a switch, a multilayer switch, a protocol converter, a gateway, a bridge, a bridge router, a hub, a digital media receiver, and/or a repeater.

The network adapter 2512 can include a firewall that governs and/or manages permission to access proxy data in a computer network and tracks varying levels of trust between different machines and/or applications. The firewall can be any number of modules having any combination of hardware and/or software components able to enforce a predetermined set of access rights between a particular set of machines and applications, machines and machines, and/or applications and applications (e.g., to regulate the flow of traffic and resource sharing between these entities). The firewall can additionally manage and/or have access to an access control list that details permissions including the access and operation rights of an object by an individual, a machine, and/or an application, and the circumstances under which the permission rights stand.

The techniques introduced here can be implemented by programmable circuitry (e.g., one or more microprocessors), software and/or firmware, special-purpose hardwired (i.e., non-programmable) circuitry, or a combination of such forms. Special-purpose circuitry can be in the form of one or more application-specific integrated circuits (ASICs), programmable logic devices (PLDs), field-programmable gate arrays (FPGAs), etc. A portion of the methods described herein can be performed using the example ML system 2500 illustrated and described in more detail with reference to FIG. 25.

Machine Learning System

Figure 26:
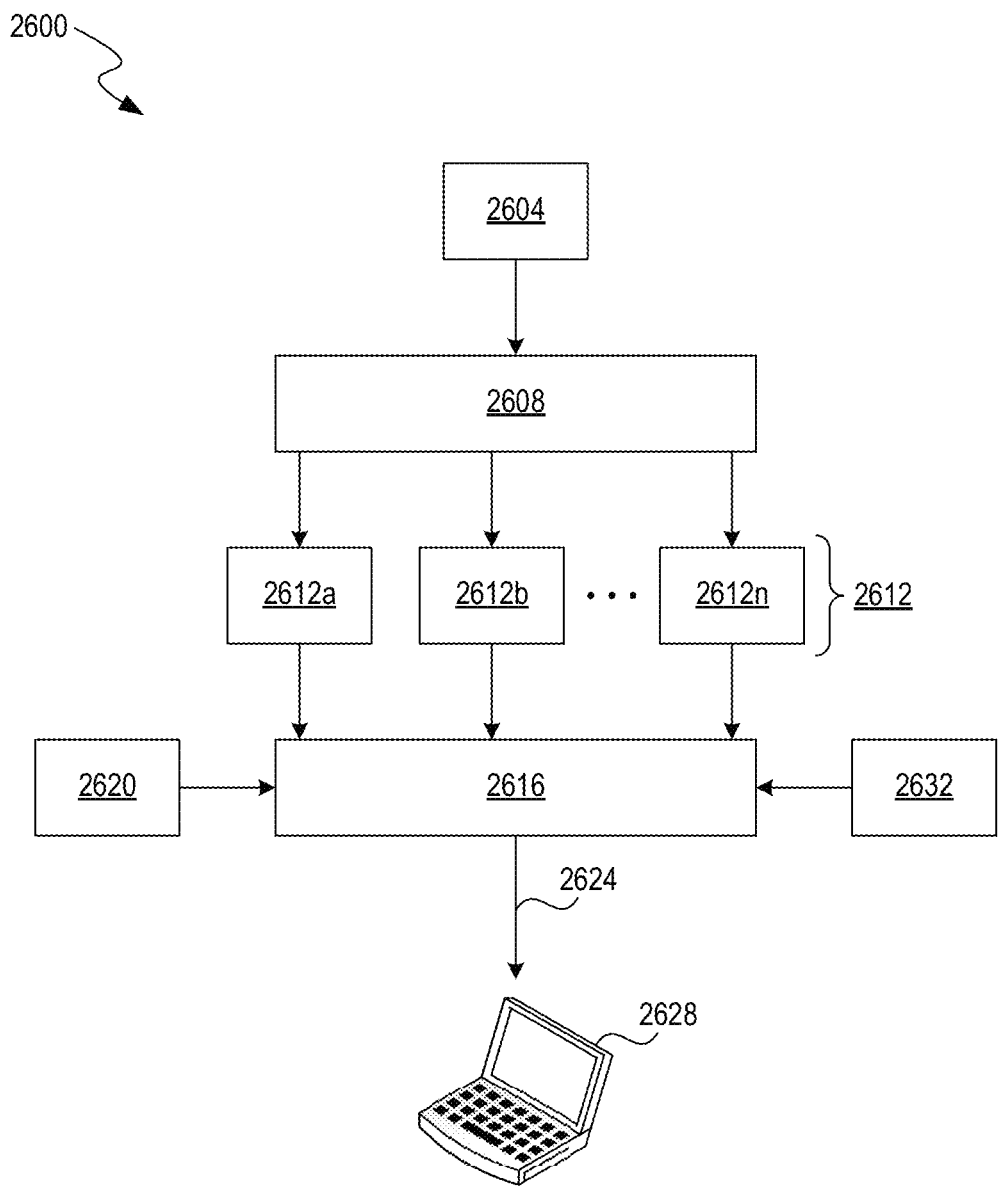
FIG. 26 is a block diagram illustrating an example machine learning (ML) system, in accordance with one or more embodiments

FIG. 26 is a block diagram illustrating an example ML system 2600, in accordance with one or more embodiments. The ML system 2600 is implemented using components of the example computer system 2500 illustrated and described in more detail with reference to FIG. 25. Likewise, embodiments of the ML system 2600 can include different and/or additional components or be connected in different ways. The ML system 2600 is sometimes referred to as a ML module.

The ML system 2600 includes a feature extraction module 2608 implemented using components of the example computer system 2500 illustrated and described in more detail with reference to FIG. 25. In some embodiments, the feature extraction module 2608 extracts a feature vector 2612 from input data 2604. For example, the input data 2604 can include one or more images, sets of text, audio files, or video files. The feature vector 2612 includes features 2612a, 2612b, . . . 2612n. The feature extraction module 2608 reduces the redundancy in the input data 2604, e.g., repetitive data values, to transform the input data 2604 into the reduced set of features, e.g., features 2612a, 2612b, . . . 2612n. The feature vector 2612 contains the relevant information from the input data 2604, such that events or data value thresholds of interest can be identified by the ML model 2616 by using this reduced representation. In some example embodiments, dimensionality reduction techniques, such as principal component analysis (PCA) or autoencoders are used by the feature extraction module 2608.

In alternate embodiments, the ML model 2616 performs deep learning (also known as deep structured learning or hierarchical learning) directly on the input data 2604 to learn data representations, as opposed to using task-specific algorithms. In deep learning, no explicit feature extraction is performed; the features are implicitly extracted by the ML system 2600. For example, the ML model 2616 can use a cascade of multiple layers of nonlinear processing units for implicit feature extraction and transformation. Each successive layer uses the output from the previous layer as input. The ML model 2616 can learn in supervised (e.g., classification) and/or unsupervised (e.g., pattern analysis) modes. The ML model 2616 can learn multiple levels of representations that correspond to different levels of abstraction, wherein the different levels form a hierarchy of concepts. In this manner, the ML model 2616 can be configured to differentiate features of interest from background features.

In alternative example embodiments, the ML model 2616, e.g., in the form of a CNN generates the output 2624, without the need for feature extraction, directly from the input data 2604. The output 2624 is provided to the computer device 2628. The computer device 2628 is a server, computer, tablet, smartphone, smart speaker, etc., implemented using components of the example computer system 2500 illustrated and described in more detail with reference to FIG. 25. In some embodiments, the steps performed by the ML system 2600 are stored in memory on the computer device 2628 for execution. In other embodiments, the output 2624 is displayed on high-definition monitors.

A CNN is a type of feed-forward artificial neural network in which the connectivity pattern between its neurons is inspired by the organization of a visual cortex. Individual cortical neurons respond to stimuli in a restricted region of space known as the receptive field. The receptive fields of different neurons partially overlap such that they tile the visual field. The response of an individual neuron to stimuli within its receptive field can be approximated mathematically by a convolution operation. CNNs are based on biological processes and are variations of multilayer perceptrons designed to use minimal amounts of preprocessing.

The ML model 2616 can be a CNN that includes both convolutional layers and max pooling layers. The architecture of the ML model 2616 can be "fully convolutional," which means that variable sized sensor data vectors can be fed into it. For all convolutional layers, the ML model 2616 can specify a kernel size, a stride of the convolution, and an amount of zero padding applied to the input of that layer. For the pooling layers, the ML model 2616 can specify the kernel size and stride of the pooling.

In some embodiments, the ML system 2600 trains the ML model 2616, based on the training data 2620, to correlate the feature vector 2612 to expected outputs in the training data 2620. As part of the training of the ML model 2616, the ML system 2600 forms a training set of features and training labels by identifying a positive training set of features that have been determined to have a desired property in question and a negative training set of features that lack the property in question. The ML system 2600 applies ML techniques to train the ML model 2616, that when applied to the feature vector 2612, outputs indications of whether the feature vector 2612 has an associated desired property or properties.

The ML system 2600 can use supervised ML to train the ML model 2616, with features from the training sets serving as the inputs. In some embodiments, different ML techniques, such as support vector machine (SVM), regression, naïve Bayes, random forests, neural networks, etc., are used. In some example embodiments, a validation set 2632 is formed of additional features, other than those in the training data 2620, which have already been determined to have or to lack the property in question. The ML system 2600 applies the trained ML model 2616 to the features of the validation set 2632 to quantify the accuracy of the ML model 2616. In some embodiments, the ML system 2600 iteratively re-trains the ML model 2616 until the occurrence of a stopping condition, such as the accuracy measurement indication that the ML model 2616 is sufficiently accurate, or a number of training rounds having taken place.

The description and drawings herein are illustrative and are not to be construed as limiting. Numerous specific details are described to provide a thorough understanding of the disclosure. However, in certain instances, well-known details are not described in order to avoid obscuring the description. Further, various modifications can be made without deviating from the scope of the embodiments.

Consequently, alternative language and synonyms can be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any term discussed herein is illustrative only and is not intended to further limit the scope and meaning of the disclosure or of any exemplified term. Likewise, the disclosure is not limited to various embodiments given in this specification.

It is to be understood that the embodiments and variations shown and described herein are merely illustrative of the principles of this invention and that various modifications can be implemented by those skilled in the art.

Note that any and all of the embodiments described above can be combined with each other, except to the extent that it may be stated otherwise above or to the extent that any such embodiments might be mutually exclusive in function and/or structure.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

The invention claimed is:

1. A method for group-wide presentation of cryptographic object activity, the method comprising:
    providing a presentation interface by a particular user of a group of users, wherein the group of users are associated with a plurality of cryptographic addresses;
    identifying an object event recorded by an immutable cryptographic ledger, wherein the object event (i) identifies a cryptographic address of the plurality of cryptographic addresses and (ii) occurs within a time window that has elapsed since a time that the presentation interface was last provided to the particular user;
    assigning an event signifier to the object event based on event data recorded by the immutable cryptographic ledger in association with the object event,
        wherein the event data indicates a value and a volume of particular cryptographic objects involved in the object event, and
        wherein the event signifier is connected to the presentation interface and includes at least one of an audio, a persistent visual, or a dynamic visual;
    causing a presentation of the event signifier via the presentation interface in connection with a presentation of visual representations of a plurality of cryptographic objects that are linked to the plurality of cryptographic addresses,
        wherein the plurality of cryptographic objects includes the particular cryptographic objects involved in the object event;
    while the presentation interface is provided to the particular user, monitoring appended ledger entries of the immutable cryptographic ledger for a subsequent object event that identifies at least one of the plurality of cryptographic addresses; and
    responsive to detecting the subsequent object event, updating the presentation of the visual representations of the plurality of cryptographic objects based on the subsequent object event.

2. The method of claim 1, wherein a size of the persistent visual or the dynamic visual of the event signifier corresponds to the value of the particular cryptographic objects involved in the object event.

3. The method of claim 1, wherein the presentation of the visual representations of the plurality of cryptographic objects includes an interactable representation for the particular cryptographic objects involved in the object event, wherein the interactable representation is configured to alternate, responsive to user input, between an expanded presentation in which each particular cryptographic object is visualized separately and a compact presentation that visualizes an aggregation of the particular cryptographic objects.

4. The method of claim 1, wherein the event signifier is assigned to the object event further based on respective event data for one or more other object events that occur within the time window or that indicate respective cryptographic objects that belong to a particular object set to which the particular cryptographic objects also belong.

5. The method of claim 1, further comprising:
determining whether to suppress the event signifier assigned to the object event based on a number of other object events occurring within the time window.

6. A system for group-wide presentation of cryptographic object activity, the system comprising a processor and a memory storing instructions that, when executed by the processor, cause the processor to:
detecting an object event that identifies at least one of a plurality of cryptographic addresses associated with a group of users,
wherein the object event is detected based on a search through an immutable cryptographic ledger based on the plurality of cryptographic addresses, and
wherein the object event indicates one or more particular cryptographic objects that is linked or to be linked to a particular cryptographic address of the plurality of cryptographic addresses;
assign a particular event signifier to the object event based on event data recorded by the immutable cryptographic ledger in connection with the object event,
wherein the event data includes at least one of an audio presented via a presentation interface, a persistent visual presented via the presentation interface, or a dynamic visual presented via the presentation interface; and
in response to the presentation interface being provided to a particular user of the group of users, cause a presentation of the particular event signifier with a visual representation of the one or more particular cryptographic objects identified by the object event via the presentation interface.

7. The system of claim 6, wherein the particular event signifier indicates a significance of a value or a volume of the one or more particular cryptographic objects that is included in the event data.

8. The system of claim 6, wherein the presentation of the particular event signifier is caused further with a presentation of visual representations of a plurality of cryptographic objects that are linked to the plurality of cryptographic addresses and detected during the search through the immutable cryptographic ledger based on the plurality of cryptographic addresses.

9. The system of claim 6, wherein the particular event signifier is assigned to the detected object event further based on combined event data that includes a combined value and combined volume of other cryptographic objects indicated by other object events.

10. The system of claim 9, wherein the other object events occur within a pre-defined time window from the detected object event.

11. The system of claim 9, wherein the other cryptographic objects belong to a particular set of cryptographic objects to which the one or more particular cryptographic objects also belong.

12. The system of claim 6, wherein the instructions further cause the processor to:
determine whether to suppress the particular event signifier based on a number of other object events that occur during a pre-defined time window in which the detected object event occurs.

13. The system of claim 6, wherein the visual representation of the one or more particular cryptographic objects is configured to be toggled between a compact representation in which an aggregation of the one or more particular cryptographic objects is visualized and an expanded representation in which each of the one or more particular cryptographic objects is visualized separately.

14. The system of claim 6, wherein the particular event signifier is assigned to the object event further based on whether or not the object event indicates more than one cryptographic address of the plurality of cryptographic addresses.

15. A non-transitory computer-readable medium having executable instructions stored thereon for group-wide presentation of cryptographic object activity, the executable instructions when executed by a processor perform operations of:
searching an immutable cryptographic ledger based on a plurality of cryptographic addresses associated with a group of users, wherein said searching detects an object event that indicates at least one of the plurality of cryptographic addresses and one or more particular cryptographic objects;
assigning an event signifier to the object event based on a comparison of event data associated with the object event with pre-defined thresholds that are related to values or volumes of cryptographic objects; and
updating a presentation of visual representations of a plurality of cryptographic objects that are linked to the plurality of cryptographic addresses with a presentation of the event signifier.

16. The non-transitory computer-readable medium of claim 15, wherein the event signifier includes at least one of an audio, a persistent visual, or a dynamic visual, and wherein the event signifier is connected to a visual representation of the particular cryptographic objects indicated by the object event.

17. The non-transitory computer-readable medium of claim 15, wherein the event data associated with the object event includes a combined value or a combined volume of the one or more particular cryptographic objects and respective cryptographic objects indicated by one or more other object events that occur within a pre-defined period of time from the object event.

18. The non-transitory computer-readable medium of claim 15, wherein the event data associated with the object event includes a combined value or a combined volume of the one or more particular cryptographic objects and respective cryptographic objects indicated by one or more other object events, the respective cryptographic objects belonging to a particular object set to which the one or more particular cryptographic objects also belong.

19. The non-transitory computer-readable medium of claim 15, wherein the presentation of visual representations is provided via a presentation interface at a client device associated with a particular user of the group of users, and wherein the immutable cryptographic ledger is searched for object events that occurred since a previous access of the presentation interface at the client device.

20. The non-transitory computer-readable medium of claim 15, wherein the operations further include determining whether to suppress the event signifier assigned to the object event based on a number of other object events occurring within a pre-defined time window from a time that the object event occurred.

\* \* \* \* \*